United States Patent
Asai et al.

(10) Patent No.: US 7,446,911 B2
(45) Date of Patent: Nov. 4, 2008

(54) OPTICAL SCANNING APPARATUS AND IMAGE FORMING APPARATUS

(75) Inventors: Nobuaki Asai, Hashima-gun (JP); Shoji Yamada, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 602 days.

(21) Appl. No.: 11/135,518

(22) Filed: May 24, 2005

(65) Prior Publication Data

US 2005/0219674 A1 Oct. 6, 2005

Related U.S. Application Data

(63) Continuation of application No. PCT/JP03/14444, filed on Nov. 13, 2003.

(30) Foreign Application Priority Data

Nov. 26, 2002 (JP) ............................. 2002-341798
Nov. 26, 2002 (JP) ............................. 2002-341861

(51) Int. Cl.
*H04N 1/04* (2006.01)
*H04N 1/46* (2006.01)
*G02B 26/08* (2006.01)

(52) U.S. Cl. ........................ 358/481; 358/511; 358/474; 359/223; 359/224

(58) Field of Classification Search ................ 358/481, 358/511, 474; 359/213, 224, 223, 235, 236
See application file for complete search history.

(56) References Cited

U.S. PATENT DOCUMENTS

| 5,543,956 A | * | 8/1996 | Nakagawa et al. | ........... | 359/225 |
| 5,912,608 A | * | 6/1999 | Asada | ......................... | 335/222 |
| 5,999,303 A | * | 12/1999 | Drake | ........................... | 359/224 |
| 6,049,407 A | | 4/2000 | Melville | | |

(Continued)

FOREIGN PATENT DOCUMENTS

JP A-04-257821 9/1992

(Continued)

OTHER PUBLICATIONS

Yuzuru Ueda et al.; "A study of 2-D Micro Magnetic Optical Scanner"; *Nippon Applied Magnetics Association, Inc.*; 2001; pp. 39-44. (with abstract).

(Continued)

*Primary Examiner*—Houshang Safaipour
(74) *Attorney, Agent, or Firm*—Oliff & Berridge, PLC

(57) ABSTRACT

An optical scanning apparatus for optical scan that oscillates at least partially an oscillating body having a reflective mirror portion, to thereby modulate a direction in which the reflective mirror portion causes incident light thereon to be reflected off, is disclosed, the oscillating body comprising: a first spring portion, coupled to the reflective mirror portion, and excited to generate a torsional oscillation of the first spring portion; and a plurality of second spring portions, coupled to the first spring portion, and coupled to a fixed frame portion of the oscillating body in a bifurcation manner with a bifurcation spacing of the plurality of second spring portions being larger than a width of the first spring portion, the plurality of second spring portions being excited to generate flexural and torsional oscillations thereof.

25 Claims, 48 Drawing Sheets

U.S. PATENT DOCUMENTS

| | | |
|---|---|---|
| 6,449,079 B1 | 9/2002 | Herrmann |
| 6,672,732 B1 * | 1/2004 | Niendorf et al. ............ 359/877 |
| 7,388,702 B2 * | 6/2008 | Yasuda et al. ............... 359/224 |

FOREIGN PATENT DOCUMENTS

| | | |
|---|---|---|
| JP | A-07-065098 | 3/1995 |
| JP | A-07-092409 | 4/1995 |
| JP | A-10-104543 | 4/1998 |
| JP | A-10-197819 | 7/1998 |
| JP | A-10-253912 | 9/1998 |
| JP | B2-2981576 | 11/1999 |
| JP | B2-3129219 | 1/2001 |
| JP | A-2001-075042 | 3/2001 |
| JP | A-2001-272626 | 10/2001 |
| JP | B2-3246106 | 1/2002 |
| WO | WO 01/01187 A1 | 1/2001 |

OTHER PUBLICATIONS

Atsuhiro Mase et al.; "Proposal and Experiment of an Optical Scanner with a Large Scan Angle and a High Frequency for a Display"; *Institute of Electrical Engineers of Japan, Inc.*; 2002. (with abstract).

Nobuaki Asai et al.; "A Novel High Resolution Optical Scanner Actuated by Aerosol Deposited PZT Films"; *IEEE*; 2003; pp. 247-250.

Nobuaki Asai et al.; "Fabrication of High Speed Micro Optical Scanner Using PZT Thick Film formed by Aerosol Deposition Method"; 2003; pp. 177-178.

* cited by examiner

OPTICAL SCANNING APPARATUS AND IMAGE FORMING APPARATUS

CROSS-REFERENCE TO RELATED APPLICATIONS

This is a continuation of International Application PCT/JP03/14444 filed Nov. 13, 2003, which was published in Japanese under PCT Article 21(2).

This application is based on Japanese Patent Application Nos. 2002-341798 filed Nov. 26, 2002, and 2002-341861 filed Nov. 26, 2002, and PCT International Application No. PCT/JP03/14444 filed Nov. 13, 2003, the contents of which are incorporated hereinto by reference.

BACKGROUND OF THE INVENTION

1. Field of the Invention

The invention relates to an optical scanning apparatus for optical scan that oscillates at least partially an oscillating body having a reflective mirror portion, to thereby modulate a direction in which the reflective mirror portion causes incident light thereon to be reflected off, and more particularly to techniques of enhancing the geometrical property of an elastically deformable portion of the oscillating body.

2. Description of the Related Art

Conventionally, optical scanning apparatuses for use in image forming apparatuses such as laser printers and projectors each scanning laser light for projecting an image are known. Typical types of such optical scanning apparatuses include a unidirectional rotary type represented by a polygon mirror, and an oscillatory type represented by a galvano mirror. The oscillatory type of optical scanning apparatus has been said that it can easily accomplish downsizing, reduction in weight, and reduction in cost, when compared with the unidirectional rotary type of optical scanning apparatus.

One example of conventional optical scanning apparatus of an oscillatory type is such an optical scanning apparatus for optical scan that oscillates at least partially an oscillating body having a reflective mirror portion, to thereby modulate a direction in which the reflective mirror portion causes incident light thereon to be reflected off.

In this example of conventional apparatus, the oscillating body is constructed to include: a reflective mirror portion; a fixed frame portion; and an elastically deformable portion coupled with both the reflective mirror portion and the fixed frame portion. This example of conventional apparatus is constructed to further include an actuator which excites the elastically deformable portion to generate a torsional oscillation.

BRIEF SUMMARY OF THE INVENTION

In such an optical scanning apparatus, a vibrational frequency of the reflective mirror portion means a scan frequency of reflected light emitted from the reflective mirror portion, and an oscillatory angle of the reflective mirror portion means a scan angle of the reflected light. In such an optical scanning apparatus, although an increase in scan angle and an increase in scan frequency are mutually exclusive, a stronger need may exist of maximizing the scan frequency while ensuring the scan angle.

On the other hand, in such an optical scanning apparatus, changes in the geometrical feature of the elastically deformable portion (e.g., dimensions, orientations, relative positional relationship with peripheral elements, etc.) result in changes in the vibrational properties (e.g., easiness to be vibrated, durability, etc.) of the elastically deformable portion.

In light of the circumstances described above, it is an object of the present invention to provide an optical scanning apparatus for optical scan that oscillates at least partially an oscillating body having a reflective mirror portion, to thereby modulate a direction in which the reflective mirror portion causes incident light thereon to be reflected off, and that the geometrical property of an elastically deformable portion of the oscillating body is enhanced.

According to the present invention, an optical scanning apparatus for optical scan is provided that oscillates at least partially an oscillating body having a reflective mirror portion, to thereby modulate a direction in which the reflective mirror portion causes incident light thereon to be reflected off.

The oscillating body comprises:

a first spring portion, coupled to the reflective mirror portion, and excited to generate a torsional oscillation of the first spring portion; and a plurality of second spring portions, coupled to the first spring portion, and coupled to a fixed frame portion of the oscillating body in a bifurcation manner with a bifurcation spacing of the plurality of second spring portions being larger than a width of the first spring portion, the plurality of second spring portions being excited to generate flexural and torsional oscillations thereof.

The optical scanning apparatus further comprises an actuator oscillating the plurality of second spring portions.

In this apparatus, as for the oscillating body, the reflective mirror portion and the fixed frame portion are interconnected not by only the first spring portion, but by the first spring portion and the plurality of second spring portions extending from the first spring portion in a bifurcation manner.

Further, in this apparatus, the plurality of second spring portions are coupled to the first spring portion, with the plurality of second spring portions extending from the first spring portion in a bifurcation manner, with the bifurcation spacing of the plurality of second spring portions being larger than the width of the first spring portion. As a result, the plurality of second spring portions, which each correspond to the elastically deformable portion of the oscillating body, are optimized for their geometrical properties in relation to the first spring portion which corresponds to the remaining portion of the same oscillating body.

Still further, in this apparatus, the plurality of second spring portions are each excited to generate not only a torsional oscillation but also a flexural oscillation. That is to say, the plurality of second spring portions are each elastically deformed at a higher degree of freedom of change in shape.

Therefore, this apparatus makes it easy, when compared with the case where the reflective mirror portion and the fixed frame portion are interconnected only by the first spring portion, to distribute to the first and second spring portions, load required for oscillating the reflective mirror portion.

As a result, this apparatus facilitates relief of load to which the first spring portion is subjected for oscillating the reflective mirror portion. For example, this apparatus makes it easier to reduce the torsion of the first spring portion, and to relieve stress concentration on a section of the first spring portion which connects it with the remaining section thereof.

Additionally, this apparatus facilitates reduction in load to which each second spring portion is subjected for oscillating the reflective mirror portion. This apparatus makes it easier to, for example, reduce the torsion of each second spring portion, and to relieve stress concentration on a section of each second spring portion which connects it with the first spring portion, and a section of each second spring portion which connects it with the fixed frame portion.

Accordingly, this apparatus enables each of the first and second spring portions to be satisfied if it withstands small load for the magnitude of the oscillation of the reflective mirror portion, when compared with the case where the reflective mirror portion and the fixed frame portion are interconnected only via the first spring portion.

As a result, this apparatus fulfills a stronger need for the oscillation of the reflective mirror portion, such as concurrent achievement of an increased scan angle and an increased scan frequency, of the reflected light, with an enhanced durability of the oscillating body.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
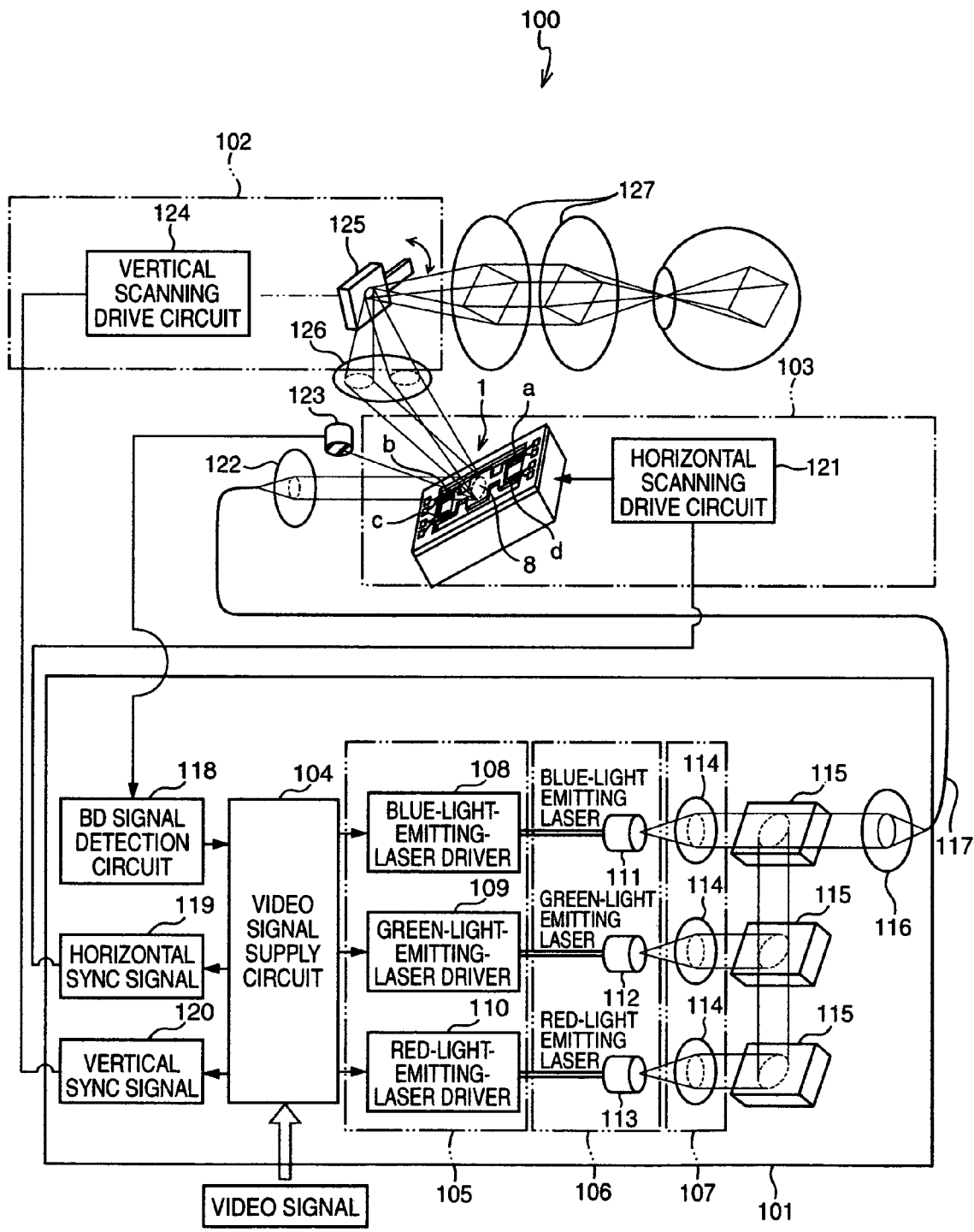
FIG. 1 is a schematic view illustrating a retinal scanning type of an image forming apparatus 100 including an optical scanning apparatus 1 constructed according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An optical scanning apparatus for optical scan that oscillates at least partially an oscillating body having a reflective mirror portion, to thereby modulate a direction in which the reflective mirror portion causes incident light thereon to be reflected off, the oscillating body comprising:

a first spring portion, coupled to the reflective mirror portion, and excited to generate a torsional oscillation of the first spring portion; and a plurality of second spring portions, coupled to the first spring portion, and coupled to a fixed frame portion of the oscillating body in a bifurcation manner with a bifurcation spacing of the plurality of second spring portions being larger than a width of the first spring portion, the plurality of second spring portions being excited to generate flexural and torsional oscillations thereof, the optical scanning apparatus further comprising an actuator oscillating the plurality of second spring portions.

In this apparatus, as for the oscillating body, the reflective mirror portion and the fixed frame portion are interconnected not by only the first spring portion, but by the first spring portion and the plurality of second spring portions extending from the first spring portion in a bifurcation manner.

Further, in this apparatus, the plurality of second spring portions are coupled to the first spring portion, with the plurality of second spring portions extending from the first spring portion in a bifurcation manner, with the bifurcation spacing of the plurality of second spring portions being larger than the width of the first spring portion. As a result, the plurality of second spring portions, which each correspond to the elastically deformable portion of the oscillating body, are optimized for their geometrical properties in relation to the first spring portion which corresponds to the remaining portion of the same oscillating body.

Still further, in this apparatus, the plurality of second spring portions are each excited to generate not only a torsional oscillation but also a flexural oscillation. That is to say, the plurality of second spring portions are each elastically deformed at a higher degree of freedom of change in shape.

Therefore, this apparatus makes it easy, when compared with the case where the reflective mirror portion and the fixed frame portion are interconnected only by the first spring portion, to distribute to the first and second spring portions, load required for oscillating the reflective mirror portion.

As a result, this apparatus facilitates relief of load to which the first spring portion is subjected for oscillating the reflective mirror portion. For example, this apparatus makes it easier to reduce the torsion of the first spring portion, and to relieve stress concentration on a section of the first spring portion which connects it with the remaining section thereof.

Additionally, this apparatus facilitates reduction in load to which each second spring portion is subjected for oscillating the reflective mirror portion. This apparatus makes it easier to, for example, reduce the torsion of each second spring portion, and to relieve stress concentration on a section of each second spring portion which connects it with the first spring portion, and a section of each second spring portion which connects it with the fixed frame portion.

Accordingly, this apparatus enables each of the first and second spring portions to be satisfied if it withstands small load for the magnitude of the oscillation of the reflective mirror portion, when compared with the case where the reflective mirror portion and the fixed frame portion are interconnected only via the first spring portion.

As a result, this apparatus fulfills a stronger need for the oscillation of the reflective mirror portion, such as concurrent achievement of an increased scan angle and an increased scan frequency, of the reflected light, with an enhanced durability of the oscillating body.

Figure 14:
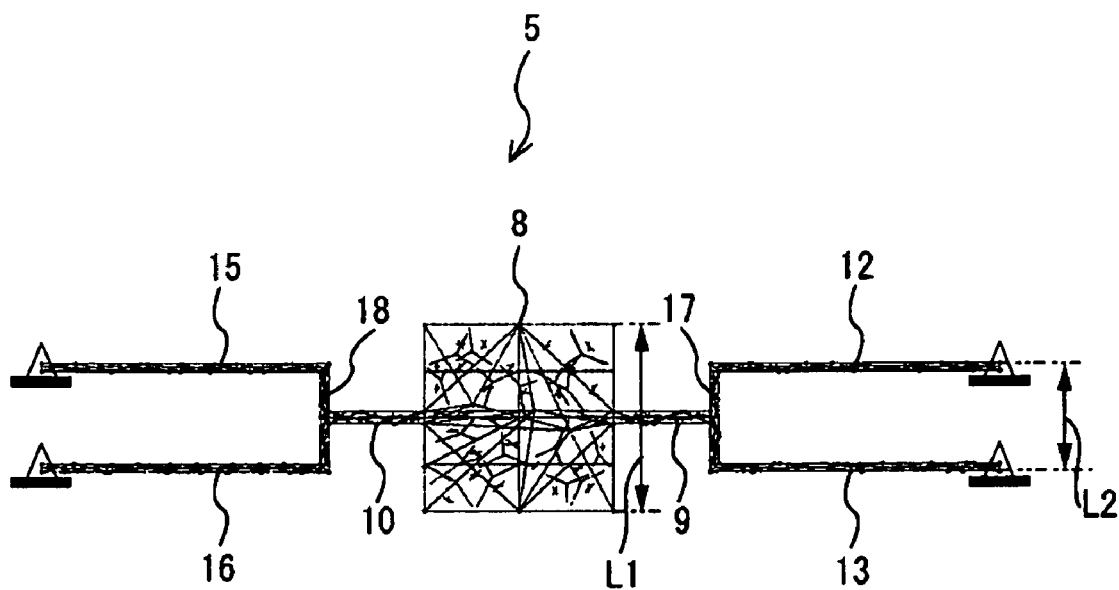
FIG. 14 is a front view schematically illustrating a model for use in numerical analysis, under a first numerical analysis condition, of vibrational characteristics of the oscillating body 5 in the first and second embodiments.

The "bifurcation spacing" set forth in this mode and each of the following modes may be interpreted to mean, for example, a distance between the outer opposite edges of the plurality of second spring portions, as denoted as "L2" in FIG. 14. The "bifurcation spacing" may also be interpreted to mean, although is not illustrated, a distance between the centerlines of the plurality of second spring portions, each of which passes through the corresponding second spring portion longitudinally. The "bifurcation spacing" may still also be interpreted to mean, although is not illustrated, a distance between the inner opposite edges of the plurality of second spring portions.

(2) The optical scanning apparatus according to mode (1), wherein an elastically deformable portion of the oscillating body which is formed with each second spring portion and the actuator is smaller in second moment of area than the first spring portion.

A galvano scanner for optical scan by oscillating a galvano mirror due to resonance phenomena is known. For the known galvano scanner, an actuation method for generating the resonance employs electrostatic, electromagnetic, thermal, or piezoelectric effect, or the like. Japanese Patent Publication No. 2001-272626 presents a method of actuating an optical scanning apparatus by employing a longitudinal vibration of a piezoelectric element.

In the optical scanning apparatus described in this publication, an elastic support frame, an elastically deformable portion, and a reflective mirror portion are mutually coupled and integrally formed on the same plane. Two piezoelectric elements are mounted on one of opposite faces of the support frame, in relative positional relationship allowing these to be symmetrical with respect to the position of the reflective mirror portion. These two piezoelectric elements are oscillated opposite in phase, and the oscillation is transferred to the elastically deformable portion via the support frame. As a result, the elastically deformable portion is excited to generate a torsional oscillation, and due to the torsional oscillation, the reflective mirror portion is oscillated about an oscillation axis.

Japanese Patent No. 3129219 describes another example of a conventional optical scanning apparatus. In this example of conventional apparatus, an oscillation axis of a reflective mirror is determined in position so as to be offset from the position of the gravity center of the reflective mirror, and a translational oscillation caused by one piezoelectric element is transferred to the reflective mirror via a support portion. As a result, the reflective mirror is excited to generate a torsional oscillation.

Japanese Patent No. 2981576 describes an example of a conventional optical scanning apparatus constructed to include: an oscillator; a scanning portion on which a reflective mirror is mounted; and a beam-shaped elastically deformable portion. In this example of conventional apparatus, a fixed end of the elastically deformable portion is secured to the oscillator, while a free end of the elastically deformable portion is secured to the scanning portion. A piezoelectric element, which is mounted on the oscillator, causes the oscillator to generate a corresponding type of oscillation to an elastic vibrational mode of the elastically deformable portion. Due to the oscillation, the reflective mirror is oscillated and reflected light therefrom is scanned.

Japanese Patent Publication No. HEI 10-253912 describes still another example of a conventional optical scanning apparatus. In this example of conventional apparatus, a mirror portion is coupled to a first frame portion via a first spring portion. The first frame portion is coupled to a second frame portion via a second spring portion. A connecting portion is integrally formed with the second frame portion, and a plurality of piezoelectric bimorphs are connected with the connecting portion and a third frame portion at opposite ends of each of the connecting portion and the third frame portion.

In this example of conventional apparatus, paired piezoelectric bimorphs, which are symmetrical with respect to the connecting portion, are flexurally oscillated opposite in phase. The connecting portion converts the flexural oscillation into a torsional oscillation of the second frame portion. The torsional oscillation eventually causes an oscillation of the mirror portion.

In contrast with the several examples of conventional optical scanning apparatuses described above, the optical scanning apparatus according to the present mode employs, in addition to the construction of the oscillating body set forth in the above mode (1), the construction in which an elastically deformable portion of the oscillating body which is formed with each second spring portion and the actuator is smaller in second moment of area (or moment of inertia of area) than the first spring portion.

In general, a tendency exists that, as the second moment of area of a given member reduces, both the flexural rigidity and the torsional rigidity of the member reduce, and therefore, a tendency exists that, as the second moment of area of the member reduces, the amount of an elastic deformation of the member in response to a constant input to the member increases.

Therefore, this optical scanning apparatus allows the elastically deformable portion to be elastically deformed easily when compared with the case where the second moment of area of the elastically deformable portion is not smaller than that of the first spring portion, resulting in facilitation in increasing a scan angle of the reflective mirror portion. As a result, the plurality of second spring portions which each correspond to the elastically deformable portion of the oscillating body are optimized for their geometrical properties in relation to the first spring portion which corresponds to the remaining portion of the same oscillating body. This optical scanning apparatus makes it easier to for example achieve a lager scan angle for lower power consumption.

(3) The optical scanning apparatus according to mode (1), wherein the bifurcation spacing is not larger than a width of the reflective mirror portion.

Japanese Patent Publication No. HEI 10-104543 describes an example of conventional optical scanning apparatus of a resonance type in which a reflective mirror portion is oscillated due to resonance phenomena. This example of conventional apparatus includes an oscillating body constructed to incorporate a movable portion; a stationary portion; and a beam portion interconnecting the movable portion and the stationary portion. A mirror surface is formed in the movable portion. On the other hand, a piezoelectric element is mounted on the stationary portion, and an oscillation of the oscillating body by the piezoelectric element causes the mirror surface to be oscillated together with the movable portion, thereby scanning reflected light from the mirror surface.

In this example of conventional apparatus, the oscillation of the oscillating body at a frequency of a resonant vibrational mode of the oscillating body causes the mirror surface to be oscillated. Further, this example of conventional apparatus is adapted such that, for scanning reflected light from the mirror portion at a higher speed, the oscillating body is oscillated due to a higher-order one of resonant virbarional modes of the oscillating body.

In this example of conventional apparatus, however, the employment of the higher-order resonant vibrational mode of the oscillating body requires a vibrational frequency of the oscillating body to be set higher. For this reason, a higher-speed optical scan, although is practicable, is difficult to be stabilized, due to superposition of undesired higher-order vibrational modes, incorporation of disturbances, etc.

Further, in this example of conventional apparatus, the employment of the higher-order vibrational mode of the oscillating body requires reduction in the rigidity of a spring portion as an elastically deformable portion, for ensuring the amplitude of the oscillating body. For this reason, the oscillating body tends to be susceptible to damage.

On the other hand, an optical scanning apparatus of a resonant type is important to improve a rectilinear orientation property or stabilize a rectilinear orientation, of light reflected from a reflective mirror of the optical scanning apparatus, i.e., scanned light. In this context, the "rectilinear orientation" of the scanned light is used to mean the direction of the centerline of the range of scanning or a scan angle through which light is scanned by the optical scanning apparatus.

In this regard, the literature titled "A Study of 2-D Micro Magnetic Optical Scanner" (Published by the Nippon Applied Magnetics Association, Inc.; The materials for the $117^{th}$ Study Group Meeting titled "Applications and New Developments of Thin-Film Actuators"—Future Vision in Magnetic Engineering—co-authored by Yuzuru Ueda and Norihiro Asada, Dec. 22, 2001; pp. 39-44) describes a conventional art for practicing an optical scan technique at high speed and large amplitude in a micro magnetic scanner in which a reflective mirror is formed in an oscillating body supported by a beam at its both ends.

This conventional art reduces a resonant frequency of a torsional resonant mode of the oscillating body to be lower than those of other vibrational modes (e.g., a vertical translational resonant mode, a horizontal translational resonant mode, a rotational resonant mode, a tilt resonant mode, etc.).

However, for improving the rectilinear orientation property or stabilizing the rectilinear orientation of the scanned light, if the resonant frequency of the torsional resonant mode is reduced, according to this conventional art, to be lower than those of the other vibrational modes, a reduction in the torsonal resonant frequency is invited. For this reason, the employment of this conventional art makes it difficult to achieve a higher-speed optical scan.

The present inventors, for enhancement of the rectilinear orientation property or stabilization of the rectilinear orientation of a scanned light, conducted various studies such as numerical analysis described in more detail below. As a result, the present inventors obtained findings described below.

That is to say, the present inventors obtained the findings that, if the optical scanning apparatus is configured such that the bifurcation spacing of the plurality of second spring portions is set not to exceed in dimension the width of the reflective mirror portion, with the construction of the oscillating body set forth in the above (1) being employed, then there is suppressed the occurrence of undesired vibrational modes, which are higher-order ones of vertical vibrational modes or horizontal vibrational modes, within a range lower in frequency than a natural frequency of the torsional vibrational mode, which is a desired one of a plurality of vibrational modes different in kind possibly occurring in the oscillating body.

The above setting of the bifurcation spacing provides an adequate separation of the natural frequency of the torsional vibrational mode from the other vibrational modes, thereby preventing superposition of vibrational modes in the oscillating body during the torsional resonance of the oscillating body, resulting in an enhancement in the rectilinear orientation property or a stabilization of the rectilinear orientation of the scanned light.

Additionally, the above setting of the bifurcation spacing reduces the possibility that the oscillating body is damaged due to occurrence of undesired vibrational mode, or due to superposition of desired and undesired vibrational modes, during the oscillation of the oscillating body at a higher frequency through a larger scan angle.

Based on the findings described above, the optical scanning apparatus according to the present mode is adapted such that the bifurcation spacing of the plurality of second spring portions does not exceed in dimension the width of the reflective mirror portion, with the construction of the oscillating body set forth in the above mode (1) being employed.

(4) The optical scanning apparatus according to any one of modes (1)-(3), wherein the plurality of second spring portions are excited to generate respective flexural oscillations in a plane parallel to respective thickness directions of the plurality of second spring portions.

(5) The optical scanning apparatus according to mode (4), wherein the plurality of second spring portions are excited to generate the respective flexural oscillations opposite in phase to each other.

This apparatus allows the plurality of second spring portions to exhibit the respective flexural oscillations in a manner that torsional oscillations of the first spring portion converted from the corresponding flexural oscillations are constructively interfered with each other, resulting in an easier achievement of an increased oscillation angle or scan angle of the reflective mirror portion.

(6) The optical scanning apparatus according to mode (5), the plurality of second spring portions are excited due to a mechanical force to generate the respective flexural oscillations opposite in phase to each other.

(7) The optical scanning apparatus according to mode (6), wherein the actuator is mounted on a selected spring portion which is at least one of the plurality of second spring portions.

(8) The optical scanning apparatus according to mode (7), wherein the actuator is secured to a selected surface which is at least one of opposite surfaces of the selected spring portion.

(9) The optical scanning apparatus according to mode (8), wherein the actuator is secured to the selected surface in an arrangement allowing the actuator to extend between the selected surface and one of opposite surfaces of an adjacent portion of the fixed frame portion to the selected spring portion, the one of opposite surfaces corresponding to the selected surface.

The apparatus according to the above mode (8) may be practiced in a manner that the actuator is secured to the selected surface without extending to the fixed frame portion. This manner, when employed, however, does not always allow the oscillating body to be oscillated such that vibrational nodes are stably located in interconnections between the second spring portions and the fixed frame portion.

In contrast, in the apparatus according to the present mode, the actuator is secured to the selected surface so as to extend to the fixed frame portion. Therefore, this apparatus allows the oscillating body to be oscillated such that vibrational nodes of the oscillating body are stably located in interconnections between the second spring portions and the fixed frame portion.

Accordingly, this apparatus allows the vibrational state of the oscillating body to stabilized, as opposed to the case where the oscillating body is oscillated such that vibrational nodes of the oscillating body are located at positions deviated from the interconnections between the second spring portions and the fixed frame portion, toward the side of the second spring portions.

Further, this apparatus allows each second spring portion to entirely contribute to production of the flexural and torsional deformations. Therefore, this apparatus, because of the effective utilization of the entire of each second spring portion, facilitates transmission of the vibration of the actuator to each second spring portion with an improved efficiency. Accordingly, this apparatus easily achieves a larger scan angle for the same level of vibration of the actuator.

It is added that the technological feature set forth in the present mode, i.e., the feature that an actuator is located coincident in position with a vibrational node, may be practiced separately from the technological features set forth in the preceding other modes.

(10) The optical scanning apparatus according to mode (8) or (9), wherein the actuator is secured to the selected surface by thin films process.

This apparatus enables the actuator to be secured to the selected surface without using adhesive. Accordingly, this apparatus allows the actuator to be secured integrally and strongly to the selected surface, without any intervening adhesive layer.

Therefore, this apparatus does not cause concern about a problem such as shearing and separation between the actuator and the selected surface due to an intervening adhesive layer therebetween, easily allowing the vibrational state of the oscillating body to be stabilized.

(11) The optical scanning apparatus according to mode (10), wherein the thin films process is one of CVD, sputtering, hydrothermal method, sol-gel method, and powder spray coating method.

In this context, the "CVD" means, as well known, chemical vapor deposition for depositing a layer or a film on the surface of a substrate due to gas-solid or gas-liquid chemical reaction. The "sputtering" is a technique of depositing a layer or a film on the surface of a substrate by vacuum discharge. The "hydrothermal method" is a technique of fabricating a film by crystal deposition of ions in solution at high temperature and high pressure. The "powder spray coating method" is a technique of forming onto a substrate a film by spraying accelerated ultra-fine particles mixed with gas, through a narrow nozzle.

(12) The optical scanning apparatus according to any one of modes (7)-(11), wherein the actuator extends along the selected spring portion and expands and contracts in a direction in which the actuator extends.

(13) The optical scanning apparatus according to any one of modes (1)-(6), wherein the actuator directly oscillates the oscillating body.

(14) The optical scanning apparatus according to any one of modes (1)-(6), wherein the actuator indirectly oscillates the oscillating body.

(15) The optical scanning apparatus according to any one of modes (1)-(14), wherein the actuator oscillated the oscillating body at the same frequency as a resonant frequency of the oscillating body.

This apparatus allows the oscillating body to be oscillated in a vibrationally stabilized manner due to the oscillating body being in the resonant vibrational state, resulting in an easier achievement of a stabilized optical scan.

(16) The optical scanning apparatus according to any one of modes (1)-(15), wherein the plurality of second spring portions each have a mechanical property allowing an easier elastic deformation than that of the first spring portion.

This apparatus, when compared with the case where each second spring portion has a mechanical property allowing an elastic deformation not easier than that of the first spring portion, allows an easier elastic deformation of each second spring portion, according to basically the same principle as that of the apparatus according to the above mode (2), resulting in an easier achievement of an increased scan angle of the reflective mirror portion. This apparatus more easily achieves a large scan angle for the amount of power consumption, for example.

(17) The optical scanning apparatus according to mode (16), wherein the plurality of second spring portions each have the same modulus as the first spring portion, while each having a shape in cross section allowing an easier elastic deformation than that of the first spring portion.

This apparatus allows each second spring portion to be optimized for its cross-sectional shape, which is a geometrical property, in relation to the first spring portion.

(18) The optical scanning apparatus according to any one of modes (1)-(17), wherein the reflective mirror portion is oscillated about an axis of oscillation due to the torsional oscillation, wherein the oscillating body further comprises a connecting portion interconnecting the first spring portion and the plurality of second spring portions, wherein the first spring portion, the plurality of second spring portions, and the connecting portion construct a combined body thereof, and wherein the combined body is disposed in the oscillating body, respectively, at two opposing positions to each other in a direction of the axis of oscillation with the reflected mirror potion being interposed between the two opposing positions.

This apparatus allows the two combined bodies opposing to each other with the reflective mirror portion being interposed between these two combined bodies, to vibrate the reflective mirror portion at opposite sides thereof, resulting in an easier achievement of an angular stabilization of a reflective surface of the reflective mirror portion, when compared with the case where the reflective mirror portion is vibrated only at one side thereof.

It is added that the "connecting portion" set for in the present mode and each of the following modes may be defined as, for example, a portion of each second spring portion of the combined body to which the instant connecting portion belongs, or a portion of the first spring portion of the combined body to which the instant connecting portion belongs.

It is further added that the technological feature set forth in the present mode, i.e., the feature that spring portions are aligned in opposing relation to each other, may be implemented separately from the technological features set forth in the preceding other modes.

(19) The optical scanning apparatus according to mode (18), wherein the two combined bodies disposed at the two opposing positions, respectively, are disposed symmetrically with respect to a position of the reflective mirror portion.

(20) The optical scanning apparatus according to any one of modes (1)-(9), wherein the oscillating body further comprises a connecting portion interconnecting the first spring portion and the plurality of second spring portions, and wherein the actuator is not mounted on the connecting portion.

In this apparatus, the flexural oscillation and the torsional oscillation of the second spring portions are transferred, via the connecting portion, to the first spring portion, so as to exhibit a torsional oscillation. The connecting portion provides the function of transferring oscillation due to its elastic deformation. This apparatus is configured such that the actuator is not mounted on the connecting portion which provides such an oscillation transfer function.

Therefore, this apparatus reduces the possibility that the actuator adversely affects the elastic deformation of the connecting portion, when compared with the case where the actuator is mounted on the connecting portion. Accordingly, the apparatus does not require the actuator to be located at a position sacrificing the scan angle of the reflective mirror portion.

(21) The optical scanning apparatus according to any one of modes (1)-(20), wherein the oscillating body further comprises a connecting portion interconnecting the first spring portion and the plurality of second spring portions, and wherein the connecting portion is coupled, respectively, substantially orthogonally to the first spring portion and to the plurality of second spring portions.

This apparatus does not require, for example, a higher degree of design complexity for achieving desired vibrational properties in the oscillating body, when compared with the case where the connecting portion is coupled obliquely, respectively, to the first spring portion and each second spring portion.

On the other hand, focusing only on a flexural one of deformations of each second spring portion, as the interconnection between each second spring portion and the connecting portion changes in configuration from an orthogonal interconnection to a collinear interconnection, there increases a tendency that the flexural deformation of each second spring portion depends upon expansion/contraction of the connecting portion, and therefore, there increases a tendency that the flexural deformation of each second spring portion is suppressed by the connecting portion.

In contrast, the apparatus according to the present mode, because of the substantially orthogonal interconnection between each second spring portion and the connecting portion, prevents the flexural one of deformations of each second spring portion from being suppressed by the connecting portion.

It is further added that the technological feature set forth in the present mode, i.e., the feature that spring portions are aligned orthogonally, may be practiced separately from the technological features set forth in the preceding other modes.

(22) An image forming apparatus forming an image through scan of a light beam, comprising:

a light source emitting the light beam; and a scanner, including the optical scanning apparatus according to any one of modes (1)-(21), scanning the light beam emitted from the light source, using the optical scanning apparatus.

In this image forming apparatus, the optical scanning apparatus which allows an easier concurrent achievement of a higher scan frequency and a larger scan angle, scans the light beam for forming an image.

(23) The image forming apparatus according to mode (22), wherein the scanner performs a first scan of the light beam in a first direction, and a second scan of the light beam in a second direction intersecting the first direction at a lower rate than that of the first scan, and wherein the optical scanning apparatus is employed to perform the first scan.

This image forming apparatus employs the aforementioned optical scanning apparatus for performing, using the scanner, one of two types of scans which is higher in scan rate than the other. Thus, this image forming apparatus selects one of these two types of scans which is more appropriate to be performed using the aforementioned optical scanning apparatus for improving the performance of this image forming apparatus, and employs the aforementioned optical scanning apparatus, for performing the selected type of scan.

(24) The image forming apparatus according to mode (22) or (23), further comprising an optical system directing to a retina of a viewer the light beam scanned by the scanner.

Several presently preferred embodiments of the invention will be described in detail by reference to the drawings in which like numerals are used to indicate like elements throughout.

In FIG. 1, an image forming apparatus 100 of a retinal-scanning-type including an optical scanning apparatus 1 according to a first embodiment of the invention is systematically depicted as a whole, while it is partially depicted in a block diagram.

As illustrated in FIG. 1, the image forming apparatus 100 including the optical scanning apparatus 1, which is configured to directly project an image onto the retina of the viewer, is a display device of a type which is mounted on the viewer's head in use.

As illustrated in FIG. 1, the image forming apparatus 100 includes a light source unit device 101, and a vertical scanning system 102 and a horizontal scanning system 103 each functioning as a scanner. The image forming apparatus 100 further includes relay optical systems 126 and 127, a collimator lens 122, and a beam detector 123 (which is an example of a photo sensor).

As illustrated in FIG. 1, the light source unit device 101 includes a video signal supply circuit 104; a light source drive circuit 105 connected to the video signal supply circuit 104; and a light source 106 driven by the light source drive circuit 105. The light source unit device 101 further includes a collimator optical system 107; dichroic mirrors 115, 115, and 115; a combiner optical system 116; and a BD signal detection circuit 118. The combiner optical system 116 and the collimator lens 122 are optically coupled with each other by an optical fiber 117.

As illustrated in FIG. 1, blue-, green-, and red-light-emitting-laser drivers 108, 109, and 110, all of which together constitute the light source drive circuit 105, are coupled to the video signal supply circuit 104. The video signal supply circuit 104 supplies respective per-color drive signals to the corresponding drivers 108, 109, and 110, based on a video signal entered into the video signal supply circuit 104.

As illustrated in FIG. 1, the video signal supply circuit 104, which is also coupled to a horizontal scanning drive circuit 121 of the horizontal scanning system 103 and a vertical scanning drive circuit 124 of the vertical scanning system 102, supplies a horizontal sync signal 119 and a vertical sync signals 120, both of which are for use in synchronizing the scanning operations with each other, to the corresponding drive circuits 121 and 124.

As illustrated in FIG. 1, the video signal supply circuit 104 is coupled to the BD signal detection circuit 118, to which the beam detector 123 is coupled which detects light scanned by the optical scanning apparatus 1.

The beam detector 123, upon entry thereto of the scanned light, outputs a BD signal indicative of the entry of the scanned light. The outputted BD signal is retrieved by the BD signal detection circuit 118. Using the BD signal entered from the BD signal detection circuit 118, the video signal supply circuit 104 determines, for each of a plurality of lines forming a single frame of an image to be formed, timings at which respective per-color drive signals are delivered to the corresponding drivers 108, 109, and 110 for forming the frame.

The blue-, green-, and red-light-emitting-laser drivers 108, 109, and 110 supply respective drive signals for modulating the intensity of per-color laser light, to the corresponding blue-, green-, and red-light emitting lasers 111, 112, and 113, based on the per-color drive signals which are transmitted from the video signal supply circuit 104, to thereby drive the corresponding lasers 111, 112, and 113. The blue-, green-, and red-light emitting lasers 111, 112, and 113 each generate laser light (laser beams) in the form of laser light which has corresponding wave lengths of blue, green, and red colors and which has been intensity-modulated, based on the respective drive signals from the corresponding blue-, green-, and red-light-emitting-laser drivers 108, 109, and 110.

As illustrated in FIG. 1, the collimator optical system 107 is provided with collimator lenses 114, 114, and 114. The collimator lenses 114, 114, and 114 transform the respective three-color laser lights radiated divergently from the corresponding blue-, green-, and red-light emitting lasers 111, 112, and 113, into the respective parallel lights, and direct the respective parallel lights to the corresponding dichroic mirrors 115, 115, and 115. The dichroic mirrors 115, 115, and 115 combine the three-color laser lights and guide the combined laser light into the combiner optical system 116.

The laser light, after entry into the combiner optical system 116, enters the collimator lens 122 through the optical fiber 117. The laser light radiated divergently from the tail end of the optical fiber 117 is transformed into parallel light by the collimator lens 122. The collimated laser light enters the reflective mirror 8 of the optical scanning apparatus 1 included in the horizontal scanning system 103 as a horizontal scanning device.

The optical scanning apparatus 1 is used to change the direction in which the reflective mirror 8 causes the incident light to be reflected off, thereby scanning the laser light in a horizontal direction. In the optical scanning apparatus 1, the horizontal scanning drive circuit 121, which is controlled, for performing the horizontal scanning, based on the horizontal sync signal 119 supplied from the video signal supply circuit 104, excites an oscillation of the reflective mirror 8. The laser light, which has been scanned due to the oscillation by means of the optical scanning apparatus 1, is directed via a relay optical system 126 to a reflective mirror portion 125 of the vertical scanning system 102.

The vertical scanning system 102 includes a vertical scanning drive circuit 124 which is controlled based on the vertical sync signal 120 supplied from the video signal supply circuit 104. The vertical scanning drive circuit 124 drives an actuator which is not illustrated, to thereby angularly oscillate (rotationally oscillate) the reflective mirror portion 125 in the direction denoted by the arrow in FIG. 1. As a result, the direction in which the incident laser light is reflected off the reflective mirror portion 125 is changed, whereby the reflected laser light is scanned in a vertical direction.

That is to say, in the present embodiment, laser light is two-dimensionally scanned because of the collaborative function of the optical scanning apparatus 1 of the horizontal scanning apparatus 103 and the reflective mirror portion 125 of the vertical scanning system 102. The thus-scanned laser light, upon being shaped by the relay optical system 127, enters the viewer's pupil, and is then projected directly onto the retina to form an image.

Figure 2:
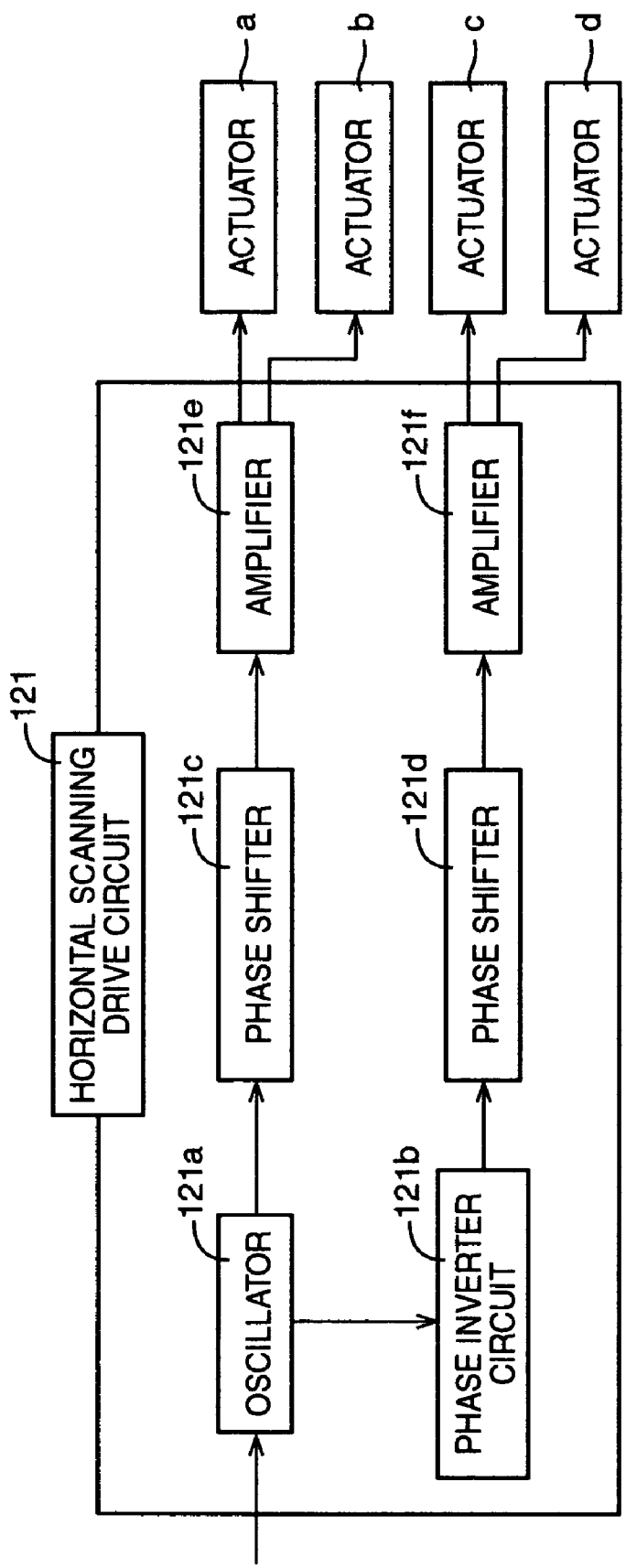
FIG. 2 is a block diagram of a horizontal scanning drive circuit 121 in FIG. 1.

In FIG. 2, the horizontal scanning drive circuit 121 of the horizontal scanning system 103 is illustrated in more detail in a block diagram. The horizontal scanning drive circuit 121 includes: an oscillator 121a; a phase inverter circuit 121b; phase shifters 121c and 121d; and amplifiers 121e and 121f.

To the oscillator 121a, the horizontal sync signal 119 is supplied from the video signal supply circuit 104 illustrated in FIG. 1. Based on the horizontal sync signal 119, the oscillator 121a generates sinusoidal wave signals which are entered into the phase inverter circuit 121b and the phase shifter 121c, respectively.

The phase shifter 121c, upon reception of the horizontal sync signal 119, generates a signal for adjusting the phase between an image signal of the video signal supply circuit 104 and the reflective mirror portion 125 of the optical scanning apparatus 1. Amplification of the generated signal by the amplifier 121e allows the drive voltage to be applied, respectively, to actuators "a" and "b," both of which are included in the optical scanning apparatus 1.

On the other hand, the phase inverter circuit 121b, upon reception of the same horizontal sync signal 119 from the amplifier 121a, supplies via the phase shifter 121d to the amplifier 121f an inverted signal which is opposite in phase to the received horizontal sync signal 119. The operations of the phase shifter 121d and the amplifier 121f in the same manner with the above case result in application of a drive voltage reflecting the inverted signal to actuators "c" and "d" included in the optical scanning apparatus 1.

In the present embodiment, a first pair of the actuators "a" and "b," and a second pair of the actuators "c" and "d" are actuated in opposite phase to each other, so that the actuators "a," "b," "c," and "d" are respectively displaced with these two pairs being opposite in instantaneous displacement-direction to each other. In the present embodiment, the first and second pairs are disposed in the optical scanning apparatus 1 in opposing relation to each other with an oscillation center-line of the reflective mirror 8 being interposed therebetween, as described below. Therefore, the opposite-phase driving of the two pairs excites the torsional oscillation of the reflective mirror 8, resultantly allowing the horizontal scanning of the laser light reflected off the reflective mirror 8.

The thus-scanned laser light is directed via the relay optical system 126 to the reflective mirror portion 125 of the vertical scanning system 102, as described above.

Figure 3:
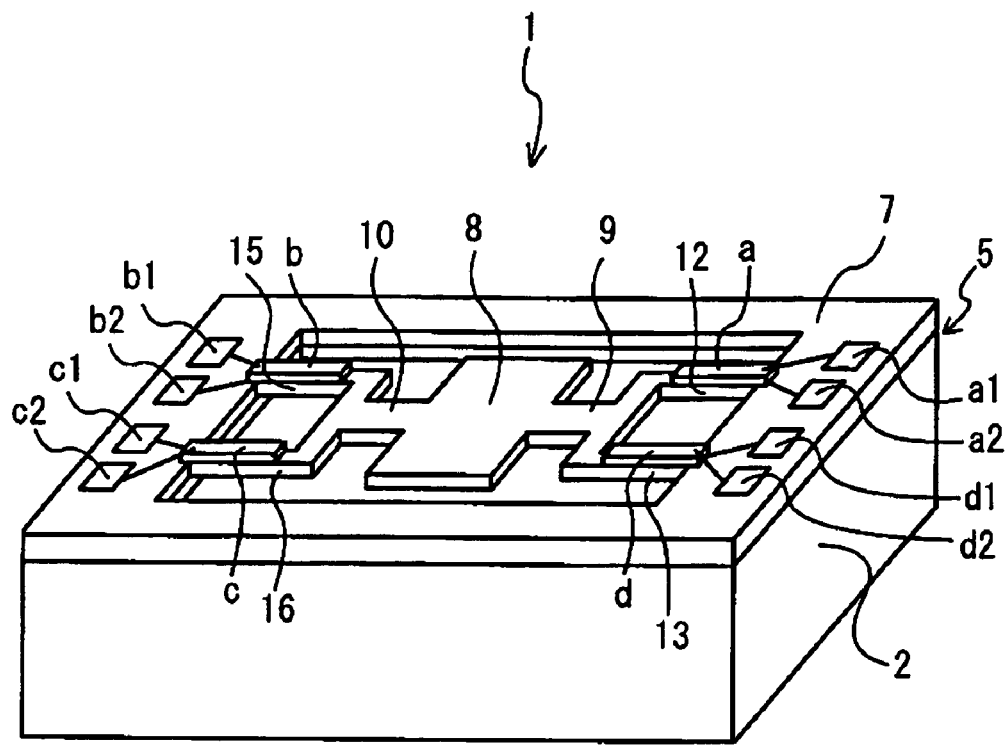
FIG. 3 is a perspective view of the optical scanning apparatus 1 in FIG. 1.

Now, the optical scanning apparatus 1 employed in the image forming apparatus 100 will be described in more detail with reference to FIGS. 3-5. FIG. 3 is a perspective view of the assembly of the optical scanning apparatus 1, FIG. 4 is an exploded perspective view of the optical scanning apparatus 1, and FIG. 5 is a perspective view for explaining the surface condition of the reflective mirror 8 of the optical scanning apparatus 1.

Figure 4:
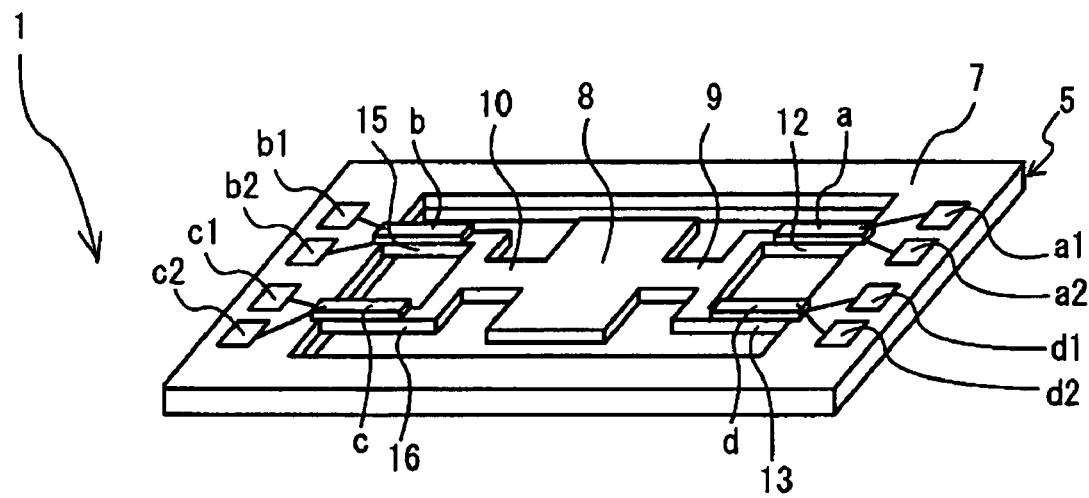
FIG. 4 is an exploded perspective view of the optical scanning apparatus 1 in FIG. 1.
Figure 4:
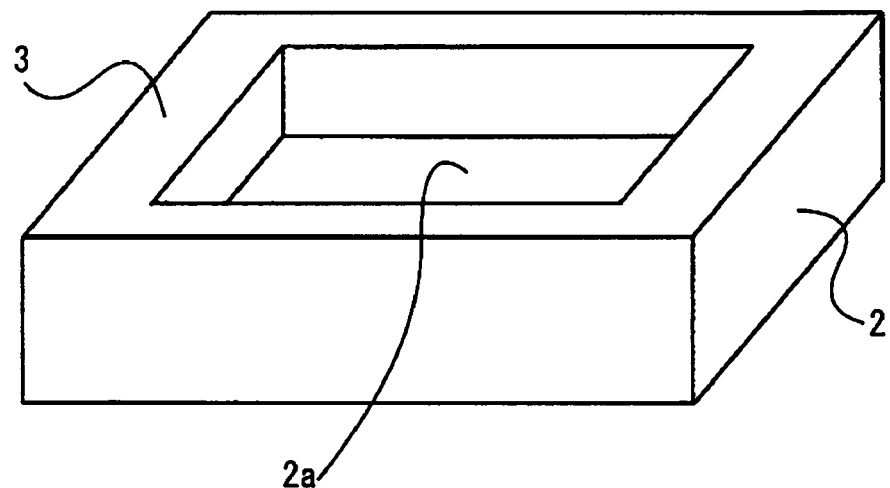
Figure 5:
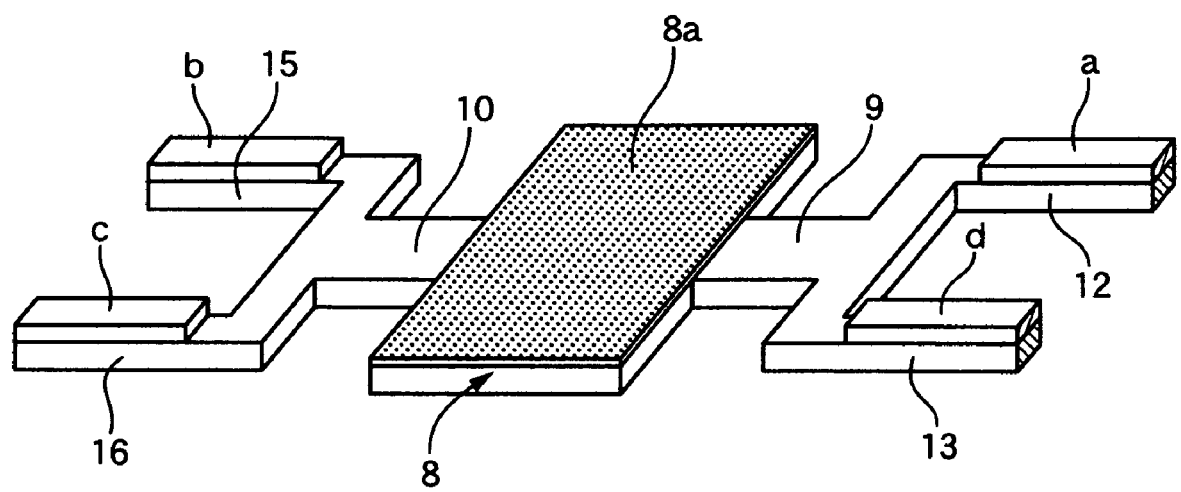
FIG. 5 is a perspective view for explaining the surface condition of a reflective mirror 8 of the optical scanning apparatus 1 in FIG. 1.

As illustrated in FIGS. 3 and 4, the optical scanning apparatus 1 includes a generally cuboidal base platform 2 in which a recess portion 2a is formed so as to be open in a center area of the top face of the base platform 2. An oscillating body 5 is secured to the base platform 2 at its top face.

The oscillating body 5 includes a fixed frame portion 7 supported on the top face of the base platform 2. Specifically, the fixed frame portion 7 is supported by a support portion 3 formed within the base platform 2 around the recess portion 2a. The top face of the support portion 3 is formed as a plane extending with the width approximately the same as that of the fixed frame portion 7 of the oscillating body 5, with a hollow in the center area of the top face of the support portion 3. As a result, there is formed in the support portion 3 a rectangular hollow frame approximate to the fixed frame portion 7.

Because the recess portion 2a is formed in the base platform 2 so as to be open at the top face of the base platform 2, the oscillating body 5, during angular oscillation (vibration), does not cause an interference with the base platform 2. The base platform 2 is made up in a miniature size, and the recess portion 20 is fabricated by for example, an etching.

Now, with reference to FIGS. 3 and 4, the oscillating body 5 will be described in more detail.

The oscillating body 5 is manufactured using as a substrate a thin and small silicon plate which has a generally rectangular shape in top view. A manufacturing method of the oscillating body 5 will be described below in more detail.

In the silicon plate, a plurality of components of the oscillating body 5 are fabricated. These components include: the reflective mirror 8; first spring portions 9 and 10 both of which are coupled to the reflective mirror 8; second spring portions 12 and 13 both of which are coupled to the first spring portion 9; second spring portions 15 and 16 both of which are coupled to the first spring portion 10; and the fixed frame portion 7 to which the second spring portions 12, 13, 15, and 16 are coupled.

These components are fabricated on the silicon plate by an etching. In the present embodiment, the oscillating body 5 is constructed by an integral or monolithic fabrication of these components.

As illustrated in FIGS. 3 and 4, the reflective mirror 8, rectangular- or square-shaped, is disposed approximately in the center of the oscillating body 5. The reflective mirror 8 is oscillated about an oscillation axis extending laterally in FIGS. 3 and 4, to thereby change the direction in which the reflective mirror 8 causes the incident light to be reflected off.

In the oscillating body 5, there is arranged on one side of the reflective mirror 8 a first combined body which is constructed by coupling the first spring portion 9 and the two second spring portions 12 and 13, with the first spring portion 9 being bifurcated in parallel branch to form the two second spring portions 12 and 13. Similarly, there is arranged on the other side of the reflective mirror 8 a second combined body which is constructed by coupling the first spring portion 10 and the two second spring portions 15 and 16, with the first spring portion 10 being bifurcated in parallel branch to form the two second spring portions 15 and 16. These first and second combined bodies are disposed in such a relative relation in position that these bodies are symmetrical with respect to the position of the reflective mirror 8.

In the first combined body, the two second spring portions 12 and 13, both disposed on one side of the reflective mirror 8, are opposed to each other with the oscillation axis being interposed therebetween. Similarly, in the second combined body, the two second spring portions 15 and 16, both disposed on the other side of the reflective mirror 8, are opposed to each other with the oscillation axis being interposed therebetween. The actuators "a" and "d" are secured, respectively, to the two second spring portions 12 and 13, both of which belong to the first combined body, while the actuators "b" and "c" are secured, respectively, to the two second spring portions 15 and 16, both of which belong to the second combined body.

As illustrated in FIG. 5, a reflective surface 8a is formed on the surface of the reflective mirror 8, to thereby achieve an enhanced reflectivity of the reflective mirror 8. A vibrational frequency in operation of the reflective mirror 8 for optical scan, namely, an operational vibrational frequency is preferably set to be approximately equal to a resonance frequency of the reflective mirror 8, for steadying the vibrational state of the reflective mirror 8.

As illustrated in FIGS. 3 and 4, the first spring portions 9 and 10, and the second spring portions 12, 13, 15, and 16 are provided to support the reflective mirror 8 disposed in the approximate center area of the fixed frame portion 7 in a manner allowing the torsional oscillation of the reflective mirror 8.

Specifically, as is evident from the above description, the first spring portions 9 and 10, each of which is coupled at its one end to a corresponding one of opposite edges of the reflective mirror 8 at its centered position in a width direction thereof, are excited to oscillate (repeat torsional distortions) about the oscillation axis.

The geometrical features, such as a shape and an orientation of each second spring portion 12, 13, 15, 16, are previously determined so as to allow each second spring portion 12, 13, 15, 16 to exhibit a torsional oscillation (repeat of torsional distortions) about its own centerline (longitudinal axis) and to exhibit, concurrently with that, a flexural oscillation (repeat of flexural distortions) perpendicular to the plane of plate of each second spring portion 12, 13, 15, 16.

The two second spring portions 12 and 13, both coupled to the remaining end of the first spring portion 9, are arranged in a bifurcation manner allowing the first spring portion 9 to be bifurcated to form the second spring portions 12 and 13 so as to leave a spacing which is larger than the width of the first spring portion 9. As can be clearly seen from FIGS. 3 and 4, the two second spring portions 12 and 13 are opposed to and spaced apart from each other, such that a gap extending along the oscillation axis with the width larger than that of the first spring portion 9, is interposed between the two second spring portions 12 and 13. Each of the two second spring portions 12 and 13 is coupled at its one end to the first spring portion 9 at the aforementioned remaining end, while coupled at its other end to the fixed frame portion 7.

Similarly, the two second spring portions 15 and 16, both coupled to a remaining end of the first spring portion 10, are arranged in a bifurcation manner allowing the first spring portion 10 to be bifurcated to form the second spring portions 15 and 16 so as to leave a spacing which is larger than the width of the first spring portion 10. As can be clearly seen from FIGS. 3 and 4, the two second spring portions 15 and 16 are opposed to and spaced apart from each other, such that a gap extending along the oscillation axis with the width larger than that of the first spring portion 10, is interposed between the two second spring portions 15 and 16. Each of the two second spring portions 15 and 16 is coupled at its one end to the first spring portion 10 at the aforementioned remaining end, while coupled at its other end to the fixed frame portion 7.

Summarizing the above, in the present embodiment, the first spring portions 9 and 10 directly support the reflective mirror 8 on both sides thereof, while the second spring portions 12 and 13 indirectly support the reflective mirror 8 via the first spring portion 9, and the second spring portions 15 and 16 via the first spring portion 10.

As described above, the two second spring portions 12 and 13 are arranged in a bifurcation manner allowing the first spring portion 9 to be bifurcated so as to leave a spacing which is larger in width than the first spring portion 9, and similarly, the two second spring portions 15 and 16 are arranged in a bifurcation manner allowing the first spring portion 10 to be bifurcated so as to leave a spacing which is larger in width than the first spring portion 10.

Figure 24:
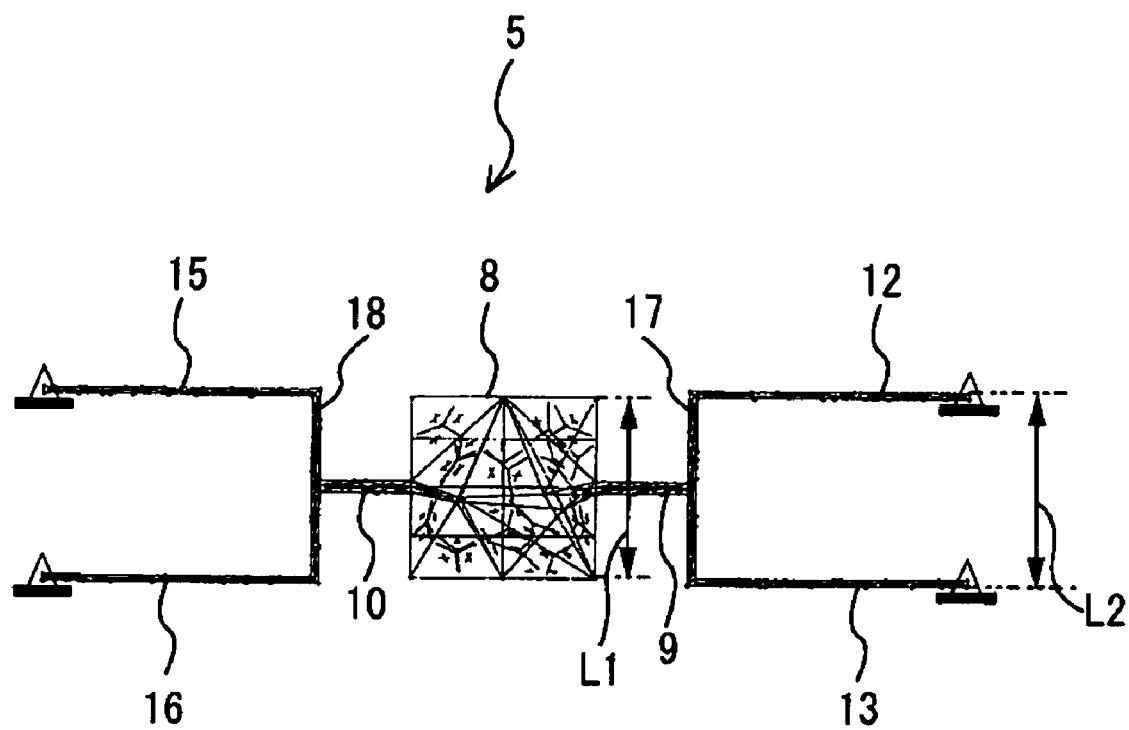
FIG. 24 is a front view schematically illustrating a model for use in numerical analysis, under a second numerical analysis condition, of vibrational characteristics of the oscillating body 5 in the first and second embodiments.

In the description, the width of each first spring portion 9, 10 is denoted as "W," while the bifurcation spacing of the first pair of the second spring portions 12 and 13, and the bifurcation spacing of the second pair of the second spring portions 15 and 16 are denoted, respectively, as "D." Further, the bifurcation distances "D" are defined, similarly with "L2" illustrated in FIG. 24, to indicate the distance between outer edges of the first pair of the second spring portions 12 and 13, and the distance between outer edges of the second pair of the second spring portions 15 and 16, respectively. By the definition, the bifurcation spacing "D" is preferably set to be a value approximately ten times the width "W" (for the oscillating body 5 illustrated in FIG. 24), a value of from approximately nine times to approximately eleven times the width "W", a value of from approximately eight times to approximately twelve times the width "W", or a value of from approximately twice to approximately fifteen times the width "W."

As illustrated in FIGS. 3 and 4, each of the second spring portions 12 and 13, in the form of an L-shaped or inverted L-shaped in top view, is coupled at its one end to the first spring portion 9 approximately at a right angle thereto, while coupled at its other end to the fixed frame portion 7 approximately at a right angle thereto. Similarly, each of the second spring portions 15 and 16, in the form of an L-shaped or inverted L-shaped in top view, is coupled at its one end to the first spring portion 10 approximately at a right angle thereto, while coupled at its other end to the fixed frame portion 7 approximately at a right angle thereto.

As described above, in the present embodiment, the two second spring portions 12 and 13 are integrally coupled to the single first spring portion 9, and similarly, the two second spring portions 15 and 16 are integrally coupled to the single first spring portion 10. The first spring portions 9 and 10 are disposed on a line (the aforementioned oscillation axis) passing through the gravity center of the reflective mirror 8, while the second spring portions 12 and 13 are disposed symmetrically with respect to the line. Similarly, the second spring portions 15 and 16 are disposed symmetrically with respect to the line.

Therefore, the present embodiment, because of the aforementioned construction of the first spring portions 9 and 10 and the second spring portions 12, 13, 15, and 16, allows stresses acting on the oscillating body 5 during the torsional oscillation of the reflective mirror 8 for optical scan, to be distributed over the entire oscillating body 5, resulting in facilitation of, for example, relieving stresses acting on interconnections between the second spring portions 12, 13, 15, and 16, and the fixed frame portion 7.

Accordingly, the present embodiment makes it easier to achieve an adequately large torsion angle or scan angle while ensuring the resonant frequency or scan frequency of the reflective mirror 8, without requiring excessive increase in thickness and length of the spring portions 9, 10, 12, 13, 15, and 16 for withstanding stresses acting thereon.

As a result, the present embodiment makes it easier to together achieve a higher scan frequency and a larger scan angle while downsizing the optical scanning apparatus 1 and eventually the imaging forming apparatus 100 equipped with the optical scanning apparatus 1.

Further, the present embodiment, owing to its capability of accomplishing the expected purposes while suppressing increases in size of the spring portions 9, 10, 12, 13, 15, and 16, makes it easier to prevent undesired vibrational modes, namely, vibrational modes other than the torsional vibrational modes, from being produced in the reflective mirror 8 due to increases in size of the spring portions 9, 10, 12, 13, 15, and 16.

It is added that, in the present embodiment, the aforementioned first and second combined bodies of the oscillating body 5 are each constructed with one first spring portion and two second spring portions, and it is possibly viewed that each of the two second spring portions is constructed by integrally forming both an original second spring portion, and a connecting portion which connects the original second spring portion to the one first spring portion.

Under the latter view, in FIG. 3, for example, one of first and second straight portions orthogonal to each other for forming the second spring portion 12, which is coupled orthogonally to the first spring portion 9, namely, the first straight portion, constitutes an example of the aforementioned connecting portion. The connecting portion is coupled orthogonally to both the first spring portion 9 and the second straight portion of the second spring portion 12, respectively.

Furthermore, in the present embodiment, there are mounted to all the second spring portions 12, 13, 15, and 16, the actuators "a," "d," "b," and "c," respectively, so as not to extend to the first straight portions, thereby preventing the actuators "a," "b," "c," and "d" from interfering with the torsional and flexural oscillations of the first straight portions.

As illustrated in FIG. 4, the fixed frame portion 7 has the function of supporting the second spring portions 12, 13, 15, and 16 connected to the first spring portions 9 and 10 each coupled to the reflective mirror 8; and the function of affixing the oscillating body 5 to the base platform 2. Specifically, the fixed frame portion 7 is affixed at its bottom face to the support portion 3 of the base platform 2.

Now, a manufacturing method of the oscillating body 5 will be described below in detail.

To fabricate the oscillating body 5 having the construction described above, a silicon wafer, for example, is patterned to define the oscillating body 5 comprised of the reflective mirror 8; the first spring portions 9 and 10; and the second spring portions 12, 13, 15, and 16, and then, the patterned silicon wafer is etched for integrally fabricating the oscillating body 5. Thereafter, as illustrated in FIG. 5, the reflective surface 8a made up of a material, such as gold, chrome, platinum, or aluminum is formed on the surface of an area in which the reflective mirror 8 is expected to be formed, resulting in completion of the oscillating body 5. This manufacturing method allows a plurality of the oscillating bodies 5 identical in configuration to be manufactured at one time.

Figure 6:
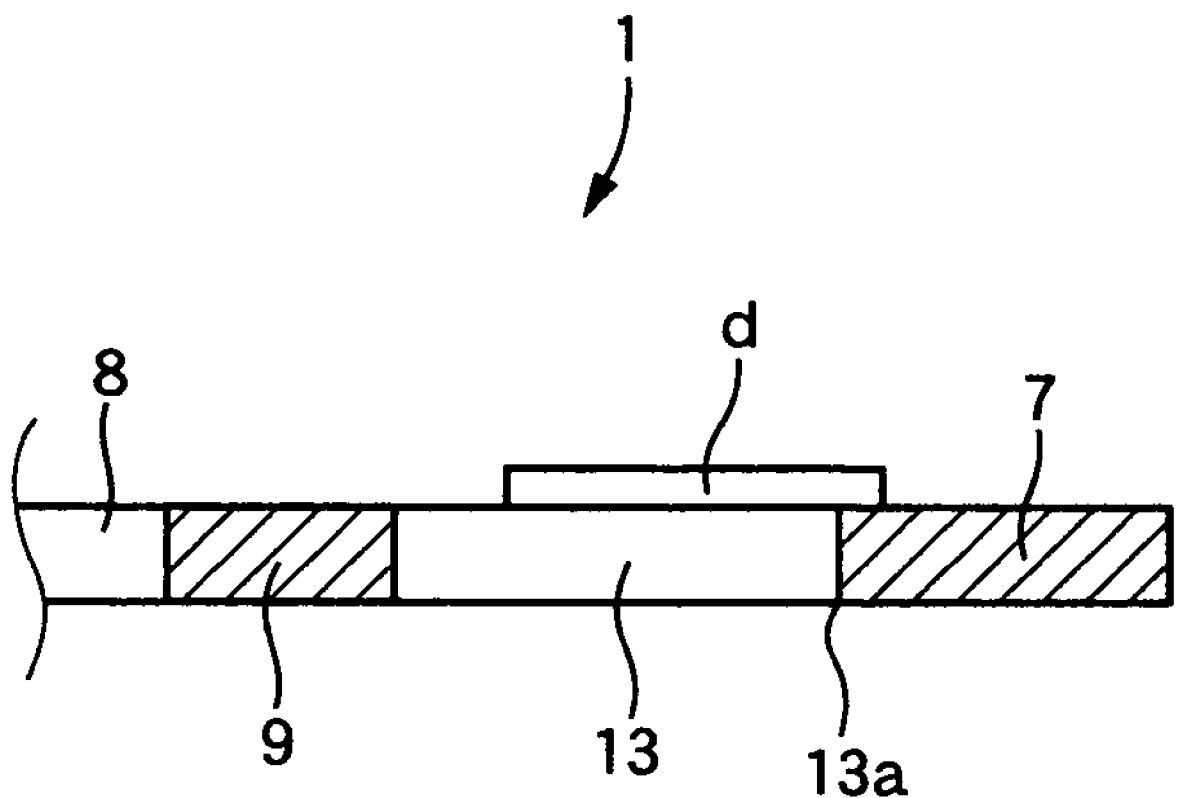
FIG. 6 is a partial side view illustrating an oscillating body 5 in FIG. 4, which is taken in the width direction of the oscillating body 5.
Figure 7:
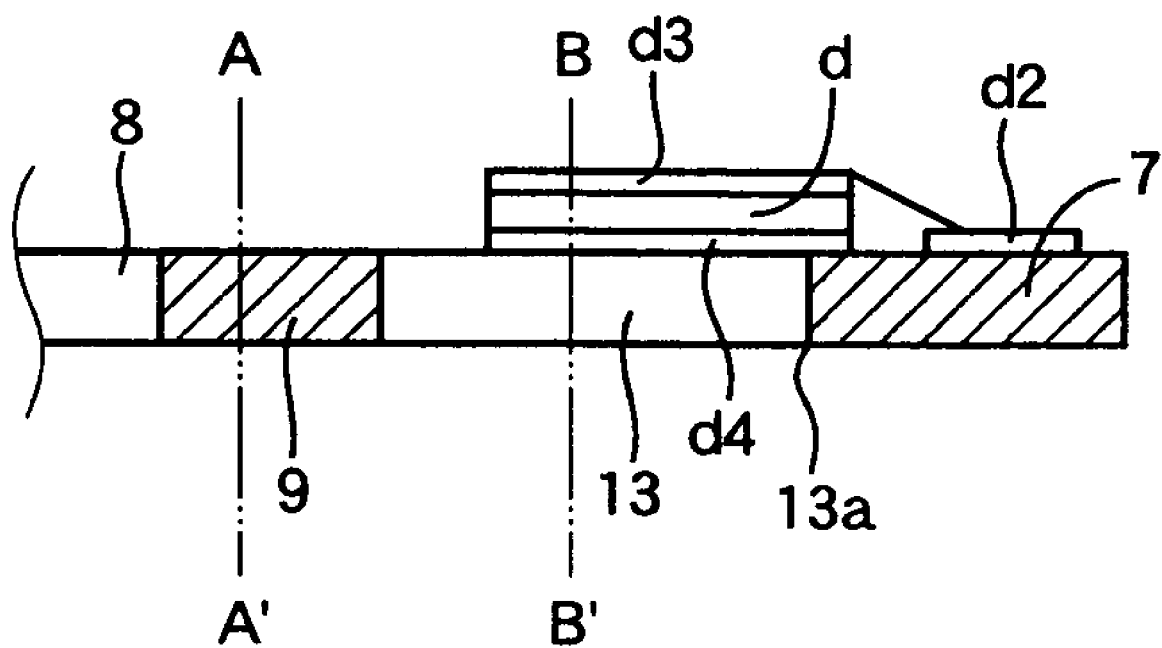
FIG. 7 is a partial side view illustrating the oscillating body 5 in FIG. 4, which is taken in the width direction of the oscillating body 5, and illustrating in detail the construction of an actuator "d" in FIG. 4.

Next, a formation method of the actuators "a," "b," "c," and "d" will be described below in detail with reference to FIGS. 3, 4, 6, and 7. FIG. 6 is a partial side view illustrating the oscillating body 5 taken in the width direction, and FIG. 7 is a partial side view illustrating partially the oscillating body 5 taken in the width direction, and illustrating the construction of a representative actuator "d" in detail.

As illustrated in FIGS. 3 and 4, the actuators "a," "b," "c," and "d" are formed directly on the second spring portions 12, 15, 16, and 13, respectively.

The actuators "a," "b," "c," and "d" are each constructed with a piezoelectric material, such as PZT, ZnO, or BST. Owing to the piezoelectric material being higher in electro-mechanical-conversion-efficiency, the fabrication of the actuators "a," "b," "c," and "d" with the piezoelectric material facilitates reduction in power consumption. As is well known, the piezoelectric material, upon application thereto of alternating voltages at a predetermined frequency, expands and contracts repeatedly at the same frequency as the voltage frequency of the piezoelectric material, resulting in vibration of the piezoelectric material.

For fabricating the actuators "a," "b," "c," and "d" using a piezoelectric material, such as PZT, ZnO, and BST, there are employed thin films process methods including CVD, sputtering, hydrothermal method, sol-gel method, powder spray coating method, etc., by which the actuators "a," "b," "c," and "d" are formed directly on the second spring portions 12, 15, 16, and 13, respectively.

In the present embodiment, as illustrated in FIGS. 3, 4, 6, and 7, the actuators "a," "b," "c," and "d" are mounted on the oscillating body 5 so as to extend between the top faces of the corresponding second spring portions 12, 15, 16, and 13, and the top face of the fixed frame portion 7. Specifically, as illustrated in FIGS. 6 and 7, the representative actuator "d" is mounted on the oscillating body 5 in an arrangement in which the representative actuator "d" passes over a fixed end portion 13a in which the second spring portion 13 and the fixed frame portion 7 are interconnected.

As illustrated in FIGS. 3 and 4, there are formed onto the fixed frame portion 7, input terminals "a1" and "a2" for allowing a drive voltage application to the actuator "a;" input terminals "b1" and "b2" for allowing a drive voltage application to the actuator "b;" input terminals "c1" and "c2" for allowing a drive voltage application to the actuator "c;" and input terminals "d1" and "d2" for allowing a drive voltage application to the actuator "d," each of which terminals is formed of a metal thin film.

In the present embodiment, in view of the fact that a material of the oscillating body 5, once being thinned in thickness, allows its larger deformation despite of its higher fragility, the oscillating body 5 is constructed such that the total of the thicknesses of the actuators "a," "b," "c," and "d," and the second spring portions 12, 15, 16, and 13 smaller than or is equal to 200 µm.

Now, the constructions of the actuators "a," "c," and "d" will be described in more detail, by way of example of the actuator "d," with reference to FIG. 7.

As illustrated in FIG. 7, the actuator "d" is formed so as to extend from the second spring portion 13 to the fixed frame portion 7. The actuator "d" is sandwiched between paired electrodes "d3" and "d4" opposed to each other in a width direction of the actuator "d," thereby forming a sandwich structure. In FIG. 7, the lower electrode "d4" is disposed on a lower side of the actuator "d," while the upper electrode "d3" on an upper side of the actuator "d."

As illustrated in FIGS. 3, 4, and 7, the upper electrode "d3" is connected to the input terminal "d2", while the lower electrode "d4," as illustrated in FIGS. 3 and 4, is connected to the input terminal "d1."

It is added that, in the present embodiment, the paired electrodes "d3" and "d4" are attached integrally to each actuator "a," "b," "c," "d," and therefore, a laminated body in the form of a sandwich of each actuator "a," "b," "c," "d" between the paired electrodes "d3" and "d4" may be regarded as an actuator in terms of strength of materials.

Next, there will be described the relationship in rigidity existing between the first spring portions 9 and 10, and elastically deformable portions of the second spring portions 12, 13, 15, and 16, by way of example of a combination of the first spring portion 9 and the second spring portion 13, with reference to FIGS. 5 and 7.

In the present embodiment, the elastically deformable portion of each second spring portion 12, 13, 15, 16 principally means an assembly of each second spring portion 12, 13, 15, 16 and one of the actuators "a," "d," "b," and "c" to which each second spring portion 12, 13, 15, 16 has been secured. In addition, the rigidity means a deformation resistance against external force, and more specifically, the rigidity means, for the first spring portions 9 and 10, a torsional rigidity, and, for the elastically deformable portion, both a torsional rigidity and a flexural rigidity.

For an example illustrated in FIG. 7, there are first mutually compared, the second moment of area (or second moment of the cross-section) of the first spring portion 9 (second moment of area with respect to an A-A' cross-section illustrated in FIG. 7), and the second moment of area of the second spring portion 13 (second moment of area with respect to a B-B' cross-section illustrated in FIG. 7). These first spring portion 9 and second spring portion 13 are identical in thickness. However, as illustrated in FIG. 5, the first spring portion 9 is larger in width than the second spring portion 13.

Figure 10:
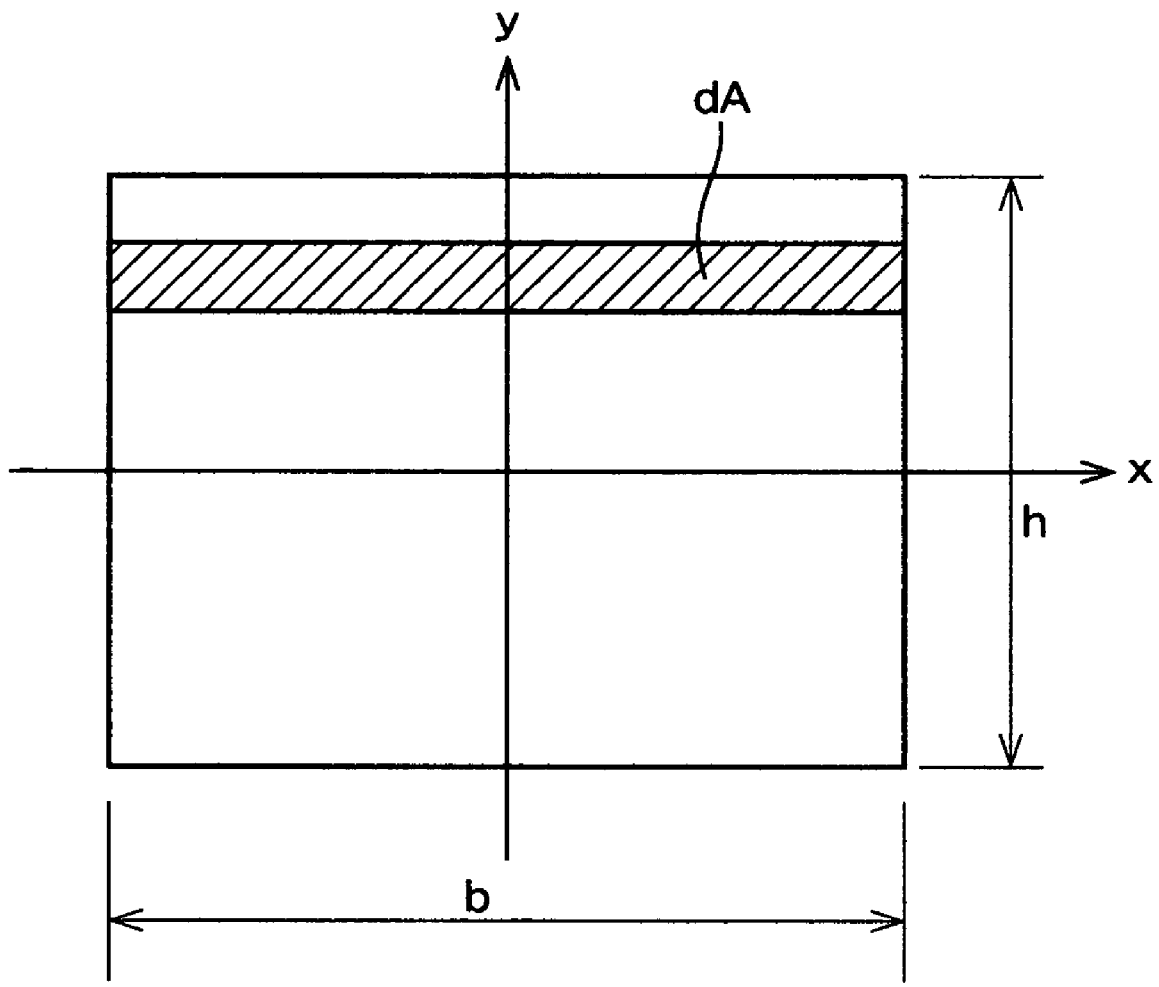
FIG. 10 is a sectional view for explaining the calculation of a second moment of area for a member having a rectangular section.

On the other hand, as illustrated in FIG. 10, for a beam member of rectangular cross section which has a thickness dimension "h" and a width dimension "b," both the flexural rigidity and the torsional rigidity increase with increase in width dimension "b," and eventually the deformation resistance against external force increases with increase in width dimension "b," provided that the thickness dimension "h" is held constant, in general. The flexural rigidity of this beam member is represented in terms of the product of the modulus of longitudinal elasticity "E" and the moment "Iz" of inertia of area, and specifically, the flexural rigidity is expressed as:

$$Ebh^3/12.$$

On the other hand, the torsional rigidity is approximately expressed as the following, provided that the thickness dimension "h" is far smaller than the width dimension "b," with the modulus of transverse elasticity being denoted as "G:"

$$Gbh^3/3.$$

In FIG. 10, the "dA" represents an infinitesimal area element spaced distance "y" apart from a neutral axis (coincident with an x-axis) of the beam member.

Therefore, in the present embodiment, the second spring portion 13 is smaller in second moment of area than the first spring portion 9.

On the other hand, in the present embodiment, such a relationship in second moment of area is derived from the pre-selection of the width dimension of the second spring portion 13 as being smaller than the width dimension of the first spring portion 9. In addition, as described above, for the beam member of rectangular cross section, the calculation equation for the flexural rigidity and the calculation equation for the torsional rigidity each contain the term "bh³," meaning that the smaller the width of the beam member, the lower both the flexural rigidity and the torsional rigidity.

Therefore, in the present embodiment, the second spring portion 13 is more easily elastically torsionally deformable than the first spring portion 9. In the present embodiment, although the first spring portion 9 is not basically subjected to a flexural deformation, it can be concluded that the second spring portion 13 is more easily elastically deformable than the first spring portion 9, irrespective of the type of deformation.

Further, in the present embodiment, the second spring portion 13 and the actuator "d" are pre-selected with respect to cross section shape and modulus of elasticity, so that the laminated body made up of the second spring portion 13 and the actuator "d," namely, the elastically deformable portion can be smaller in second moment of area than the first spring portion 9.

As a result, in the present embodiment, the flexural deformation and the torsional deformation of each elastically deformable portion (laminated body made up of the one second spring portion and the corresponding actuator) occur more easily than the torsional deformation of the first spring portion 9.

On the other hand, in the present embodiment, the oscillation angle or scan angle of the reflective mirror 8 corresponds to the combination of the amount of the torsional deformation of the first spring portion 9 and the amounts of the torsional and flexural deformations of the elastically deformable portion.

Therefore, the present embodiment, because of the fact that the elastically deformable portion which is thus easily deformable is employed in combination with the first spring portion 9, makes it easier to increase the scan angle of the reflective mirror 8, when compared with the case where such an elastically deformable portion is absent.

Further, the present embodiment, due to the fact that the first spring portion 9 is couple to the fixed frame portion 7 via the elastically deformable portion which is more easily deformable than the first spring portion 9, also makes it easier to relieve stresses acting on the first spring portion 9 during oscillation of the reflective mirror 8.

Figure 8:
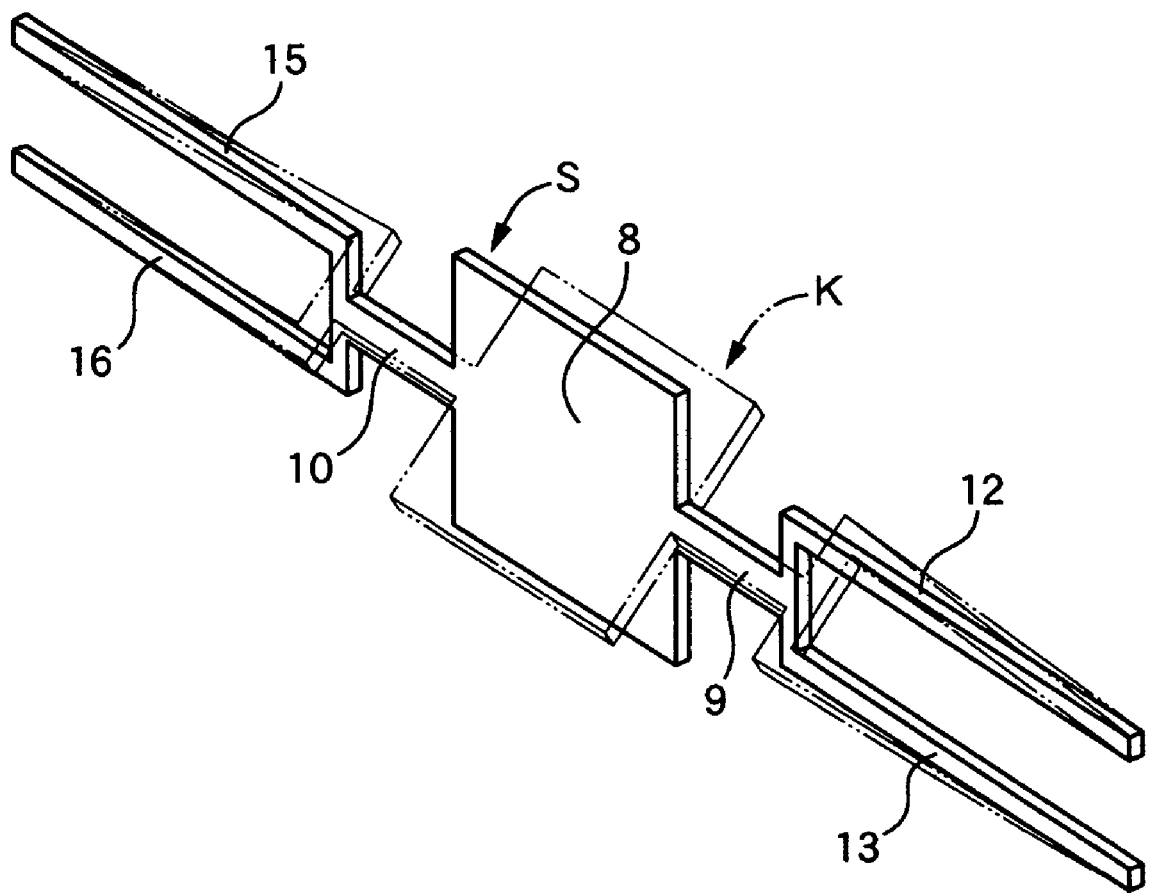
FIG. 8 is a perspective view illustrating the oscillating body 5 in FIG. 4 in a resonant mode.

Next, the operation of the thus-constructed optical scanning apparatus 1 will be described with reference to FIGS. 1-3 and 8. FIG. 8 is a perspective view illustrating the oscillating body 5 in a resonant state.

The horizontal sync signal 119 is delivered from the video signal supply circuit 104 illustrated in FIG. 1 to the optical scanning apparatus 1, and the delivered horizontal sync signal 119 is entered into the oscillator 121a of the horizontal scanning drive circuit 121 illustrated in FIG. 2, wherein the oscillator 121a produces a sinusoidal signal based on the horizontal sync signal 119. The produced sinusoidal signal is entered into the phase inverter circuit 121b and the phase shifter 121c, respectively.

Upon reception of the sinusoidal signal, the phase shifter 121c produces a signal allowing adjustment of the phase between the image signal and the reflective mirror 8, and cooperates with the amplifier 121e, based on the produced signal, to supply a drive voltage via the input terminals "a1" and "a2" to the actuator "a" formed on the second spring portion 12. Further, identically in phase to the drive voltage, a drive voltage is supplied via the input terminals "b1" and "b2" to the actuator "b" formed on the second spring portion 15.

In contrast, the phase inverter circuit 121b, upon reception of the aforementioned sinusoidal signal, inverts the phase of the received sinusoidal signal, and supplies the thus-inverted sinusoidal signal to the phase shifter 121d. The phase shifter 121d produces a signal allowing adjustment of the phase between the image signal and the reflective mirror 8, and cooperates with the amplifier 121f, based on the produced signal, to supply a drive voltage via the input terminals "d1" and "d2" to the actuator "d" formed on the second spring portion 13. Further, identically in phase to the drive voltage, a drive voltage is supplied via the input terminals "c1" and "c2" to the actuator "c" formed on the second spring portion 16.

Therefore, expansion of each actuator "a," "b," which is attached to each second spring portion 12, 15 at its one side face, causes downward flexure of each second spring portion 12, 15 as viewed in FIG. 3. Expansion occurring concurrently with the expansion of each actuator "a," "b," of each actuator "c," "d," which is attached to each second spring portion 13, 16 at its one side face, causes upward flexure of each second spring portion 13, 16 as viewed in FIG. 3.

Further, the upward flexures of the actuators "a" and "b" cause upward flexures of the second spring portions 12 and 15, and the concurrent downward flexures of the actuators "c" and "d" cause downward flexures of the second spring portions 13 and 16.

Thus, in the present embodiment, the horizontal scanning drive circuit 121 is operated based on the horizontal sync signal 119 supplied from the video signal supply circuit 104 illustrated in FIG. 1, to oscillate drive voltages to be applied to the actuators "a" and "b" and the actuators "c" and "d," respectively, at the same frequencies as the resonant frequency of the reflective mirror 8, in opposite phase to each other.

As a result, the second spring portions 12 and 15 and the second spring portions 13 and 16 are flexed in the oscillating body 5 in the respective bending directions opposite to each other, resulting in the resonance motion of the oscillating body 5 at its resonant frequency. Due to the resonance motion, the reflective mirror 8 supported by the first spring portions 9 and 10 repeats an oscillation between a neutral position (stationary position) "S" and a maximum angular oscillation position (maximum displacement position) "K" during resonance motion, as illustrated in FIG. 8, resulting in the horizontal scan of the laser light entered into and then reflected from the reflective mirror 8.

As illustrated in FIG. 1, the laser light which has been horizontally scanned by the reflective mirror 8 is directed to a reflective mirror portion 125 of the vertical scanning system 102, via a relay optical system 126. The laser light, upon entry into the reflective mirror portion 125, is vertically scanned by the vertical scanning system 102. The vertically scanned laser light, upon being shaped in beam configuration by a relay optical system 127, enters the pupil of the viewer, and eventually an image is projected directly onto the retina.

As described above, in the present embodiment, the oscillating body 5 is configured such that each of the second spring portion 12 on which the actuator "a" is formed, and the second spring portion 13 on which the actuator "d" is formed, is smaller in second moment of area than the first spring portion 9. The oscillating body 5 is further configured such that each of the second spring portion 15 on which the actuator "b" is formed, and the second spring portion 16 on which the actuator "c" is formed, is smaller in second moment of area than the first spring portion 10.

Therefore, the present embodiment allows the actuators "a," "b," "c," and "d" and the second spring portions 12, 15, 16, and 13 to be relatively easily deformable, and allows their deformations to be ultimately reflected in the torsion or angular oscillation of the reflecting mirror 8, resulting in an easier achievement of an increased scan angle (oscillation angle) of the reflective mirror 8.

Further, in the present embodiment, the actuators "a," "b," "c," and "d" are formed directly on the second spring portions 12, 15, 16, and 13, by the thin films process method. Therefore, the present embodiment does not require an intervening adhesive layer made up of synthetic resin, etc. between each actuator "a," "b," "c," "d" and each second spring portion 12, 15, 16, 13. Accordingly, the present embodiment achieves a stabilized connection between each actuator "a," "b," "c," "d" and each second spring portion 12, 15, 16, 13, and additionally a stabilized vibrational state of the oscillating body 5.

Still further, the present embodiment, because of the fact that the oscillating 5 employs a mechanism for amplifying the vibrations of the actuators "a," "b," "c," and "d," makes it easier to reduce power consumption required for oscillating the reflective mirror 8 at a given scan frequency through a given scan angle.

Additionally, in the present embodiment, each actuator "a," "b," "c," "d" is mounted directly on each second spring portion 12, 15, 16, 13, allowing coincidence in position between the elastically deformable portion and a source of vibration. Therefore, the present embodiment facilitates an efficient transmission of the vibration of each actuator "a," "b," "c," "d" to the oscillating body 5, resulting in an easier achievement of reduction in power consumption and downsizing of the optical scanning apparatus 1.

Still additionally, in the present embodiment, each actuator "a," "b," "c," "d" is formed on the oscillating body 5 so as to extend from each second spring portion 12, 15, 16, 13 to the fixed frame portion 7, as illustrated in FIG. 6. Therefore, the present embodiment allows a vibrational node of the oscillating body 5 to be stably located in the fixed end portion 13a, and allows the oscillatory state of the oscillating body 5 to be stabilized so as to exhibit an idealized resonant oscillatory state.

Figure 9:
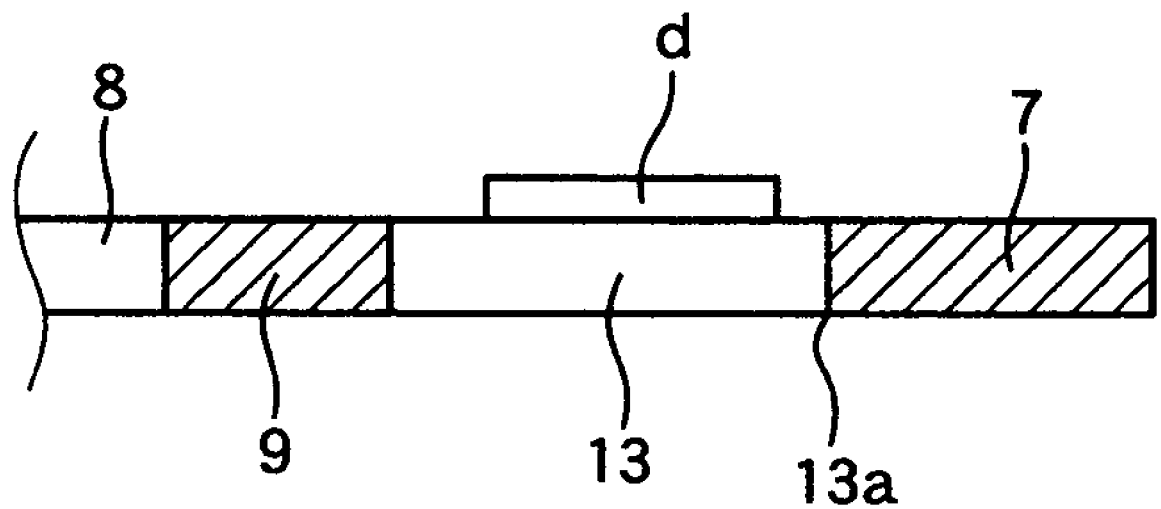
FIG. 9 is a partial side view illustrating a comparative example for a second spring portion 13 in FIG. 5.

Therefore, the present embodiment easily achieves a stabilized vibrational state of the oscillating body 5, as compared with the case where each actuator "a," "b," "c," "d" is formed only on the second spring portions 12, 15, 16, 13 so as not to extend to the fixed frame portion 7, as illustrated in FIG. 9.

Next, a second embodiment of the present invention will be described. However, in view of the fact that the present embodiment includes many common components to those of the first embodiment, the common components of the present embodiment will be omitted in the detailed description, with the common components being referred to by the identical reference numerals or names, while only distinct components of the present embodiment will be described in greater detail.

Figure 11:
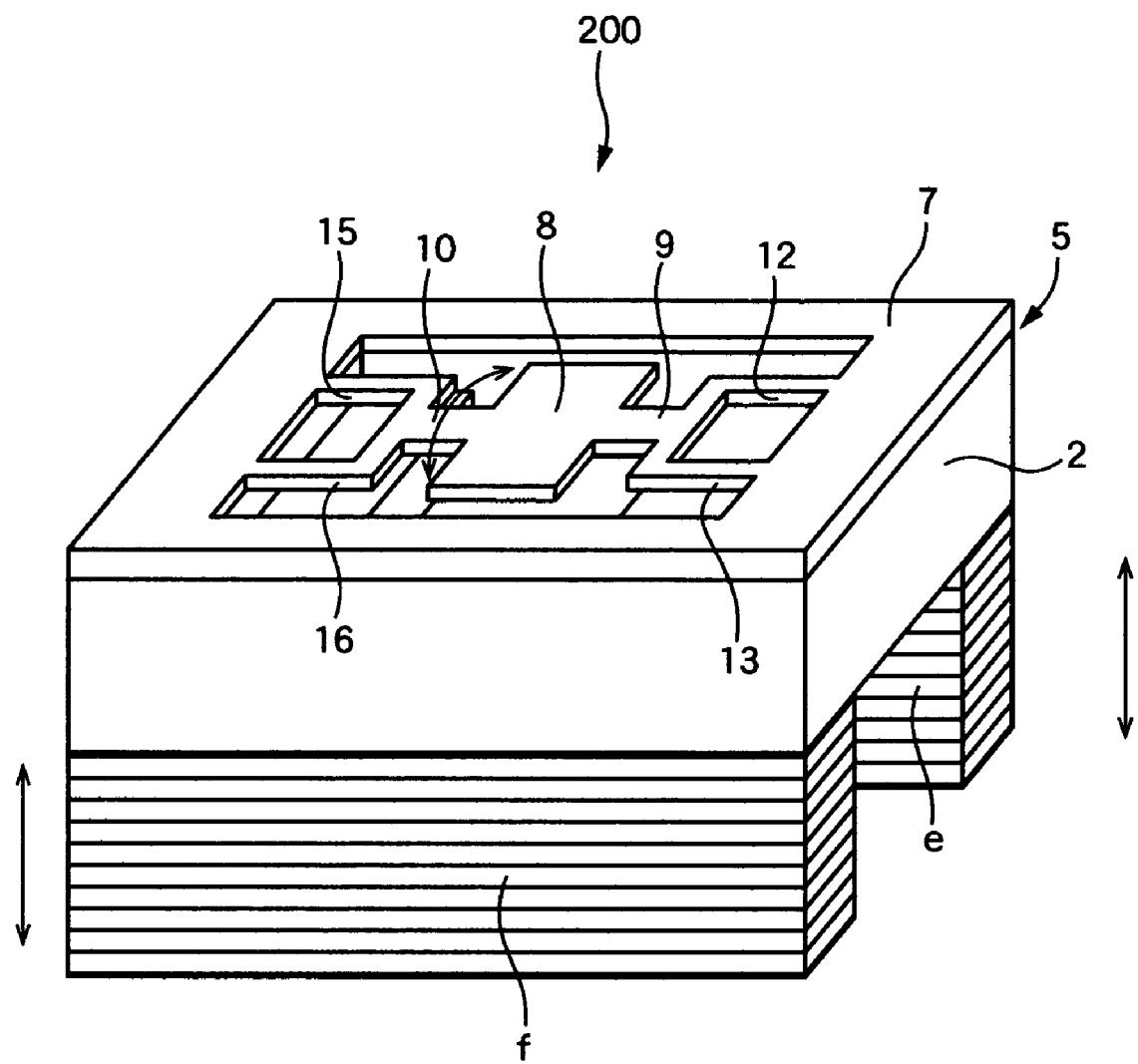
FIG. 11 is a perspective view illustrating an optical scanning apparatus 200 constructed according to a second embodiment of the present invention.
Figure 12:
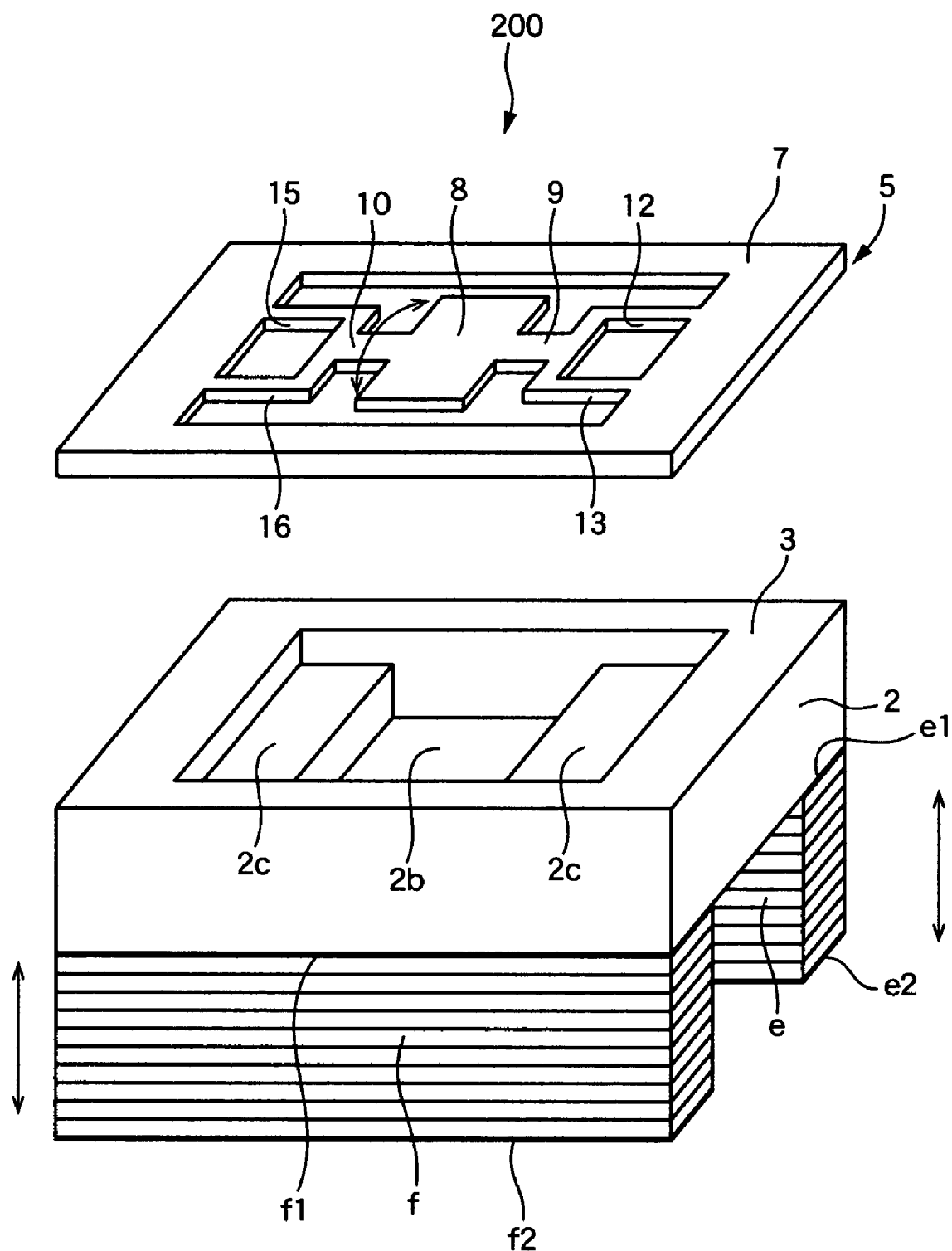
FIG. 12 is an exploded perspective view illustrating the optical scanning apparatus 200 illustrated in FIG. 11.

As illustrated in FIG. 11, an optical scanning apparatus 200 according to the present embodiment includes, as components common in construction to the optical scanning apparatus 1 according to the first embodiment, the base platform 2 and the oscillating body 5, wherein the support portion 3 is formed on the base platform 2 in a similar manner with the first embodiment, as illustrated in FIG. 12. In the present embodiment, as illustrated in FIG. 11, the oscillating body 5 includes, similarly with the first embodiment, the fixed frame portion 7; the reflective mirror 8; the first spring portions 9 and 10; and the second spring portions 12, 13, 15, and 16.

As illustrated in FIG. 3, the first embodiment is configured such that the vibrations of the actuators "a," "b," "c," and "d" are transferred directly to the oscillating body 5. That is to say, the oscillating body 5 is vibrated directly by the actuators "a," "b," "c," and "d."

In contrast, the optical scanning apparatus 200 according to the present embodiment is configured such that, as illustrated in FIG. 11, the oscillating body 5 is vibrated indirectly by the actuators "e" and "f." That is to say, the optical scanning apparatus 200 is adapted to be entirely vibrated.

As illustrated in FIG. 11, in the present embodiment, the actuators "e" and "f" are secured to the base platform 2 at its bottom face by adhesion. These two actuators "e" and "f" are disposed at respective two positions opposing to each other in the width direction of the base platform 2 (a direction orthogonal to the longitudinal direction of the base platform 2).

These actuators "e" and "f" are each in the form of a laminated piezoelectric actuator. The laminated piezoelectric actuator is constructed by laminating a plurality of piezoelectric materials such as PZT, ZnO or BST, each extending in the longitudinal direction of the base platform 2, with the piezoelectric materials being laminated in a direction orthogonal to the plane of plate of each piezoelectric material. Owing to the fact that the piezoelectric material is higher in electromechanical conversion efficiency, the fabrication of the actuators "e" and "f" with the piezoelectric materials easily achieves lowered power consumption.

As illustrated in FIG. 12, the actuator "e" is sandwiched between an upper electrode "e1" and a lower electrode "e2." Similarly, the actuator "f" is sandwiched between an upper electrode "f1" and a lower electrode "f2."

The changes in the polarity of a drive voltage applied to between the electrodes "e1" and "e2" at a given frequency causes the actuator "e" to be vibrated in an expansion/contraction motion. Similarly, the changes in the polarity of a drive voltage applied to between the electrodes "f1" and "f2" at a given frequency causes the actuator "f" to be vibrated in an expansion/contraction motion. Therefore, the application of drive voltages opposite in phase to the actuators "e" and "f," respectively, causes these actuators "e" and "f" to be vibrated opposite in phase, whereby the oscillation of the oscillating body 5 similar to that of the first embodiment is achieved via the base platform 2.

As illustrated in FIG. 11, basically similarly with the first embodiment, there is formed in the base platform 2 a recess open at the top face of the base platform 2, but, in the present embodiment, the recess is stair-stepped. Specifically, a recess portion 2b having a deep bottom surface is formed longitudinally centrally of the base platform 2, and recess portions 2c and 2c each having a shallow bottom surface are formed in respective two positions interposing the recess portion 2b.

Figure 13:
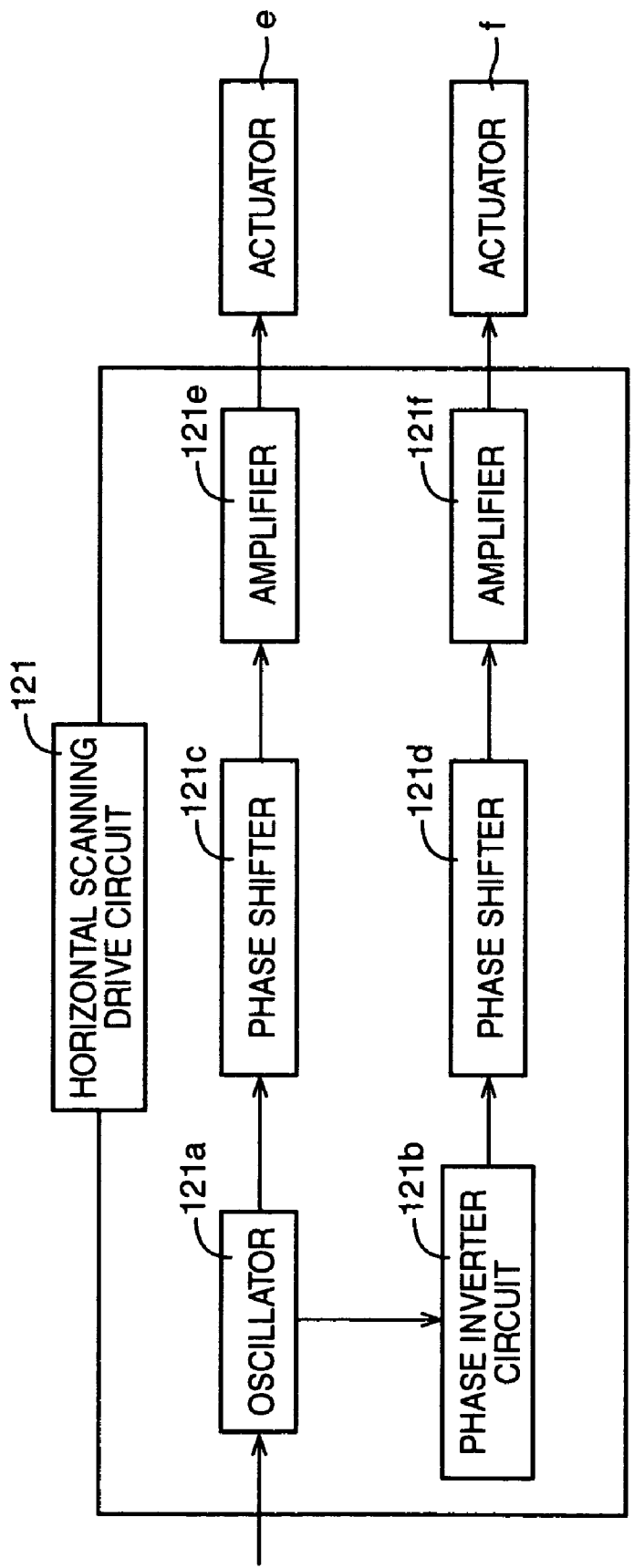
FIG. 13 is a block diagram illustrating a horizontal scanning drive circuit 121 in the optical scanning apparatus 200 illustrated in FIG. 11.

FIG. 13 illustrates in a block diagram the horizontal scanning drive circuit 121 in the present embodiment. The horizontal scanning drive circuit 121, which is common to that of the first embodiment in terms of the fundamental electric circuitry, differs from the first embodiment in that an amplifier 121e is connected to the one actuator "e," and an amplifier 121f is connected to the one actuator "f."

The thus-constructed horizontal scanning drive circuit 121 applies drive voltages to the actuators "e" and "f" in opposite phase to each other, respectively, thereby vibrating the actuators "e" and "f" in opposite phase to each other. As a result, there is imparted to the oscillating body 5 comprised of the first spring portions 9 and 10, the second spring portions 12, 13, 15, and 16, and the reflective mirror 8, a vibration at the same frequency as a resonant frequency of the oscillating body 5 in its torsional vibrtional mode. Due to this, the oscillating body 5 is brought into a resonant oscillation state in which the reflective mirror 8 is excited to produce the torsional oscillation at the resonant frequency through a larger oscillation angle.

The present inventors conducted numerical analyses by computer simulation, for the purpose of analyzing the oscillating body 5 commonly employed in the first and second embodiments, with respect to the relationships existing between the shape dimensions which are the geometrical features, and the vibrational characteristics, both of the oscillating body 5. The numerical analyses are effected by finite element method.

FIG. 14 schematically illustrates a simulation model of the oscillating body 5 for use in the numerical analyses. The simulation model is constructed by partitioning the oscillating body 5 into a plurality of finite elements.

As illustrated in FIG. 14, for the simulation model, the width dimension of the reflective mirror 8 is denoted as "L1," while the bifurcation spacing of each a pair of the second spring portions 12, 13, and another pair of the second spring portions 15, 16 is denoted as "L2." In this regard, describing by way of example of the pair of the second spring portions 12 and 13, the "bifurcation spacing L2" means the distance between the outer edges of these second spring portions 12, 13. The bifurcation spacing L2 equals the length of each connecting portion 17, 18.

It is added that, in the simulation model illustrated in FIG. 14, a portion of the two second spring portions 12 and 13 which is coupled with the first spring portion 9 is referred to as "connecting portion 17," terminologically separately from these two second spring portions 12 and 13. Similarly, a portion of the two second spring portions 15 and 16 which is coupled with the first spring portion 10 is referred to as "connecting portion 18," terminologically separately from these two second spring portions 15 and 16.

For the analyses of the vibrational characteristics of the oscillating body 5, a first, second, and third numerical analyses were performed using the aforementioned simulation model. That is to say, three different numerical analyses were performed, and the analysis conditions common to these three different numerical analyses are as follows:

1. Dimensions of Reflective Mirror 8 (square-shaped)

| | |
|---|---|
| Thickness: | 100 μm |
| Length: | 1 mm |
| Width: | 1 mm |

2. Dimensions of First Spring Portions 9, 10 (rectangle-shaped)

| | |
|---|---|
| Thickness: | 100 μm |
| Length: | 0.5 mm |
| Width: | 60 μm |

3. Dimensions of Second Spring Portions 12, 13, 15, 16 (rectangle-shaped)

| | |
|---|---|
| Thickness: | 100 μm |
| Length: | 1.5 mm |
| Width: | 40 μm |

4. Dimensions of Connecting Portions 17, 18 (rectangle-shaped)

| | |
|---|---|
| Thickness: | 100 μm |
| Width: | 40 μm |

Therefore, the width L1 of the reflective mirror 8 was held constant at 1 mm throughout those three different numerical analyses.

On the other hand, these three different numerical analyses were performed for three different values of the bifurcation spacing L2, respectively. Specifically, the first numerical analysis was performed under the condition where the length of each of the connecting portions 17 and 18 was 0.6 mm, and where the bifurcation spacing L2 was also 0.6 mm. It eventually follows that this numerical analysis was performed with the bifurcation spacing L2 not exceeding the width L1 of the reflective mirror 8. Specifically, it follows that this numerical analysis was performed with the bifurcation spacing L2 being smaller than the width L1 of the reflective mirror 8 (e.g., in the range of 50% to 70%, 40% to 80%, or 30% to 90%).

In contrast, the second and third numerical analyses were each practiced under the condition where the bifurcation spacing L2 exceeds the width L1. Specifically, the second numerical analysis was practiced under the condition where the bifurcation spacing L2 equals 1.1 mm, while the third numerical analysis was practiced under the condition where the bifurcation spacing L2 equals 2 mm.

Figure 15:
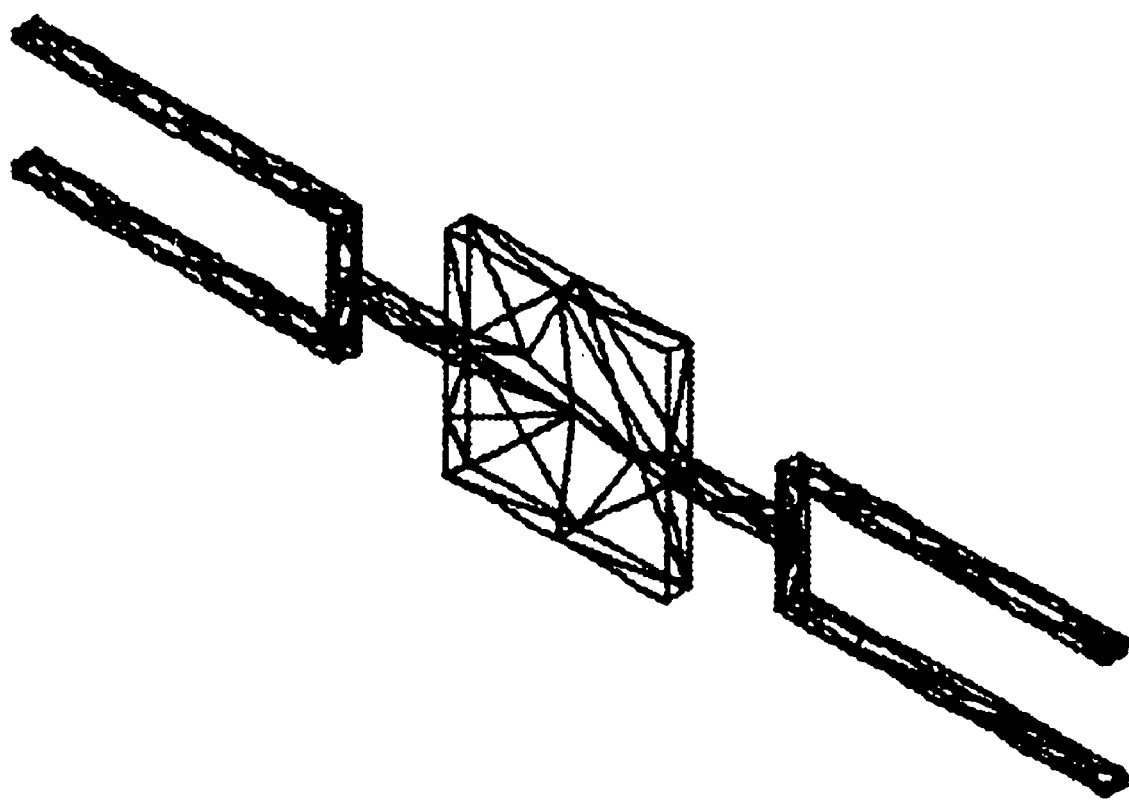
FIG. 15 is a perspective view illustrating the oscillating body 5 illustrated in FIG. 14 in a stationary state.

FIG. 15 illustrates the analysis model of the oscillating body 5 illustrated in FIG. 14 (hereinafter, also referred to simply as "oscillating body 5") in a stationary state. The first numerical analysis was practiced for vibrating the oscillating body 5 in four different vibrational modes by simulation. These four different vibrational modes differ from each other in the vibrational frequency at which the oscillating body 5 was vibrated, as follows:

| | |
|---|---|
| Vibrational Mode 1: | 10.6 kHz |
| Vibrational Mode 2: | 15.1 kHz |
| Vibrational Mode 3: | 21.8 kHz |
| Vibrational Mode 4: | 25.2 kHz |

With reference to FIGS. 16-23, the results of the first numerical analysis will be described below.

Prior to the description, the contents of FIGS. 16-23 will be explained briefly.

Figure 16:
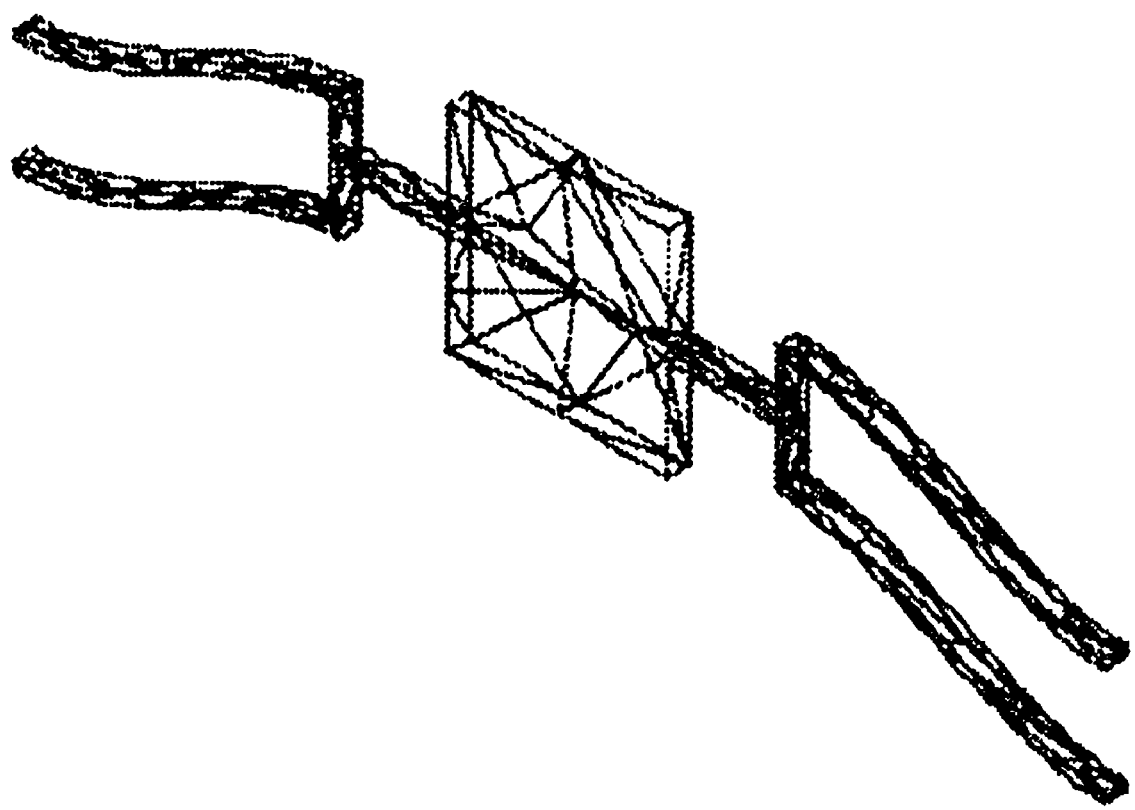
FIG. 16 is a perspective view illustrating analysis results of vibrational mode 1 of the oscillating body 5 illustrated in FIG. 14.
Figure 17:
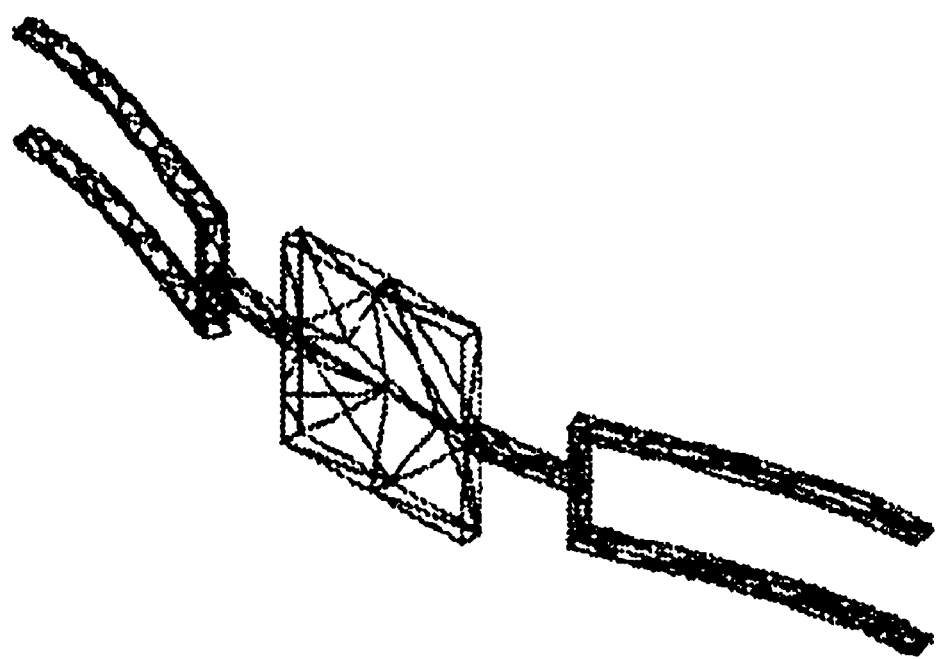
FIG. 17 is a perspective view illustrating analysis results of vibrational mode 2 of the oscillating body 5 illustrated in FIG. 14.
Figure 18:
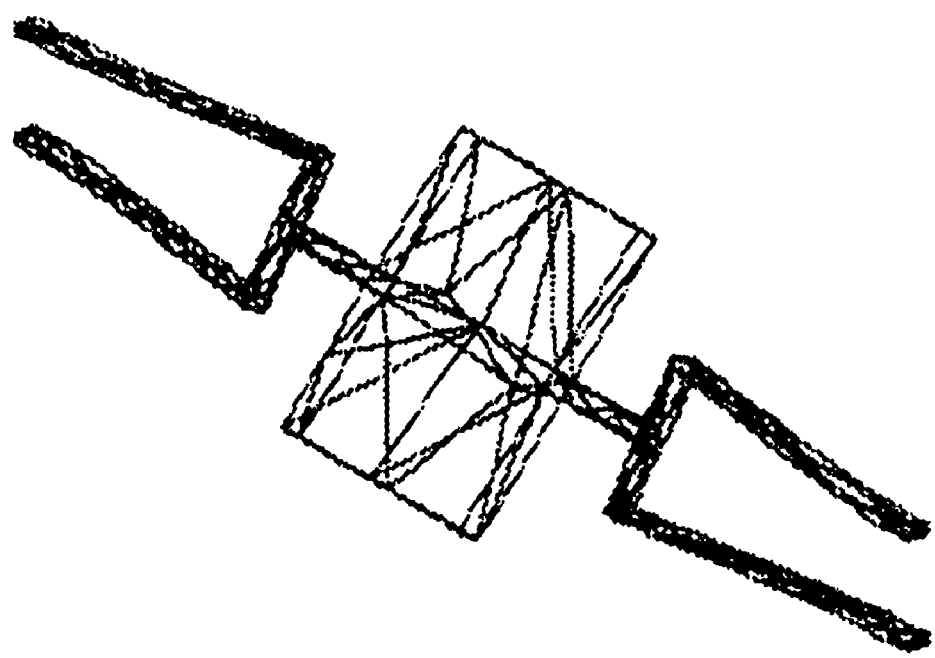
FIG. 18 is a perspective view illustrating analysis results of vibrational mode 3 of the oscillating body 5 illustrated in FIG. 14.
Figure 19:
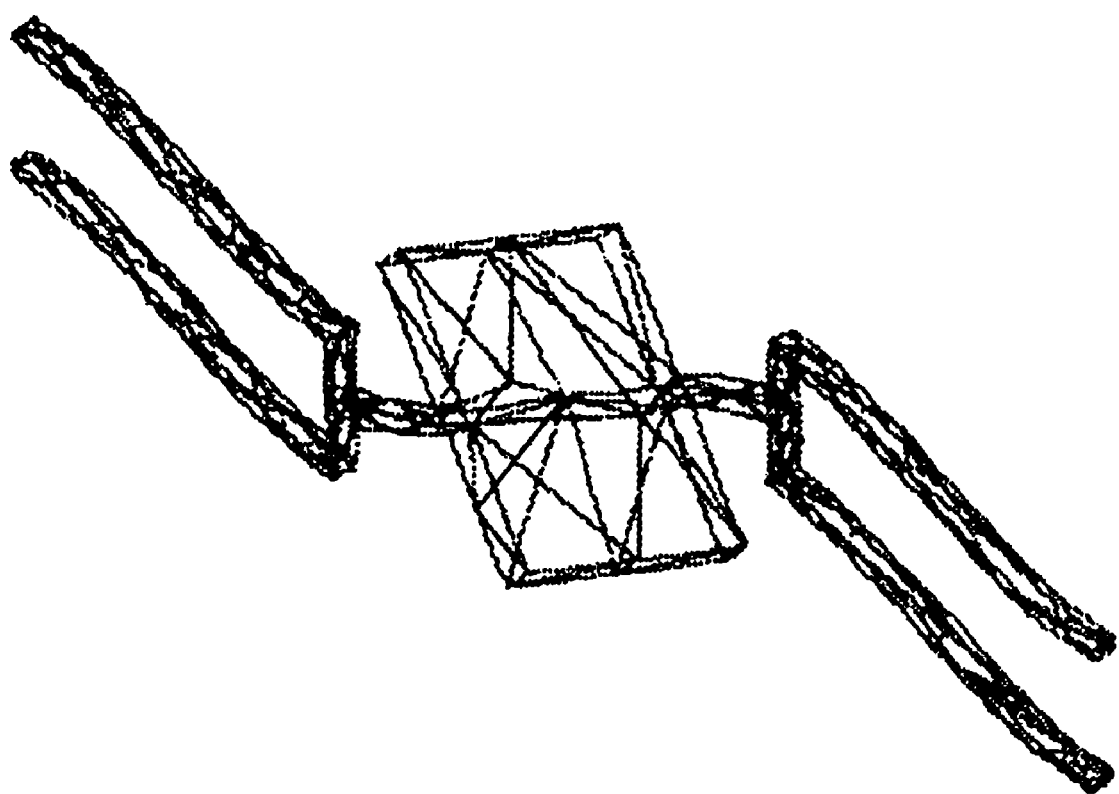
FIG. 19 is a perspective view illustrating analysis results of vibrational mode 4 of the oscillating body 5 illustrated in FIG. 14.

Each of FIGS. 16-19 is a view solely illustrating the analysis result of each vibrational mode. Specifically, FIG. 16 is a view illustrating the analysis result of vibrational mode 1, FIG. 17 is a view illustrating the analysis result of vibrational mode 2, FIG. 18 is a view illustrating the analysis result of vibrational mode 3, and FIG. 19 is a view illustrating the analysis result of vibrational mode 4.

Figure 20:
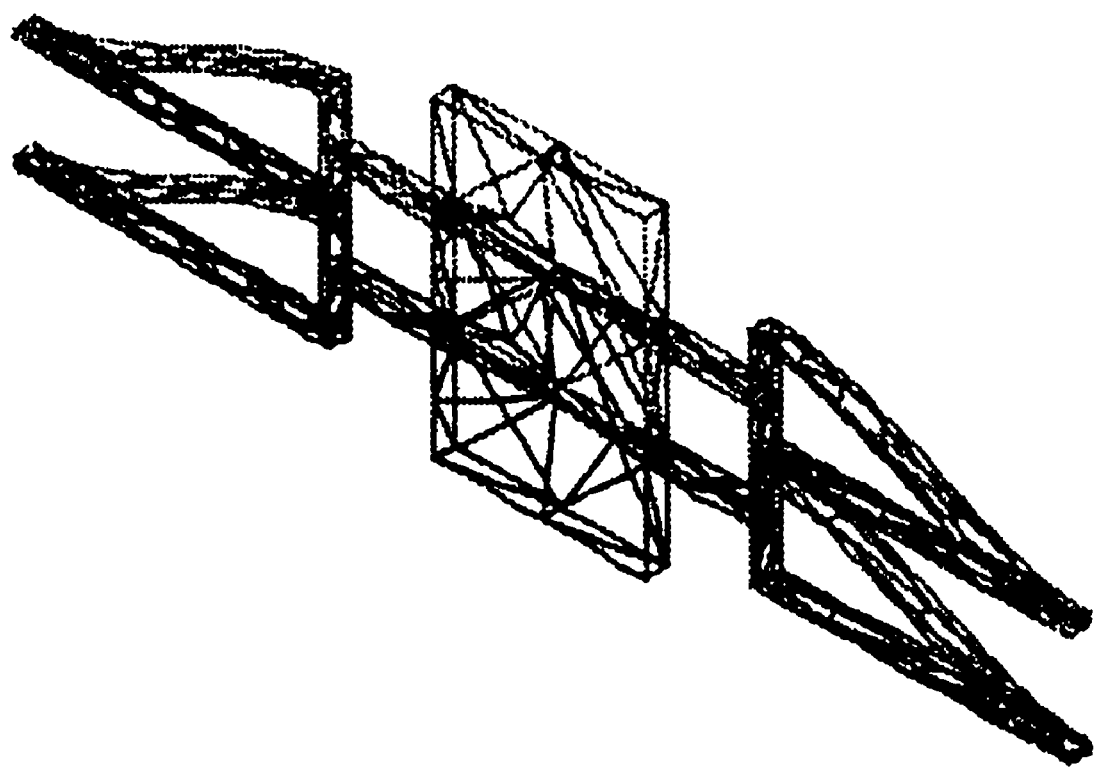
FIG. 20 is a perspective view illustrating analysis results of vibrational mode 1 of the oscillating body 5 illustrated in FIG. 14, in superposed relationship with the representation of the oscillating body 5 in a stationary state.
Figure 21:
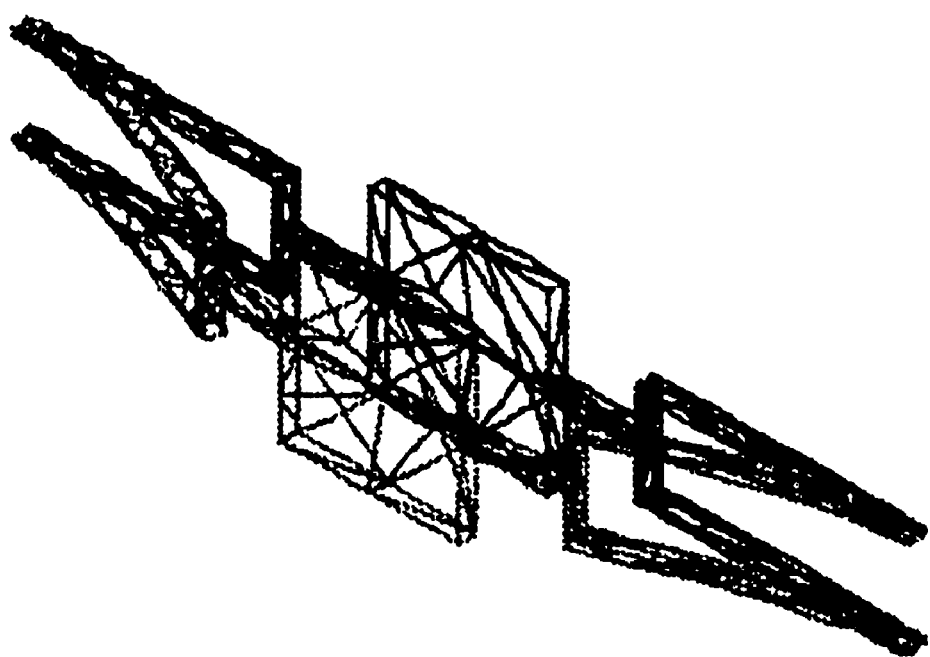
FIG. 21 is a perspective view illustrating analysis results of vibrational mode 2 of the oscillating body 5 illustrated in FIG. 14, in superposed relationship with the representation of the oscillating body 5 in a stationary state.
Figure 22:
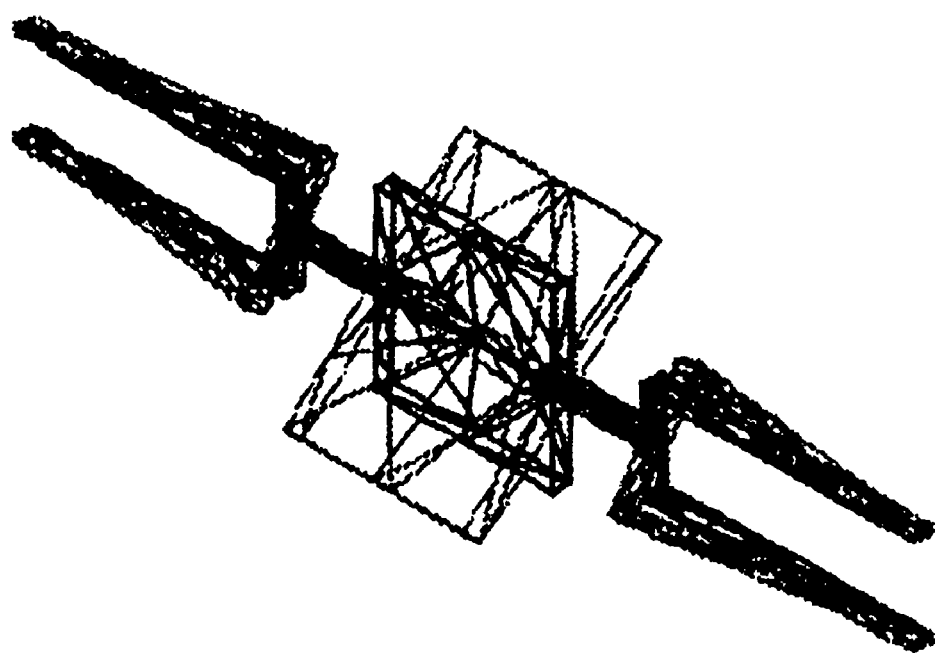
FIG. 22 is a perspective view illustrating analysis results of vibrational mode 3 of the oscillating body 5 illustrated in FIG. 14, in superposed relationship with the representation of the oscillating body 5 in a stationary state.
Figure 23:
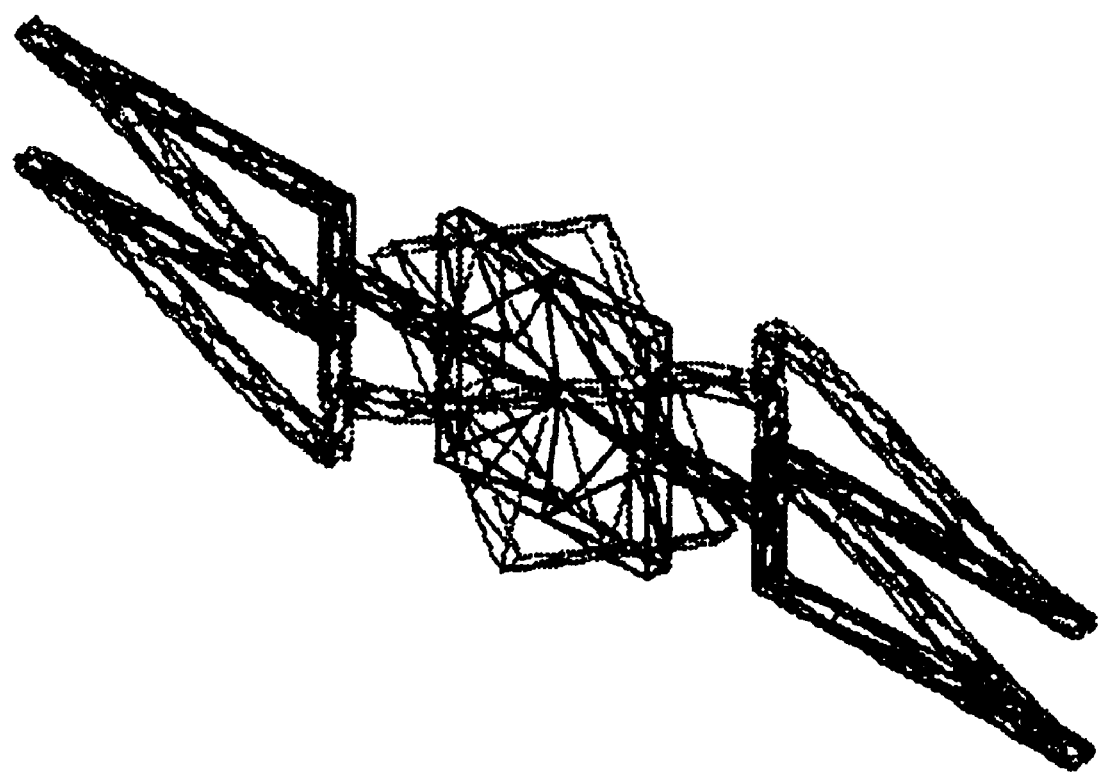
FIG. 23 is a perspective view illustrating analysis results of vibrational mode 4 of the oscillating body 5 illustrated in FIG. 14, in superposed relationship with the representation of the oscillating body 5 in a stationary state.

FIGS. 20-23 are views illustrating the per-vibrational-mode analysis results illustrated in FIGS. 16-19, respectively, in superposed relationship with the oscillating body 5 placed in a stationary mode illustrated in FIG. 15, for comparative convenience. Specifically, FIG. 20 is a view illustrating the analysis result of vibrational mode 1 in comparison with the stationary oscillating body 5, FIG. 21 is a view illustrating the analysis result of vibrational mode 2 in comparison with the stationary oscillating body 5, FIG. 22 is a view illustrating the analysis result of vibrational mode 3 in comparison with the stationary oscillating body 5, and FIG. 23 is a view illustrating the analysis result of vibrational mode 4 in comparison with the stationary oscillating body 5.

As illustrated in FIGS. 16 and 20, for vibrational mode 1, i.e., the vibration of the oscillating body 5 at 10.6 kHz, the reflective mirror 8 is caused to exhibit a resonant vibration in which the reflective mirror 8 is oscillated parallel to the reflective surface 8a (in-plane oscillation).

As illustrated in FIGS. 17 and 21, for vibrational mode 2, i.e., the vibration of the oscillating body 5 at 15.1 kHz, the reflective mirror 8 is caused to exhibit a resonant vibration in which the reflective mirror 8 is oscillated orthogonal to the reflective surface 8a (out-of-plane oscillation).

As illustrated in FIGS. 18 and 21, for vibrational mode 3, i.e., the vibration of the oscillating body 5 at 21.8 kHz, the reflective mirror 8 is caused to exhibit a torsional resonant vibration in which the reflective mirror 8 is torsionally oscillated about the axes of the first spring portions 9 and 10.

As illustrated in FIGS. 19 and 23, for vibrational mode 4, i.e., the vibration of the oscillating body 5 at 25.2 kHz, the reflective mirror 8 is caused to exhibit a resonant vibration in which the reflective mirror 8 is reciprocally rotated along the reflective surface 8*a*, with the rotation center of the reflective mirror 8 being coincident with the center point of the reflective surface 8*a*.

The results of the first numerical analysis demonstrate that, among vibrational modes 1-4, vibrational mode 3 is suitably usable in an optical scanning operation.

FIG. 24 illustrates the analysis conditions under which the second numerical analysis was performed. In the second numerical analysis, each of the connecting portions 17 and 18 of the oscillating body 5 is set to 1.1 mm so as to be longer than that of the first numerical analysis. Therefore, the bifurcation spacing L2 becomes 1.1 mm as well, which is longer than 1 mm equal to the width L1 of the reflective mirror 8, although the difference is slight.

Figure 25:
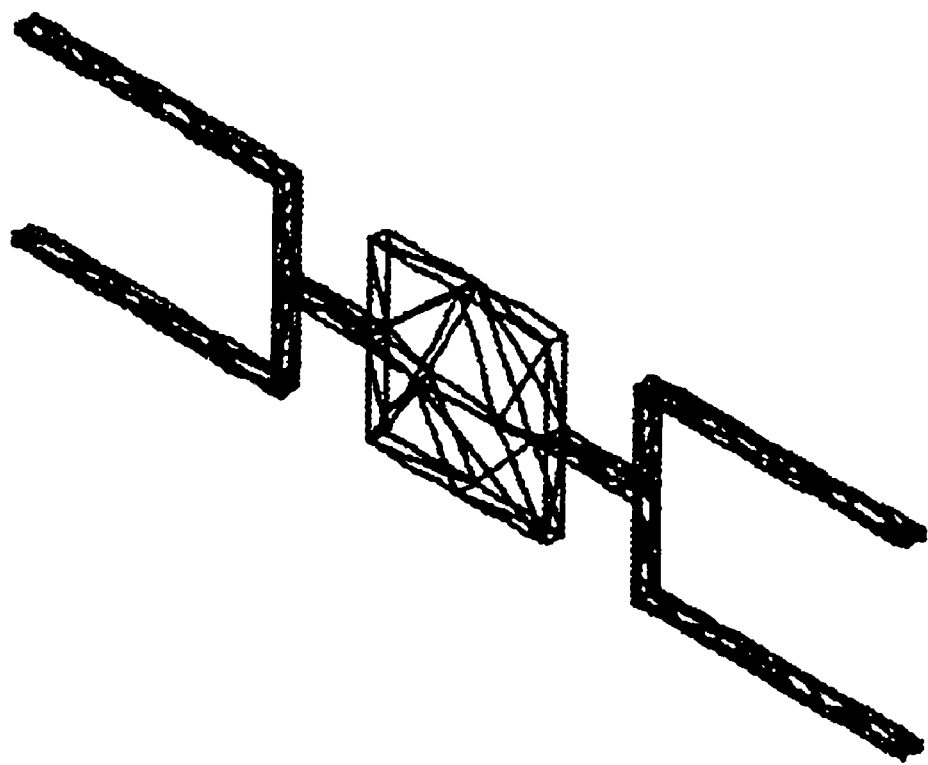
FIG. 25 is a perspective view illustrating the oscillating body 5 illustrated in FIG. 24 in a stationary state.

FIG. 25 illustrates the oscillating body 5 illustrated in FIG. 24, in a stationary state. The second numerical analysis was practiced for vibrating the oscillating body 5 in four different vibrational modes by simulation. These four different vibrational modes differ from each other in the vibrational frequency at which the oscillating body 5 was vibrated, as follows:

| | |
|---|---|
| Vibrational Mode 1: | 10.0 kHz |
| Vibrational Mode 2: | 14.2 kHz |
| Vibrational Mode 3: | 22.0 kHz |
| Vibrational Mode 4: | 25.5 kHz |

With reference to FIGS. 26-33, the results of the second numerical analysis will be described below.

Prior to the description, the contents of FIGS. 26-33 will be explained briefly.

Figure 26:
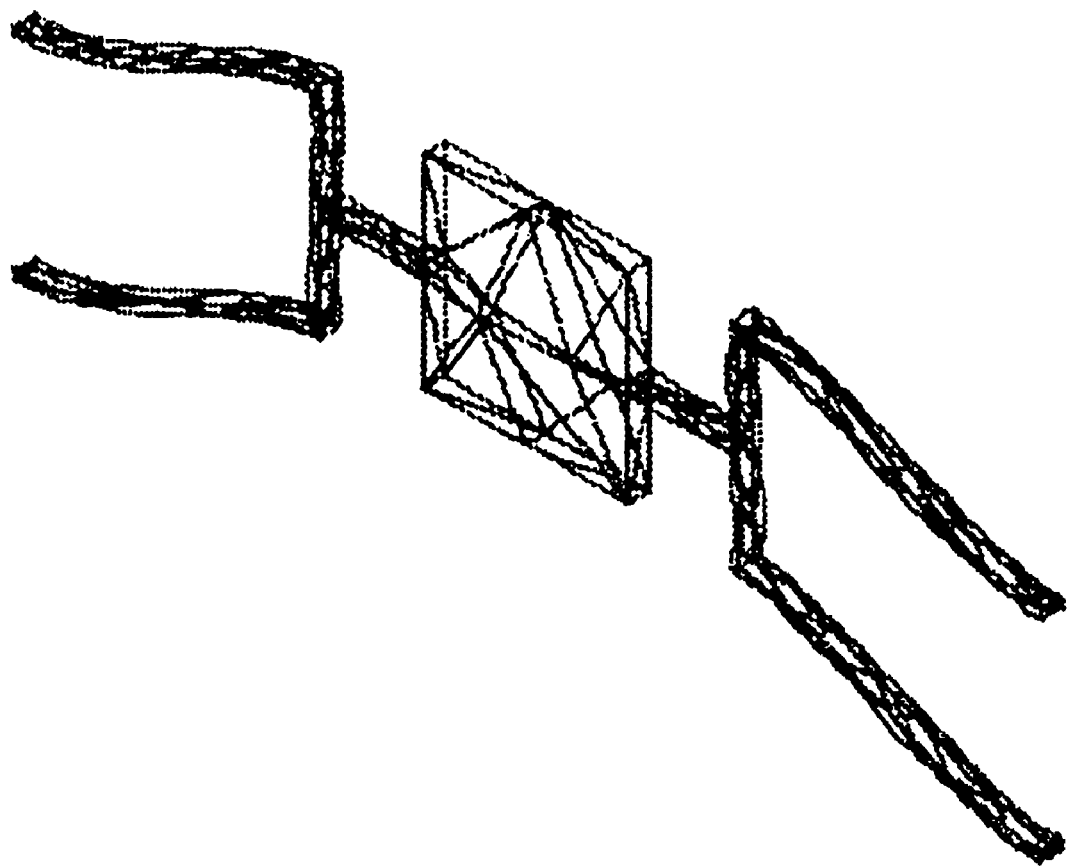
FIG. 26 is a perspective view illustrating analysis results of vibrational mode 1 of the oscillating body 5 illustrated in FIG. 24.
Figure 27:
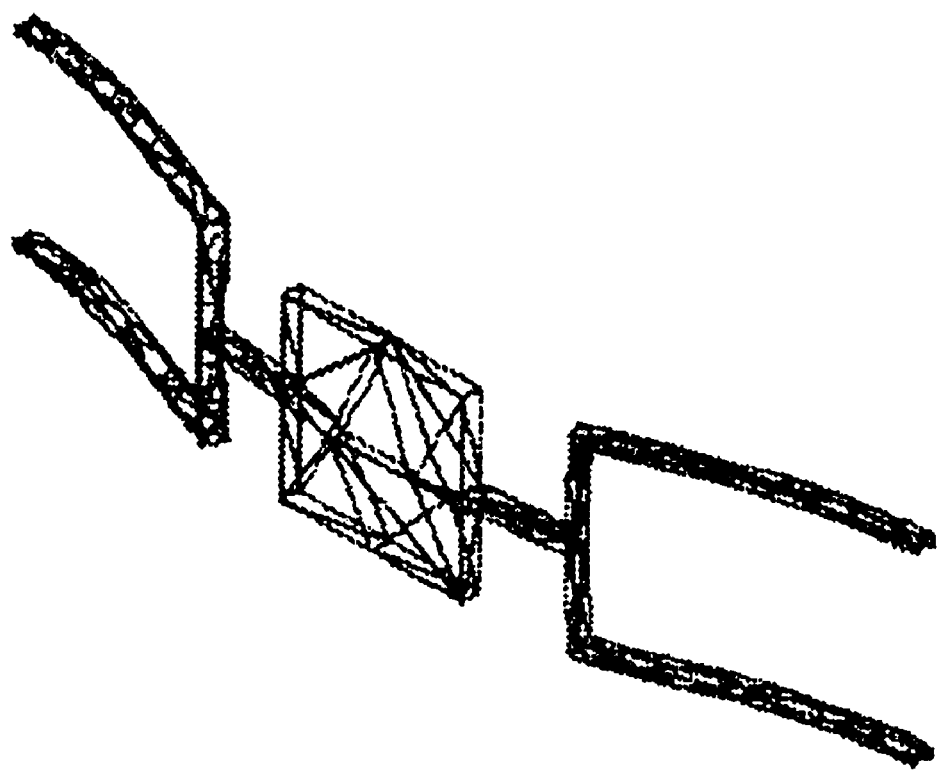
FIG. 27 is a perspective view illustrating analysis results of vibrational mode 2 of the oscillating body 5 illustrated in FIG. 24.
Figure 28:
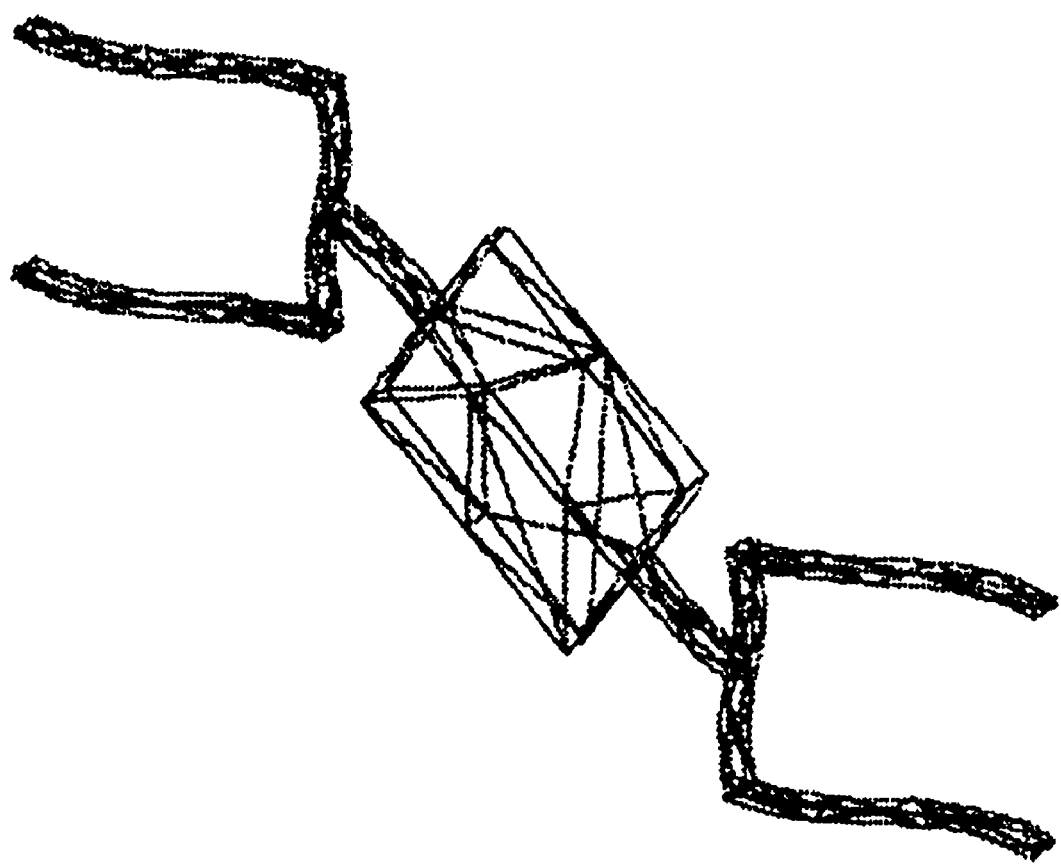
FIG. 28 is a perspective view illustrating analysis results of vibrational mode 3 of the oscillating body 5 illustrated in FIG. 24.
Figure 29:
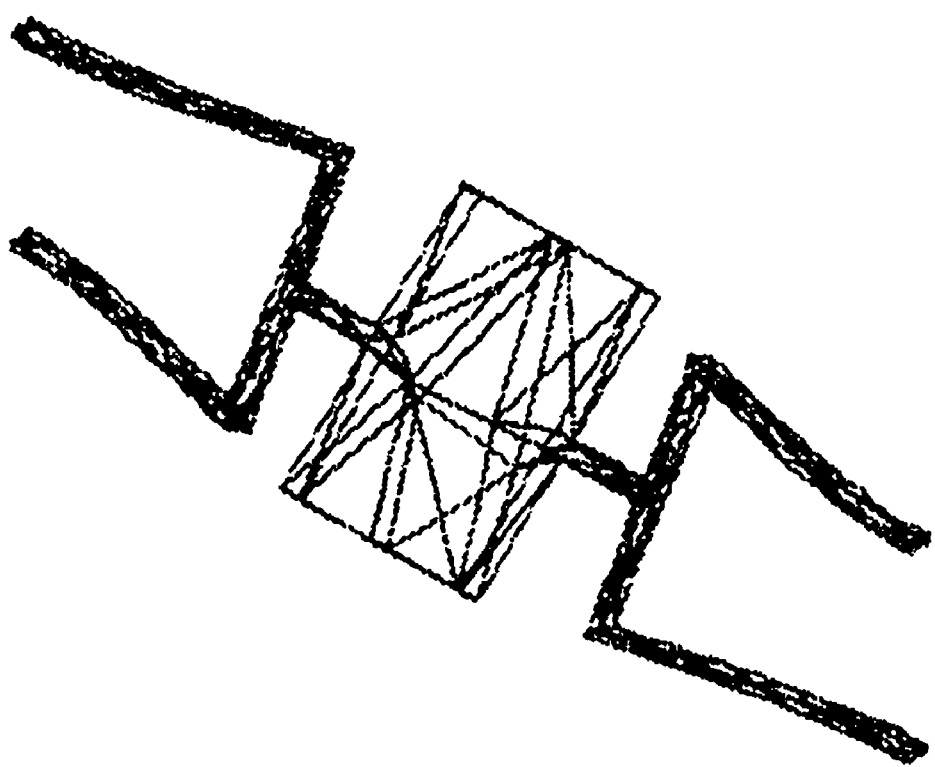
FIG. 29 is a perspective view illustrating analysis results of vibrational mode 4 of the oscillating body 5 illustrated in FIG. 24.

Each of FIGS. 26-29 is a view solely illustrating the analysis result of each vibrational mode. Specifically, FIG. 26 is a view illustrating the analysis result of vibrational mode 1, FIG. 27 is a view illustrating the analysis result of vibrational mode 2, FIG. 28 is a view illustrating the analysis result of vibrational mode 3, and FIG. 29 is a view illustrating the analysis result of vibrational mode 4.

Figure 30:
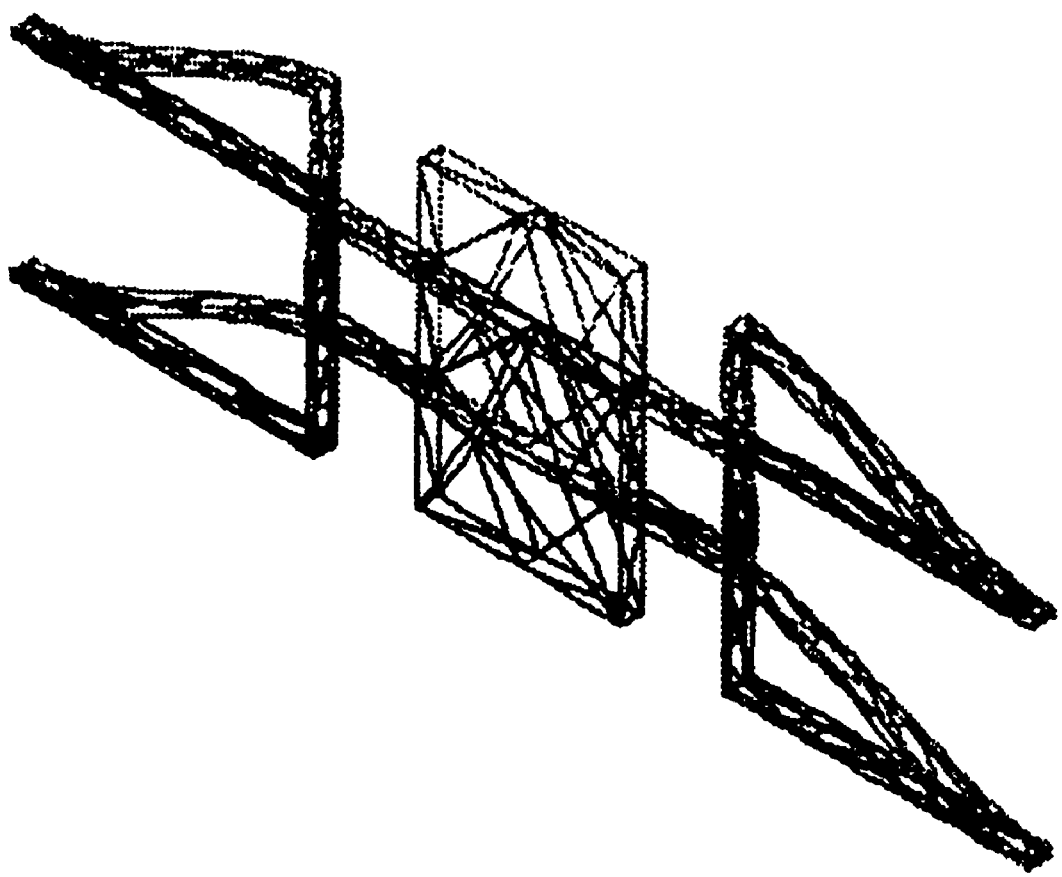
FIG. 30 is a perspective view illustrating analysis results of vibrational mode 1 of the oscillating body 5 illustrated in FIG. 24, in superposed relationship with the representation of the oscillating body 5 in a stationary state.
Figure 31:
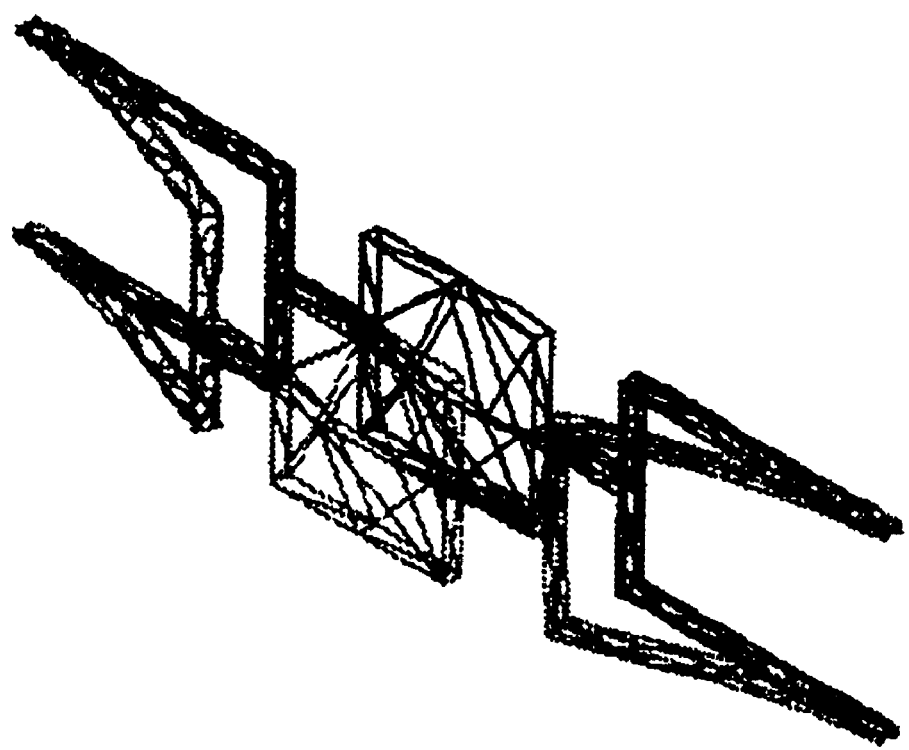
FIG. 31 is a perspective view illustrating analysis results of vibrational mode 2 of the oscillating body 5 illustrated in FIG. 24, in superposed relationship with the representation of the oscillating body 5 in a stationary state.
Figure 32:
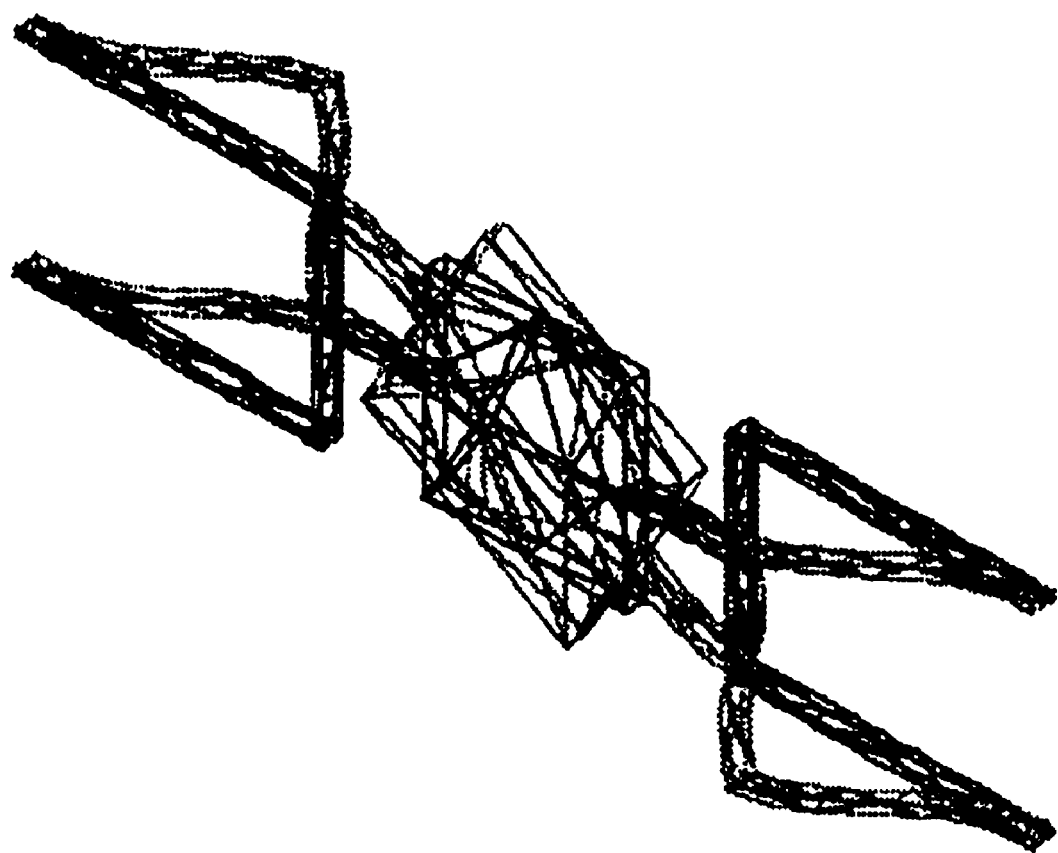
FIG. 32 is a perspective view illustrating analysis results of vibrational mode 3 of the oscillating body 5 illustrated in FIG. 24, in superposed relationship with the representation of the oscillating body 5 in a stationary state.
Figure 33:
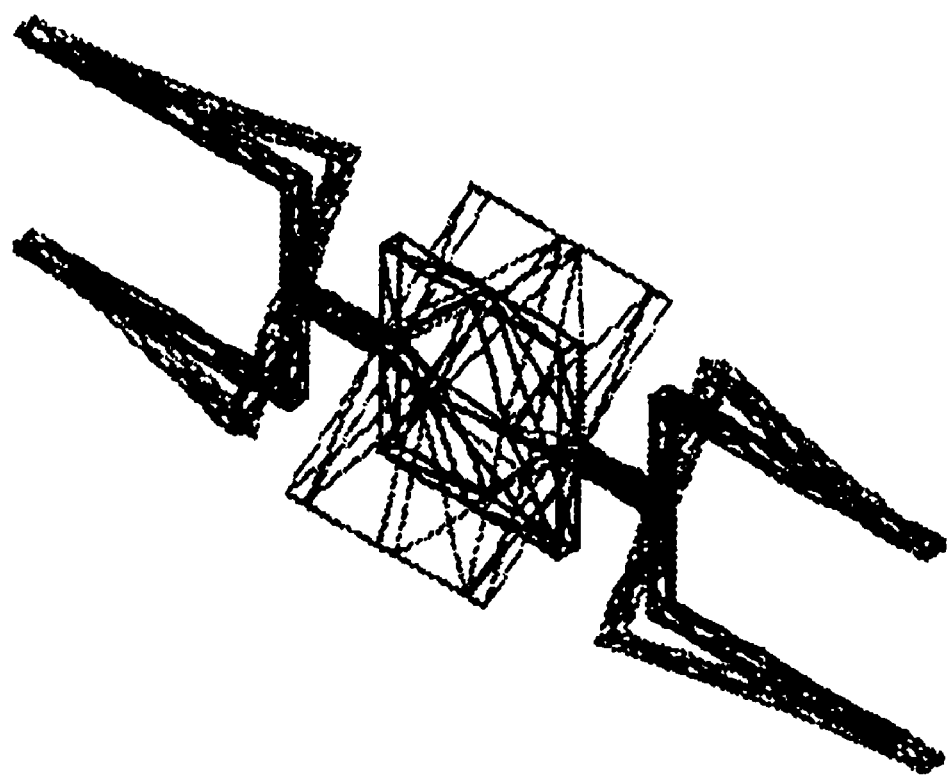
FIG. 33 is a perspective view illustrating analysis results of vibrational mode 4 of the oscillating body 5 illustrated in FIG. 24, in superposed relationship with the representation of the oscillating body 5 in a stationary state.

FIGS. 30-33 are views illustrating the per-vibrational-mode analysis results illustrated in FIGS. 26-29, respectively, in superposed relationship with the oscillating body 5 placed in a stationary mode illustrated in FIG. 25, for comparative convenience. Specifically, FIG. 30 is a view illustrating the analysis result of vibrational mode 1 in comparison with the stationary oscillating body 5, FIG. 31 is a view illustrating the analysis result of vibrational mode 2 in comparison with the stationary oscillating body 5, FIG. 32 is a view illustrating the analysis result of vibrational mode 2 in comparison with the stationary oscillating body 5, and FIG. 33 is a view illustrating the analysis result of vibrational mode 4 in comparison with the stationary oscillating body 5.

As illustrated in FIGS. 26 and 30, for vibrational mode 1, i.e., the vibration of the oscillating body 5 at 10.0 kHz, the reflective mirror 8 is caused to exhibit a resonant vibration in which the reflective mirror 8 is oscillated parallel to the reflective surface 8*a* (in-plane oscillation).

As illustrated in FIGS. 27 and 31, for vibrational mode 2, i.e., the vibration of the oscillating body 5 at 14.2 kHz, the reflective mirror 8 is caused to exhibit a resonant vibration in which the reflective mirror 8 is oscillated orthogonal to the reflective surface 8*a* (out-of-plane oscillation).

As illustrated in FIGS. 28 and 32, for vibrational mode 3, i.e., the vibration of the oscillating body 5 at 22.0 kHz, the reflective mirror 8 is caused to exhibit a resonant vibration in which the reflective mirror 8 is reciprocally rotated along the reflective surface 8*a*, with the rotation center of the reflective mirror 8 being coincident with the center point of the reflective surface 8*a*.

As illustrated in FIGS. 29 and 33, for vibrational mode 4, i.e., the vibration of the oscillating body 5 at 25.5 kHz, the reflective mirror 8 is caused to exhibit a torsional resonant vibration in which the reflective mirror 8 is rotated about the axes of the first spring portions 9 and 10.

The results of the second numerical analysis demonstrate that, among vibrational modes 1-4, vibrational mode 4 is suitably usable in an optical scanning operation.

Next, with reference to FIG. 34, first- to third-order vibrational modes of the oscillating body 5 will be described using an approximate model of the oscillating body 5.

Figure 34:
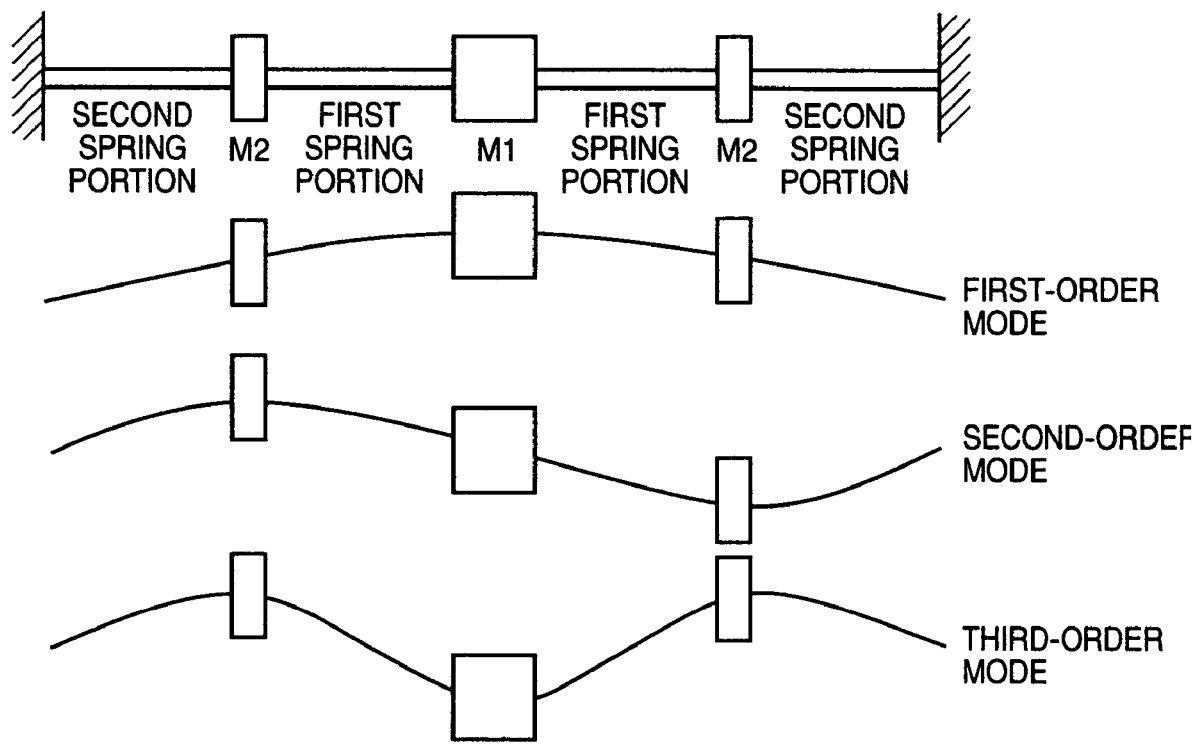
FIG. 34 is a view schematically illustrating an approximate model of the oscillating body 5 in the first and second embodiments, together with three types of vibrational modes.

At the top of FIG. 34, the approximate model of the oscillating body 5 is illustrated. In this approximate model, the reflective mirror 8 is assigned a mass of "M1," the first spring portion is assigned "non-mass," the connecting portions 17, 18 are each assigned a mass of "M2," and the second spring portion is assigned "non-mass," with the two second spring portions being combined into a single second spring portion, for convenience.

If the oscillating body 5 is approximated as this approximate model, with the masses of the spring portions being ignored, then the oscillating body 5 becomes equivalent to a vibration system offering three degrees of freedom with respect to a horizontal or vertical direction.

For achieving a stable optical scan, there are preferably prevented higher-order (higher than or equal to second order) vibrational modes of the oscillating body 5 from being produced in the region of frequencies below the natural frequency of the torsional oscillation. FIG. 34 illustrates at its top the approximate model in a stationary state, and illustrates at its bottom three different vibrational modes using the approximate model. The upper one of these three different vibrational modes is a first-order mode, the middle one is a second-order mode, and the lower one is a third-order mode.

As will be evident from the results of the numerical analyses described above with reference to FIGS. 16-33, when the modal analysis of the natural frequency of the oscillating body 5 is practiced, a first-order natural vibration of a vertical translational vibrational mode (out-of-plane vibrational mode) or a horizontal translational vibrational mode (in-plane vibrational mode) is produced in a lower frequency region.

When each of the four different vibrational modes exhibited in the oscillating body 5 illustrated in FIG. 14 is associated with any one of the three different vibrational modes illustrated in FIG. 34, vibrational mode 1 illustrated in FIG. 16 (horizontal translational vibrational mode) falls into the first-order mode illustrated in FIG. 34, and vibrational mode 4 (rotational vibrational mode) illustrated in FIG. 19 falls into the second-order mode illustrated in FIG. 34.

When alternative numerical analyses are practiced at frequencies higher than the frequencies at which the current numerical analysis was practiced, the oscillating body 5 can be analyzed for modes up to a third- or higher-order mode.

For the approximate model illustrated in FIG. 34, assume that the mass M1 and the rigidity of the spring portions are each held constant, the frequency of a higher-order mode becomes dependent on the mass M2. An increase in the mass M2 invites a decrease in the vibrational frequency of a first-order mode, and, in addition to that, a decrease in the vibrational frequency of a second-order mode. For this reason, an increase in the mass M2 has caused the vibrational frequency of a higher-order mode to become closer to a torsional natural frequency required for an optical scanning operation.

In contrast, the oscillating body 5 illustrated in FIG. 14, namely, the oscillating body 5 employed in the first and second embodiments is configured such that the length of each connecting portion 17, 18, namely, the bifurcation spacing L2 of the second spring portions 12, 13 and the second spring portions 15, 16 is smaller than the width L1 of the reflective mirror 8, resulting in a decrease in the mass M2 of each connecting portion 17, 18.

Therefore, for the oscillating body 5 illustrated in FIG. 14 allows, irrespective of an attempt to increase the oscillation rate of the reflective mirror 8, suppression of vibrational modes which exclude first-order modes in which the oscillation directions are horizontal and vertical directions relative to the reflective mirror 8, resulting in a stable torsional oscillation of the oscillating body 5 and also a stable optical scan. In this regard, the reason why the first-order modes in which the oscillation directions are horizontal and vertical directions relative to the reflective mirror 8 are allowed to be produced is that these modes, although are not vibrational modes required for optical scan, are not such vibrational modes causing unexpected changes to the direction of the scanned light and adversely affecting the rectilinear orientation property of the scanned light.

In the first and second embodiments, vibrational mode 3 illustrated in FIG. 18 is a preferable vibrational (resonant) mode to the optical scanning apparatuses 1 and 200, the natural frequency of which was 21.8 kHz. At frequencies below that frequency, vibrational mode 1 illustrated in FIG. 16 is a mode in which the oscillation direction is a horizontal direction relative to the reflective surface 8a of the reflective mirror 8 (in-plane direction), and vibrational mode 2 illustrated in FIG. 17 is a mode in which the oscillation direction is a vertical direction relative to the reflective surface 8a (out-of-plane direction), meaning that only first-order modes whose oscillation directions are vertical and horizontal directions are produced.

Therefore, the first and second embodiments allow the torsional oscillation of the oscillating body 5 to be stabilized, and also allows the optical scan by the optical scanning apparatuses 1 and 200 to be stabilized.

Alternatively, as illustrated as a comparative example in FIG. 24, if the length of each connecting portion 17, 18, i.e., the bifurcation spacing L2 is set to 1.1 mm so as to be larger than the width L1, then the oscillating body 5 exhibits, as illustrated in FIGS. 28 and 32, the oscillation in which vibrational mode 1 (in-plane vibrational mode) of second-order is superposed with vibrational mode 3 (rotational vibrational mode), at a frequency of 22.0 kHz which is lower than the resonant frequency 25.5 kHz of a desired vibrational mode, i.e., torsional vibrational mode 4 illustrated in FIGS. 29 and 33. For this reason, the torsional oscillation of the oscillating body 5 fails to be stable, and also an optical scan by the optical scanning apparatuses 1 and 200 fail to be stable.

Figure 35:
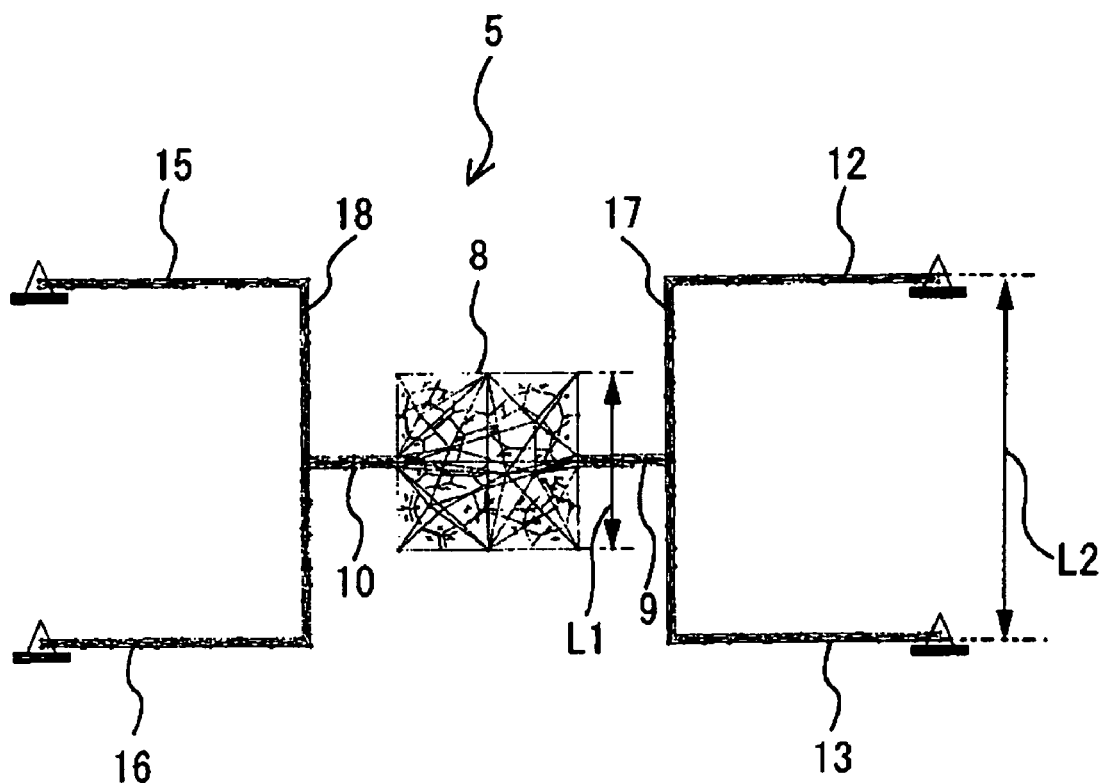
FIG. 35 is a front view schematically illustrating a model for use in numerical analysis, under a third numerical analysis condition, of vibrational characteristics of the oscillating body 5 in the first and second embodiments.

FIG. 35 illustrates the analysis conditions under which the third numerical analysis was performed. In the third numerical analysis, the length of each connecting portion 17, 18 of the oscillating body 5 is set to 2 mm so as to be longer than those of the first and second numerical analyses. Therefore, the bifurcation spacing L2 becomes 2 mm as well, which is twice the width L1 (1 mm) of the reflective mirror 8.

Figure 36:
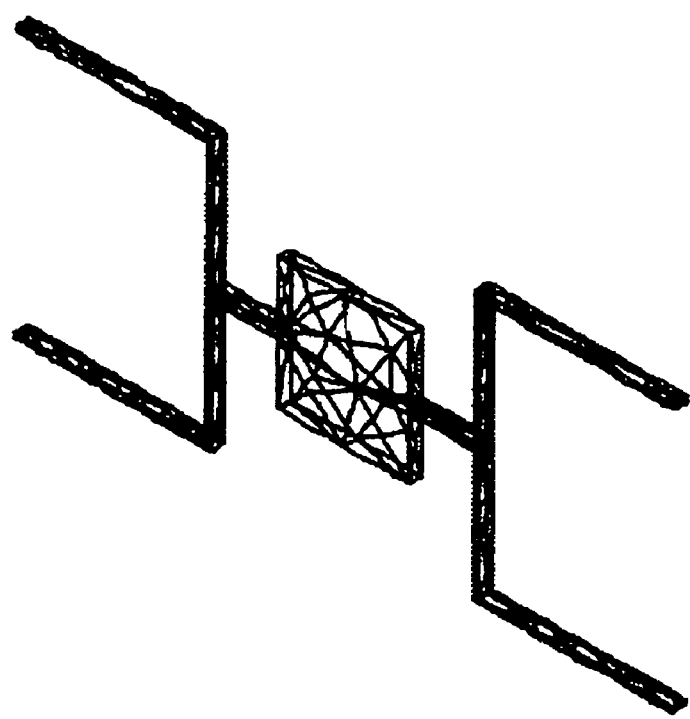
FIG. 36 is a perspective view illustrating the oscillating body 5 illustrated in FIG. 35 in a stationary state.

FIG. 36 illustrates the oscillating body 5 illustrated in FIG. 35, in a stationary state. The third numerical analysis was practiced for vibrating the oscillating body 5 in eight different vibrational modes by simulation. These eight different vibrational modes differ from each other in the vibrational frequency at which the oscillating body 5 was vibrated, as follows:

| | |
|---|---|
| Vibrational Mode 1: | 9.0 kHz |
| Vibrational Mode 2: | 12.1 kHz |
| Vibrational Mode 3: | 15.4 kHz |
| Vibrational Mode 4: | 17.6 kHz |
| Vibrational Mode 5: | 29.1 kHz |
| Vibrational Mode 6: | 32.1 kHz |
| Vibrational Mode 7: | 60.4 kHz |
| Vibrational Mode 8: | 64.2 kHz |

With reference to FIGS. 37-48, the results of the third numerical analysis will be described below.

Prior to the description, the contents of FIGS. 37-48 will be explained briefly.

Figure 37:
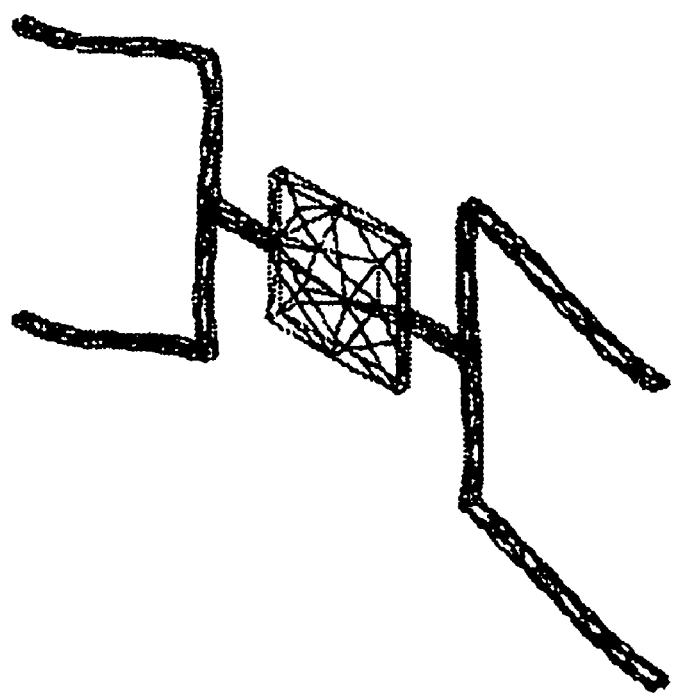
FIG. 37 is a perspective view illustrating analysis results of vibrational mode 1 of the oscillating body 5 illustrated in FIG. 35.
Figure 38:
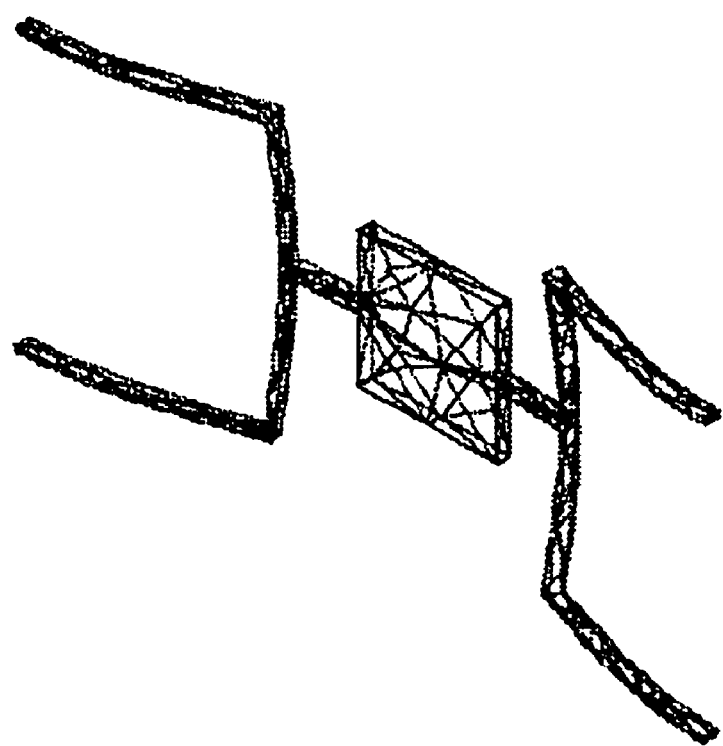
FIG. 38 is a perspective view illustrating analysis results of vibrational mode 2 of the oscillating body 5 illustrated in FIG. 35.
Figure 39:
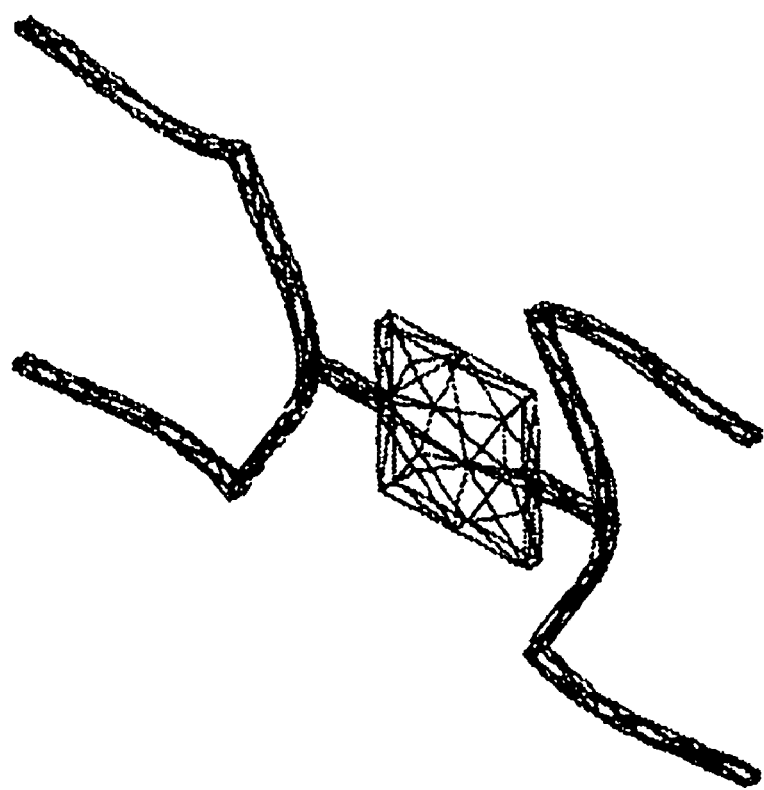
FIG. 39 is a perspective view illustrating analysis results of vibrational mode 3 of the oscillating body 5 illustrated in FIG. 35.
Figure 40:
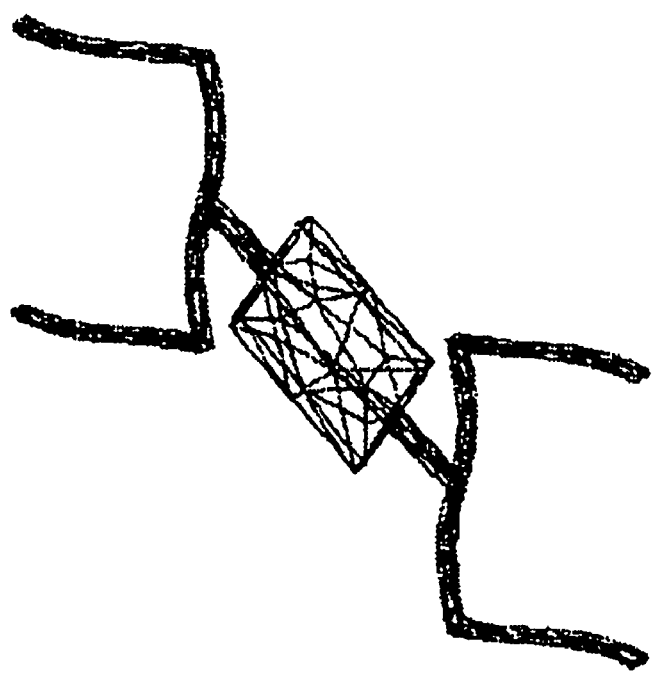
FIG. 40 is a perspective view illustrating analysis results of vibrational mode 4 of the oscillating body 5 illustrated in FIG. 35.

Each of FIGS. 37-40 is a view solely illustrating the analysis result of each vibrational mode. Specifically, FIG. 37 is a view illustrating the analysis result of vibrational mode 1, FIG. 38 is a view illustrating the analysis result of vibrational mode 2, FIG. 39 is a view illustrating the analysis result of vibrational mode 3, and FIG. 40 is a view illustrating the analysis result of vibrational mode 4.

Figure 41:
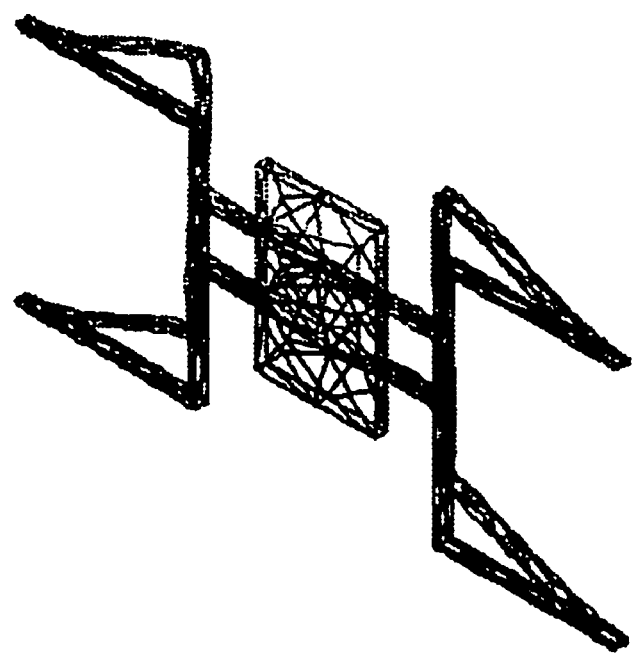
FIG. 41 is a perspective view illustrating analysis results of vibrational mode 1 of the oscillating body 5 illustrated in FIG. 35, in superposed relationship with the representation of the oscillating body 5 in a stationary state.
Figure 42:
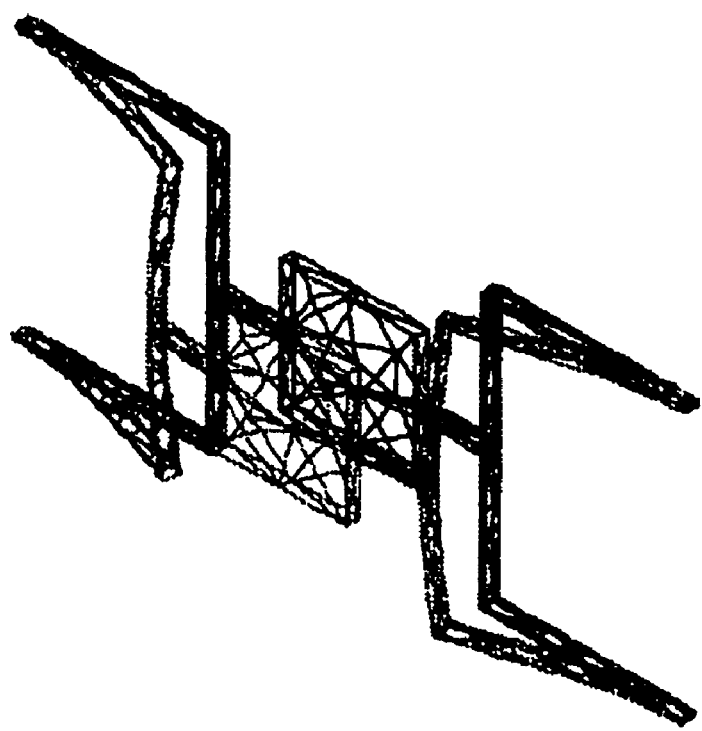
FIG. 42 is a perspective view illustrating analysis results of vibrational mode 2 of the oscillating body 5 illustrated in FIG. 35, in superposed relationship with the representation of the oscillating body 5 in a stationary state.
Figure 43:
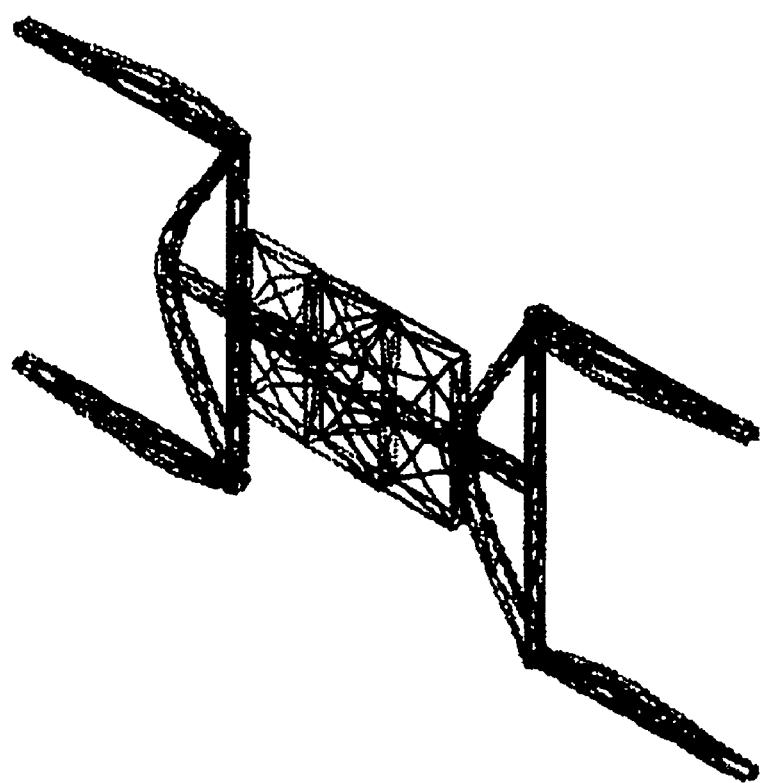
FIG. 43 is a perspective view illustrating analysis results of vibrational mode 3 of the oscillating body 5 illustrated in FIG. 35, in superposed relationship with the representation of the oscillating body 5 in a stationary state.
Figure 44:
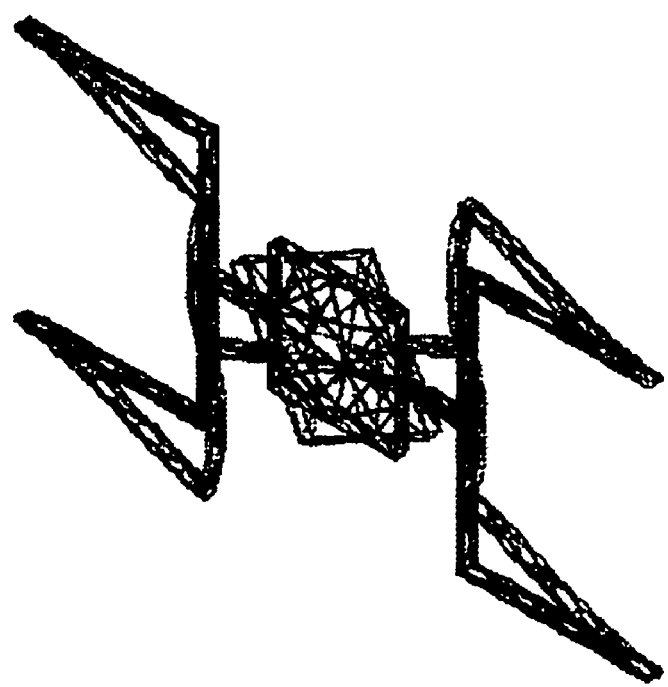
FIG. 44 is a perspective view illustrating analysis results of vibrational mode 4 of the oscillating body 5 illustrated in FIG. 35, in superposed relationship with the representation of the oscillating body 5 in a stationary state.

FIGS. 41-44 are views illustrating the per-vibrational-mode analysis results illustrated in FIGS. 37-40, respectively, in superposed relationship with the oscillating body 5 placed in a stationary mode illustrated in FIG. 36, for comparative convenience. Specifically, FIG. 41 is a view illustrating the analysis result of vibrational mode 1 in comparison with the stationary oscillating body 5, FIG. 42 is a view illustrating the analysis result of vibrational mode 2 in comparison with the stationary oscillating body 5, FIG. 43 is a view illustrating the analysis result of vibrational mode 3 in comparison with the stationary oscillating body 5, and FIG. 44 is a view illustrating the analysis result of vibrational mode 4 in comparison with the stationary oscillating body 5.

Figure 45:
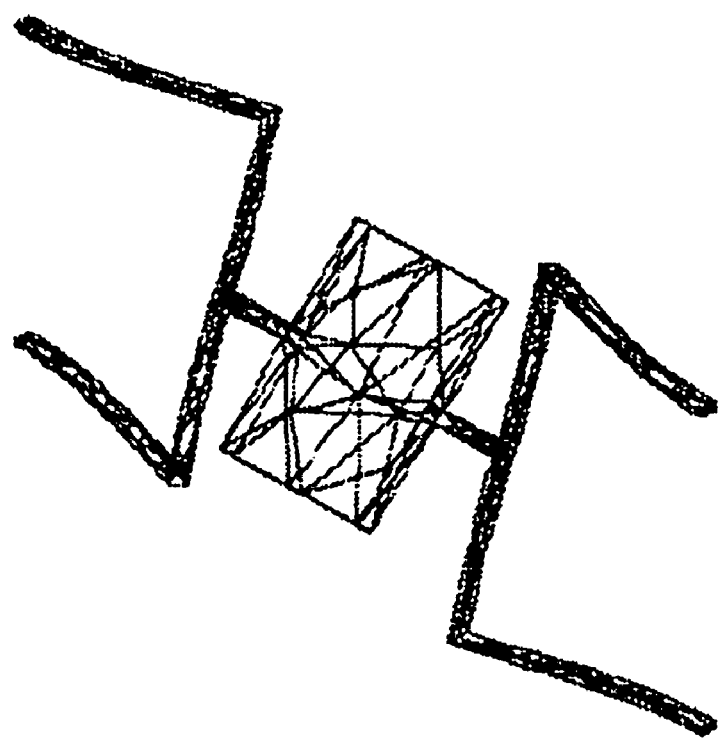
FIG. 45 is a perspective view illustrating analysis results of vibrational mode 5 of the oscillating body 5 illustrated in FIG. 35.
Figure 46:
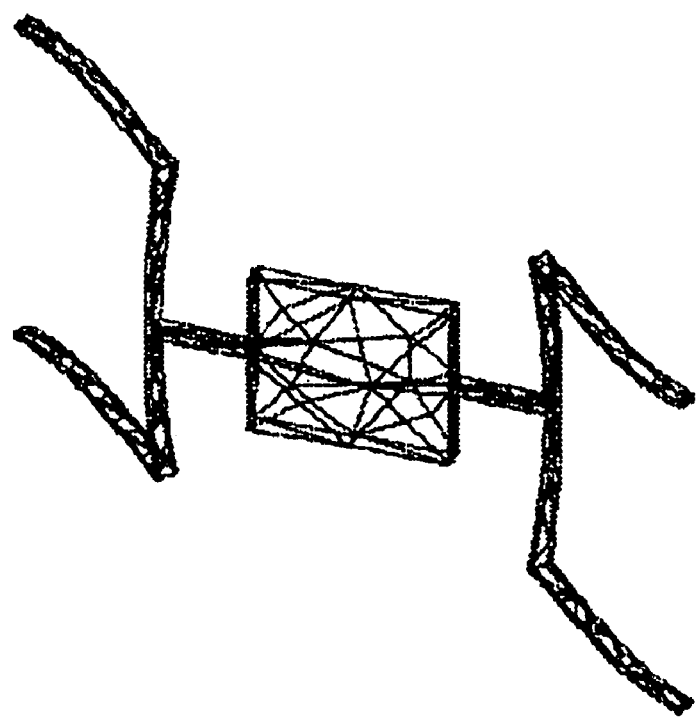
FIG. 46 is a perspective view illustrating analysis results of vibrational mode 6 of the oscillating body 5 illustrated in FIG. 35.
Figure 47:
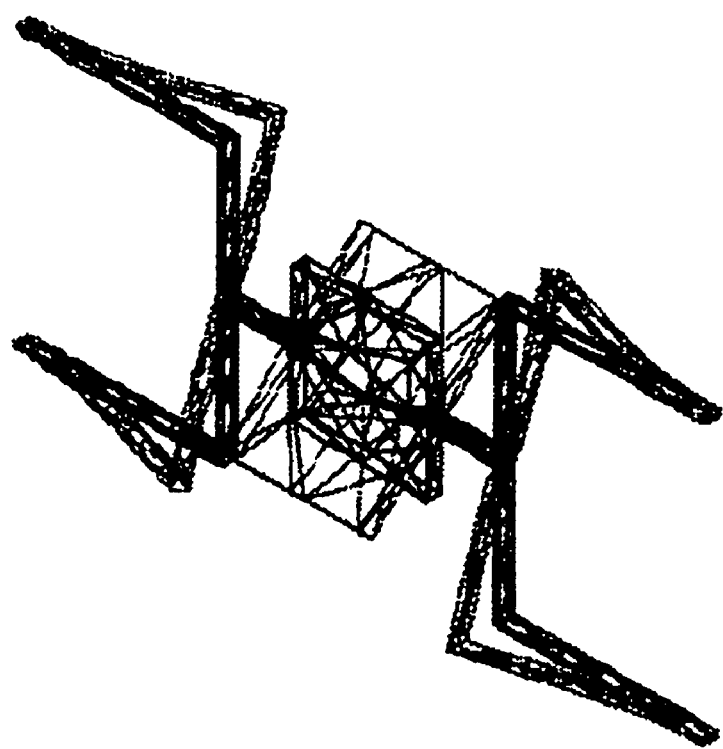
FIG. 47 is a perspective view illustrating analysis results of vibrational mode 5 of the oscillating body 5 illustrated in FIG. 35, in superposed relationship with the representation of the oscillating body 5 in a stationary state.
Figure 48:
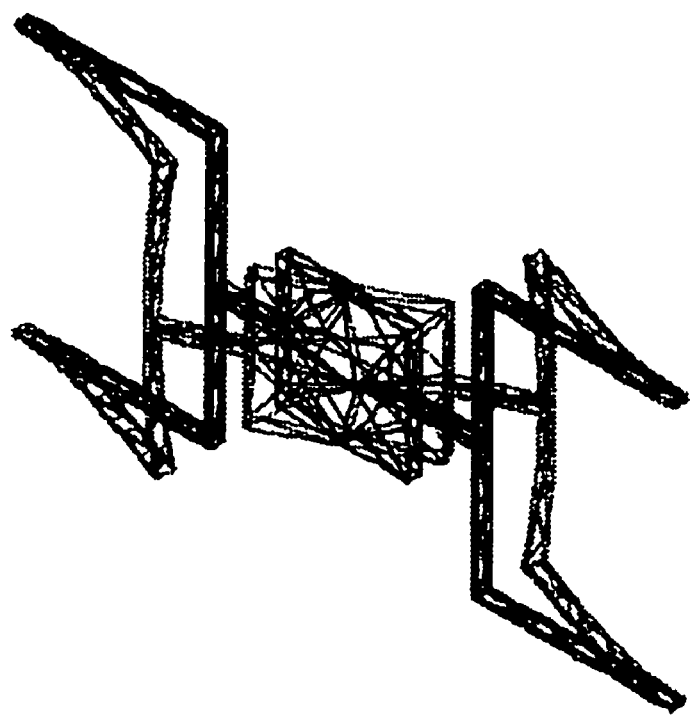
FIG. 48 is a perspective view illustrating analysis results of vibrational mode 6 of the oscillating body 5 illustrated in FIG. 35, in superposed relationship with the representation of the oscillating body 5 in a stationary state.

Further, FIG. 45 is a view solely illustrating the analysis result of vibrational mode 5, FIG. 46 is a view solely illustrating the analysis result of vibrational mode 6, FIG. 47 is a view solely illustrating the analysis result of vibrational mode 5 in comparison with the stationary oscillating body 5, and FIG. 48 is a view solely illustrating the analysis result of vibrational mode 6 in comparison with the stationary oscillating body 5.

As illustrated in FIGS. 35-48, the results of the third numerical analysis demonstrates that, in an example of analysis in which the bifurcation spacing L2 is twice the width L1 of the reflective mirror 8, more non-torsional vibrational modes than those of the second numerical analysis are produced at frequencies lower than the frequency of the torsional vibrational mode, resulting in an reduction in the stability of the optical scan by the optical scanning apparatuses 1 and 200.

The comprehensive consideration of the results of the three different numerical analyses described above reveals that, in the oscillating body 5, a reduction of the length of each connecting portion 17, 18, i.e., the bifurcation spacing L2 of the second spring portions 12, 13 and the second spring portions 15, 16 to be smaller than the width L1 of the reflective mirror 8 allows a reduction in the mass M2 of each connecting portion 17, 18, and, irrespective of an increase in the oscillation speed of the reflective mirror 8, the production of non-trosional vibrational modes excluding first-order horizontal vibrational mode (in-plane vibrational mode) and vertical vibrational mode (out-of-plane vibrational mode) is suppressed. Such non-torsional vibrational modes are ones that adversely affect the rectilinearity or the direction of the centerline of the range of scanning, of light reflected from the reflective mirror 8.

Therefore, a reduction of the bifurcation spacing L2 to be smaller than the width L1 allows the torsional oscillation of the oscillating body 5.

Although the present invention has been described above by way of examples in which the present invention is applied to the optical scanning apparatuses for use in the image forming apparatus 100, the present invention may be applies to optical scanning apparatuses for use in various apparatuses performing optical scanning operations, such as a laser printer, a bar-code reader, and a projector.

Further, although the above-described embodiments are adapted such that the oscillating body 5 is exposed directly to the air, the present invention may be practiced in an arrangement in which the oscillating body 5 is sealed by enclosing laser light with a transparent cover, and in which the sealed space is depressurized below the atmospheric pressure or is filled with inert gas.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical scanning apparatus for optical scan that oscillates at least partially an oscillating body having a reflective mirror portion, to thereby modulate a direction in which the reflective mirror portion causes incident light thereon to be reflected off, the oscillating body comprising:
a first spring portion, coupled to the reflective mirror portion, and excited to generate a torsional oscillation of the first spring portion; and
a plurality of second spring portions, coupled to the first spring portion, and coupled to a fixed frame portion of the oscillating body in a bifurcation manner with a bifurcation spacing of the plurality of second spring portions being larger than a width of the first spring portion, the plurality of second spring portions being excited to generate flexural and torsional oscillations thereof,
the optical scanning apparatus further comprising an actuator oscillating the plurality of second spring portions.

2. The optical scanning apparatus according to claim 1, wherein an elastically deformable portion of the oscillating body which is formed with each second spring portion and the actuator is smaller in second moment of area than the first spring portion.

3. The optical scanning apparatus according to claim 1, wherein the bifurcation spacing is not larger than a width of the reflective mirror portion.

4. The optical scanning apparatus according to claim 1, wherein the plurality of second spring portions are excited to generate respective flexural oscillations in a plane parallel to respective thickness directions of the plurality of second spring portions.

5. The optical scanning apparatus according to claim 4, wherein the plurality of second spring portions are excited to generate the respective flexural oscillations opposite in phase to each other.

6. The optical scanning apparatus according to claim 5, wherein the plurality of second spring portions are excited due to a mechanical force to generate the respective flexural oscillations opposite in phase to each other.

7. The optical scanning apparatus according to claim 6, wherein the actuator is mounted on a selected spring portion which is at least one of the plurality of second spring portions.

8. The optical scanning apparatus according to claim 7, wherein the actuator is secured to a selected surface which is at least one of opposite surfaces of the selected spring portion.

9. The optical scanning apparatus according to claim 8, wherein the actuator is secured to the selected surface in an arrangement allowing the actuator to extend between the selected surface and one of opposite surfaces of an adjacent portion of the fixed frame portion to the selected spring portion, the one of opposite surfaces corresponding to the elected surface.

10. The optical scanning apparatus according to claim 8, wherein the actuator is secured to the selected surface by thin films process.

11. The optical scanning apparatus according to claim 10, wherein the thin films process is one of CVD, sputtering, hydrothermal method, sol-gel method, and powder spray coating method.

12. The optical scanning apparatus according to claim 7, wherein the actuator extends along the selected spring portion and expands and contracts in a direction in which the actuator extends.

13. The optical scanning apparatus according to claim 1, wherein the actuator directly oscillates the oscillating body.

14. The optical scanning apparatus according to claim 1, wherein the actuator indirectly oscillates the oscillating body.

15. The optical scanning apparatus according to claim 1, wherein the actuator oscillates the oscillating body at the same frequency as a resonant frequency of the oscillating body.

16. The optical scanning apparatus according to claim 1, wherein the plurality of second spring portions each have a mechanical property allowing an easier elastic deformation than that of the first spring portion.

17. The optical scanning apparatus according to claim 16, wherein the plurality of second spring portions each have the same modulus as the first spring portion, while each having a shape in cross section allowing an easier elastic deformation than that of the first spring portion.

18. The optical scanning apparatus according to claim 1, wherein the reflective mirror portion is oscillated about an axis of oscillation due to the torsional oscillation,
wherein the oscillating body further comprises a connecting portion interconnecting the first spring portion and the plurality of second spring portions,
wherein the first spring portion, the plurality of second spring portions, and the connecting portion construct a combined body thereof,
and wherein the combined body is disposed in the oscillating body, respectively, at two opposing positions to each other in a direction of the axis of oscillation with the reflective mirror potion being interposed between the two opposing positions.

19. The optical scanning apparatus according to claim 18, wherein the two combined bodies disposed at the two opposing positions, respectively, are disposed symmetrically with respect to a position of the reflective mirror portion.

20. The optical scanning apparatus according to claim 1, wherein the oscillating body further comprises a connecting portion interconnecting the first spring portion and the plurality of second spring portions,
and wherein the actuator is not mounted on the connecting portion.

21. The optical scanning apparatus according to claim 1, wherein the oscillating body further comprises a connecting portion interconnecting the first spring portion and the plurality of second spring portions, and wherein the connecting portion is coupled, respectively, substantially orthogonally to the first spring portion and to the plurality of second spring portions.

22. An image forming apparatus forming an image through scan of a light beam, comprising:

a light source emitting the light beam; and a scanner, including the optical scanning apparatus according to claim 1, scanning the light beam emitted from the light source, using the optical scanning apparatus.

23. The image forming apparatus according to claim 22, wherein the scanner performs a first scan of the light beam in a first direction, and a second scan of the light beam in a second direction intersecting the first direction at a lower rate than that of the first scan, and wherein the optical scanning apparatus is employed to perform the first scan.

24. The image forming apparatus according to claim 22, further comprising an optical system directing to a retina of a viewer the light beam scanned by the scanner.

25. An optical scanning apparatus for optical scan in which, in use, an oscillating body having a reflective mirror portion is at least partially oscillated, to thereby modulate a direction in which the reflective mirror portion causes incident light thereon to be reflected off, the oscillating body comprising:

a first spring portion, having a width and a thickness, coupled to the reflective mirror portion, and excitable to generate a torsional oscillation of the first spring portion;

a plurality of second spring portions, in the form of parallel branches, each second spring portion having a width and a thickness, the plurality of second spring portions being coupled to a fixed frame portion of the oscillating body in a bifurcation manner with a bifurcation spacing of the plurality of second spring portions being larger than a width of the first spring portion; and a connecting portion interconnecting the first spring portion and the plurality of the second spring portions, the optical scanning apparatus further comprising actuators for oscillating the plurality of second spring portions, respectively, thereby to excite the plurality of second spring portions and to generate flexural and torsional oscillations of the plurality of second spring portions, wherein the actuators are attached to the respective second spring portions, the oscillating body has elastically deformable portions which are formed with the plurality of second spring portions and the actuators attached thereto, respectively, and a second moment of area of each of the elastically deformable portions about a neutral axis of a respective second spring portion is smaller than a second moment of area of the first spring portion about a neutral axis of the first spring portion, wherein the neutral axis of the respective second spring portion is defined to extend along the width of the respective second spring portion, and the neutral axis of the first spring portion is defined to extend along the width of the first spring portion.

* * * * *